US012126533B2

(12) United States Patent
Zhang et al.

(10) Patent No.: US 12,126,533 B2
(45) Date of Patent: Oct. 22, 2024

(54) PACKET TRANSMISSION METHOD, PROXY NODE, AND STORAGE MEDIUM

(71) Applicant: Huawei Technologies Co., Ltd., Shenzhen (CN)

(72) Inventors: Yongkang Zhang, Nanjing (CN); Bosen Chu, Nanjing (CN); Kuili Zheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 17/737,637

(22) Filed: May 5, 2022

(65) Prior Publication Data

US 2022/0263758 A1 Aug. 18, 2022

Related U.S. Application Data

(63) Continuation of application No. PCT/CN2020/127209, filed on Nov. 6, 2020.

(30) Foreign Application Priority Data

Nov. 6, 2019 (CN) .......................... 201911078562.7

(51) Int. Cl.
*H04L 12/28* (2006.01)
*H04L 45/00* (2022.01)
(Continued)

(52) U.S. Cl.
CPC ............ *H04L 45/742* (2013.01); *H04L 45/02* (2013.01); *H04L 45/34* (2013.01)

(58) Field of Classification Search
CPC ....... H04L 45/742; H04L 45/02; H04L 45/34; H04L 45/28; H04L 45/50; H04L 45/645;
(Continued)

(56) References Cited

U.S. PATENT DOCUMENTS 7,016,973 B1 * 3/2006 Sibal ....................... H04L 69/16
709/227
10,979,346 B1 * 4/2021 Yeo ........................ H04L 45/72
(Continued)

FOREIGN PATENT DOCUMENTS

CN 108702331 A 10/2018
CN 109561021 A 4/2019
(Continued)

OTHER PUBLICATIONS

Halpern, Ed. et al., "Service Function Chaining (SFC) Architecture," Internet Engineering Task Force (IETF), Request for Comments: 7665, Total 32 pages (Oct. 2015).
Filsfils, Ed. et al., "Segment Routing Architecture," Internet Engineering Task Force (IETF), Request for Comments: 3402, Total 32 pages (Jul. 2018).
(Continued)

*Primary Examiner* — Thai D Hoang
(74) *Attorney, Agent, or Firm* — Leydig, Voit & Mayer, Ltd.

(57) ABSTRACT

This application discloses a packet transmission method, a proxy node, and a storage medium, and pertains to the field of communications technologies. According to the method, a new SID with a bypass function is extended for an End.AD SID. Therefore, when receiving a packet that carries the End.AD SID, a local proxy node uses this new SID to transmit an SRH of the packet to a peer proxy node in a bypass manner, so that the peer proxy node can also obtain the SRH of the packet, and therefore the SRH of the packet can be stored in the peer proxy node. In this way, synchronization of the SRH of the packet can be implemented between the two proxy nodes that are dual-homed to a same SF node, so that the SRH of the packet is redundantly backed up.

18 Claims, 48 Drawing Sheets

(51) Int. Cl.
*H04L 45/02* (2022.01)
*H04L 45/74* (2022.01)

(58) Field of Classification Search
CPC ............... H04L 45/745; H04L 63/0272; H04L 12/12; H04L 61/2528; H04L 12/4641
See application file for complete search history.

(56) References Cited

U.S. PATENT DOCUMENTS

| | | | |
|---|---|---|---|
| 11,201,820 B2* | 12/2021 | Song | H04L 45/34 |
| 2009/0129271 A1* | 5/2009 | Ramankutty | H04L 12/66 |
| | | | 370/235 |
| 2017/0244631 A1 | 8/2017 | Guichard et al. | |
| 2018/0103128 A1* | 4/2018 | Muscariello | H04L 69/22 |
| 2018/0242186 A1* | 8/2018 | Muscariello | H04L 67/63 |
| 2018/0242218 A1* | 8/2018 | Muscariello | H04W 24/08 |
| 2019/0327648 A1 | 10/2019 | Gundavelli et al. | |
| 2020/0358698 A1* | 11/2020 | Song | H04L 45/50 |
| 2021/0352009 A1* | 11/2021 | Van de Velde | H04L 69/14 |
| 2024/0163179 A1* | 5/2024 | Filsfils | H04L 43/10 |

FOREIGN PATENT DOCUMENTS

| | | |
|---|---|---|
| CN | 109756521 A | 5/2019 |
| CN | 109861924 A | 6/2019 |
| CN | 109861926 A | 6/2019 |
| CN | 109981457 A | 7/2019 |
| EP | 3713162 A1 | 9/2020 |
| WO | 2019005949 A1 | 1/2019 |
| WO | 2019105066 A1 | 6/2019 |

OTHER PUBLICATIONS

Filsfils et al., "Segment Routing Policy Architecture," draft-ietf-spring-segment-routing-policy-03.txt, Total 2 pages (May 12, 2019).
Filsfils et al., "SRv6 Network Programming draft-filsfils-spring-srv6-network-programming-05," Spring, Internet—Draft, Total 61 pages (Jul. 2, 2018).
Quinn, Ed. et al., "Network Service Header (NSH)," Internet Engineering Task Force (IETF), Request for Comments: 3300, Total 40 pages (Jan. 2018).
Clad, Ed. et al., "Service Programming with Segment Routing draft-xuclad-spring-sr-service-programming-02," Spring, Internet-Draft, Total 36 pages (Apr. 23, 2019).
Postel, Ed. "Internet Protocol—Darpa Internet Program—Protocol Specification," Request for Comments: 791, Total 51 pages(Sep. 1981).
Deering et al., "Internet Protocol, Version 6 (IPv6) Specification," Internet Engineering Task Force (IETF), Request for Comments: 8200, Total 42 pages (Jul. 2017).
Narten "Assigning Experimental and Testing Nos. Considered Useful," Network Working Group, Request for Comments: 3692, Total 7 pages (Jan. 2004).
Fenner "Experimental Values in IPV4, IPv6, ICMPv4, ICMPv6, UDP, and TCP Headers," Network Working Group, Request for Comments: 4727, Total 11 pages (Nov. 2006).
S. Peng et al., "SRv6 Compatibility with Legacy Devices draft-peng-spring-srv6-compatibility-01," Spring Working Group, Internet—Draft (Expires: Jan. 9, 2020) Total 10 pages (Jul. 8, 2019).
Mayer et al., "An Efficient Linux Kernel Implementation of Service Function Chaining for legacy VNFs based on IPv6 Segment Routing," Total 15 pages (Jul. 23, 2019).

* cited by examiner

Example of an extension header

| Type of a next header (Next Header) | Header extended length (Hdr Ext Len) | Option type (OptType) | Option length (OptLen) | | |
|---|---|---|---|---|---|
| Suboption type (SubOptType) | Suboption length (SubOptLen) | Reserved (Reserved1) | TB (target interface board) | | |
| Reserved flag field (Flags) | | | N (third flag) | A (second flag) | C (first flag) |
| Cache index | | | | | |
| Anycast index | | | | | |
| Reserved (Reserved2) | | | | | |

FIG. 7

Example of a bypass SID (End.ADB.SID)

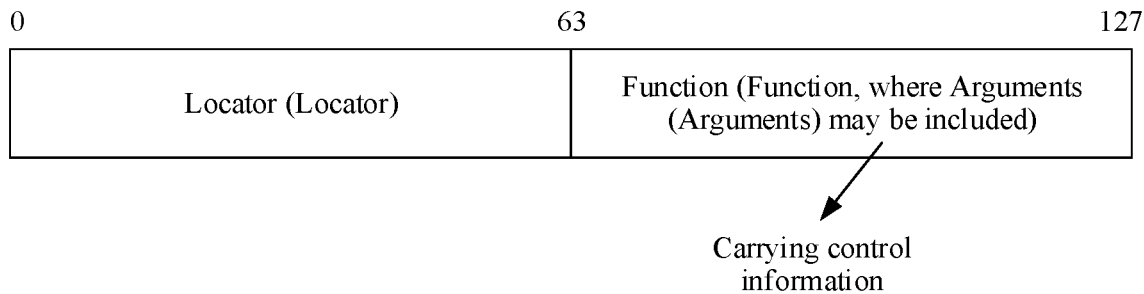

FIG. 8

Segment list update example

SID 2 is an End.AD SID (endpoint dynamic proxy SID)
SID 5 is an End.ADB SID (first bypass SID)

Segment list update example

SID 2 is an End.AD SID (endpoint dynamic proxy SID)
SID 5 is an End.ADB SID (first bypass SID)
SID 6, SID 7, and SID 8 are target SIDs Example in which a first packet evolves to a second packet
when a bypass SID is used to carry control information Example in which a first packet evolves to a second packet
when a TLV in an SRH is used to carry control information

Example in which a first packet evolves to a third packet in a scenario in which no tunnel is established

Example in which a first packet evolves to a third packet in a scenario in which a tunnel is established

PACKET TRANSMISSION METHOD, PROXY NODE, AND STORAGE MEDIUM

CROSS-REFERENCE TO RELATED APPLICATIONS

This application is a continuation of International Application No. PCT/CN2020/127209, filed on Nov. 6, 2020, which claims priority to Chinese Patent Application No. 201911078562.7, filed on Nov. 6, 2019. The disclosures of the aforementioned applications are hereby incorporated by reference in their entireties.

TECHNICAL FIELD

This application relates to the field of communications technologies, and in particular, to a packet transmission method, a proxy node, and a storage medium.

BACKGROUND

Segment routing (SR) is a technology for forwarding a packet based on source routing, and segment routing over internet protocol version 6 (IPv6) (SRv6) is a technology that combines the SR technology with IPv6. Specifically, in addition to an IPv6 header, an SRv6 packet further carries a segment routing header (SRH). The SRH includes information such as a segment identifier (segment ID, SID, which is also referred to as a segment) list (SID list, which is also referred to as a segment list) and a segment left (SL). The segment list includes one or more SIDs arranged in sequence. Each SID is in a form of a 128-bit IPv6 address, and each SID can represent a topology, an instruction, or a service in essence. The SL is equivalent to a pointer, is a value not less than 0, and points to an active SID in the segment list, and the active SID is a destination address in the IPv6 header. When receiving a packet, a node supporting SRv6 reads a destination address of the packet, queries a local SID table based on the destination address, and when the destination address is a SID in the local SID table, identifies the packet as the SRv6 packet, and performs a corresponding operation based on a topology, an instruction, or a service corresponding to the SID.

A service function chain (SFC, which is also referred to as a service chain) is an ordered service function set, so that traffic can pass through a plurality of service function (SF) nodes in a specified sequence, and the plurality of SF nodes process a packet in sequence, to complete a service processing procedure.

When the packet is an SRv6 packet and the SF node does not support SRv6, a proxy (proxy) node is introduced to enable the SF node to normally process the packet. The proxy node is configured to process an SRH on behalf of the SF node. The proxy nodes may include a dynamic proxy, a static proxy, a shared memory proxy, a pseudo proxy, and the like. A processing procedure of the dynamic proxy is as follows: The proxy node receives the SRv6 packet, and queries a local SID table based on a destination address of the SRv6 packet. When the destination address is an endpoint dynamic proxy SID (End.AD SID, where End represents an endpoint, D represents dynamic, and SID represents a segment identifier) in the local SID table, the proxy node performs a dynamic proxy operation corresponding to the End.AD SID, that is, strips an SRH from the SRv6 packet to obtain a packet that does not include the SRH, and sends the packet that does not include the SRH to the SF node. In addition, the proxy node stores the SRH in a cache entry by using a 5-tuple of the packet as an index. The SF node receives the packet that does not include the SRH, processes the packet, and returns a processed packet to the proxy node. The proxy node queries the cache entry by using a 5-tuple of the processed packet as an index, to obtain the SRH. The proxy node encapsulates the SRH into the processed packet, to restore the SRH and obtain the SRv6 packet that includes the SRH. The proxy node decreases an SL of the SRv6 packet by one, and updates the destination address of the SRv6 packet to a SID corresponding to an SL obtained after one is subtracted in the segment list, that is, a next SID of the End.AD SID, to obtain an updated SRv6 packet. The proxy node sends the updated SRv6 packet to a next-hop node.

In this case, the SF node may be dual-homed, that is, a same SF node may be connected to two proxy nodes. For example, the two proxy nodes are respectively referred to as a first proxy node and a second proxy node. Based on dual-homing access, the SRv6 packet may be forwarded from the first proxy node to the SF node, and may also be forwarded from the second proxy node to the SF node. In this case, even if one proxy node is faulty, the SRv6 packet can still be forwarded from the other proxy node to the SF node, to greatly improve network reliability. In addition, pressure of forwarding the SRv6 packet and processing the SRH can be shared between the two proxy nodes. Therefore, a load balancing function is implemented, and load of a single proxy node is reduced.

In a dual-homing access scenario, after the first proxy node receives the packet whose destination address is the End.AD SID, performs the foregoing dynamic proxy procedure, and sends the packet that does not include the SRH to the SF node, if the SF node processes the packet, the SF node sends the processed packet to the second proxy node. When the second proxy node receives the packet, because the second proxy node does not store the SRH, the second proxy node cannot obtain the SRH through query. Consequently, SRH restoration fails, and the packet processed by the SF node cannot be normally transmitted.

SUMMARY

Embodiments of this application provide a packet transmission method, a proxy node, and a storage medium, to resolve a technical problem of an SRH restoration failure in a dual-homing access scenario in a related art. The technical solutions are as follows:

According to a first aspect, a packet transmission method is provided. In the method, a first proxy node and a second proxy node are connected to a same service function node, and the first proxy node receives a first packet that includes an SRH and whose destination address is an End.AD SID. In this case, the first proxy node generates, based on the End.AD SID, the first packet, and a first bypass SID corresponding to the second proxy node, a second packet that includes the SRH of the first packet, the first bypass SID, and control information. The first proxy node sends the second packet to the second proxy node. The control information indicates the second proxy node to store the SRH of the first packet.

According to the method, a new SID with a bypass function is extended for the End.AD SID. Therefore, when receiving a packet that carries the End.AD SID, a local proxy node uses this new SID to transmit an SRH of the packet to a peer proxy node in a bypass manner, so that the peer proxy node can also obtain the SRH of the packet, and therefore the SRH of the packet can be stored in the peer proxy node. In this way, synchronization of the SRH of the packet can be implemented between the two proxy nodes that are dual-homed to the same SF node, so that the SRH of the packet is redundantly backed up. In this case, after processing the packet, the SF node may choose to return the processed packet to the peer proxy node. Because the peer proxy node obtains the SRH of the packet in advance, the peer proxy node can restore the SRH of the packet by using a previously stored SRH, so that the packet processed by the SF node can be normally transmitted by using the restored SRH.

Optionally, in a process of generating the second packet, the first proxy node may update a segment left SL of the SRH of the first packet, and update the destination address of the first packet to obtain the second packet, where an SL of the second packet is greater than an SL of the first packet. Therefore, the second packet is obtained.

In the foregoing optional manner, a received packet is copied, and a SID (the first bypass SID) is inserted, to obtain the packet that can be transmitted to the peer end in a bypass manner. Compared with a manner of generating an entire packet starting from 0, in this manner, a processing operation is very simple. Therefore, the process of generating the packet may be performed by a data plane without relying on a control plane. According to an experiment, the foregoing packet generation logic is configured for a microcode of a forwarding chip, so that the forwarding chip can perform the step of generating the second packet. Therefore, a microcode architecture is supported, and practicality is strong.

Optionally, the first proxy node may increase the SL of the first packet by one to update the SL. The first proxy node may update the destination address of the first packet to the first bypass SID to update the destination address of the first packet.

Optionally, in addition to the first bypass SID, the first proxy node may further insert one or more target SIDs into a segment list of the SRH of the first packet, where the one or more target SIDs are used to indicate a target forwarding path, and the target forwarding path is a path from the first proxy node to the second proxy node. In addition, the first proxy node may increase the SL of the first packet by a positive integer greater than 1 to update the SL. The first proxy node may update the destination address of the first packet to a SID corresponding to a next SR node to update the destination address of the first packet.

Optionally, the second packet may include an extension header, and the control information may be carried in the extension header of the second packet.

In this manner, if a new function needs to be added on the basis of the method provided in this embodiment, additional information may continue to be added to the extension header. For example, if the second proxy node needs to be indicated to perform specific behavior or a specific service, other control information corresponding to the behavior or service may also be added to the extension header. In this way, the second packet has a good extensibility capability, and an SRH backup function provided in this embodiment is used with another function.

Optionally, the control information may be directly carried in the first bypass SID.

In this manner, a function of controlling the peer proxy node to store the SRH can be implemented by using the bypass SID. In this way, an extra byte occupied by the control information in the packet is avoided, to reduce a data amount of the packet, and reduce packet transmission overheads.

Optionally, the second packet may include an internet protocol (internet protocol, IP) header, and the control information may be carried in the IP header of the second packet.

The IP header of the second packet may be obtained by re-encapsulating an original IP header of the first packet. In this case, the control information is directly carried in the IP header, so that the IP header can perform both a routing function and a function of carrying the control information. In this way, an extra byte occupied by the control information in the packet can also be avoided, to reduce a data amount of the packet, and reduce packet transmission overheads.

Optionally, an SRH of the second packet may include a type length value (TLV), and the control information may be carried in the TLV in the SRH.

In this manner, a capability that the SRH carries the information by using the TLV is used, so that an extra byte occupied by the control information in the packet can also be avoided, to reduce a data amount of the packet, and reduce packet transmission overheads.

Optionally, the first proxy node may further store the SRH of the first packet in a first cache entry; generate a third packet based on the first packet; and send the third packet to the service function node, where the third packet includes a payload of the first packet but does not include the SRH of the first packet.

In this manner, the first proxy node provides a dynamic proxy service for the SF node, and transmits the payload of the first packet to the SF node, so that the SF node can perform service function processing based on the payload. In addition, because the SRH is not sent to the SF node, a case in which processing fails because the SF node cannot identify the SRH is avoided.

Optionally, in a process of storing the SRH of the first packet, the first proxy node may store the SRH of the first packet in the first cache entry by using an identifier of the first cache entry as an index.

In this manner, if the SF node returns, to the proxy node, a packet for which a flow identifier is modified, because a cache entry in which the SRH is stored is usually fixed for the proxy node and does not change with the modification of the flow identifier, an identifier of the cache entry used when the SRH is stored can be the same as an identifier of a cache entry used when the SRH is obtained through query. Therefore, the identifier of the cache entry is used as an index, so that the SRH of the packet for which the flow identifier is modified can be obtained through query, and the SRH is restored to the packet for which the flow identifier is modified. Therefore, even if the SF node is an SF node with a network address translation (NAT) function, when the flow identifier corresponding to the packet is changed in a packet transmission process, the proxy node can also restore the SRH. Therefore, the proxy node can support access to the SF node with the NAT function, to provide a dynamic proxy function for the SF node that implements the NAT function.

Optionally, before the first proxy node stores the SRH of the first packet in the first cache entry by using the identifier of the first cache entry as the index, the first proxy node may determine that a service function of the service function node includes modifying a flow identifier.

In this manner, when it is found that the flow identifier corresponding to the packet may change due to the service function of the SF node, the SRH is stored by using the identifier of the cache entry as the index, to avoid a case in which the SRH cannot be found because the flow identifier changes in a query process.

Optionally, the second packet further includes the identifier of the first cache entry, the control information is further used to indicate the second proxy node to store a mapping relationship between the identifier of the first cache entry and an identifier of a second cache entry, and the second cache entry is a cache entry used by the second proxy node to store the SRH of the first packet.

In this manner, the control information can be used to indicate the second proxy node to maintain a mapping relationship between a cache entry in which the SRH is stored locally and a cache entry in which the SRH is stored at the peer end. In this case, if the SF node returns, to the second proxy node, the packet for which the flow identifier is modified, the second proxy node can find, by using the mapping relationship based on the identifier that is of the cache entry and that is carried in the packet, a cache entry of an SRH locally cached in the second proxy node, so that the SRH is found from the local cache entry to restore the SRH. In this way, a scenario in which dual-homing access is performed when the SF node is an SF node in a NAT type can be supported.

Optionally, the third packet includes the identifier of the first cache entry. After the first proxy node sends the third packet to the service function node, the first proxy node may further receive a fourth packet from the service function node. The first proxy node may perform query by using the identifier that is of the first cache entry and that is in the first packet as the index, to obtain the SRH of the first packet. The first proxy node may generate a fifth packet based on the received fourth packet and the SRH that is of the first packet and that is obtained through query, and send the fifth packet. The fifth packet includes a payload of the fourth packet and the SRH of the first packet.

In this manner, the first proxy node implements a dynamic proxy function. In this way, the SRH of the packet is restored, so that the packet can continue to be forwarded on an SR network by using the SRH. In addition, because service function processing is performed on the payload of the packet by the SF node, another node can obtain the processed payload, and then continue to perform another service function of an SFC. In particular, even if the SF node is an SF node with a NAT function, when the flow identifier corresponding to the packet is changed in a packet transmission process, the proxy node can find the SRH by using the identifier that is of the cache entry and that is carried in the packet as an index to restore the SRH. Therefore, the proxy node can support access to the SF node with the NAT function, to provide a dynamic proxy function for the SF node that implements the NAT function.

Optionally, the first proxy node may generate the second packet when detecting that the first cache entry is generated, or may generate the second packet when detecting that the first cache entry is updated.

In this manner, a procedure of forwarding the second packet is triggered. In this way, each time the first proxy node receives a new SRH, because the new SRH triggers generation of a cache entry, forwarding of the second packet is triggered. Therefore, the new SRH can be transmitted to the second proxy node in a timely manner through forwarding of the second packet, to ensure that the new SRH is synchronized with the second proxy node in real time. In addition, because the previously stored SRH does not trigger generation of a cache entry, forwarding of the second packet is not triggered. Therefore, processing overheads of generating the second packet for transmitting the SRH and network overheads of transmitting the second packet are avoided.

Optionally, in a process of storing the SRH of the first packet, the first proxy node stores the SRH of the first packet in the first cache entry by using a flow identifier corresponding to the first packet and the endpoint dynamic proxy SID as indexes.

In this manner, the SRH is stored by using the flow identifier and the End.AD SID as the indexes, so that indexes of SRHs of packets in different VPNs can be distinguished based on different End.AD SIDs, to ensure that the indexes of the SRHs of the packets in the different VPNs are different. In this way, the SRHs of the packets in the different VPNs are stored separately, to implement information isolation between the different VPNs.

Optionally, the first proxy node receives a configuration instruction, where the configuration instruction includes an endpoint dynamic proxy SID corresponding to a service function node in each virtual private network (VPN). The first proxy node may store a mapping relationship between the endpoint dynamic proxy SID and a VPN identifier according to the configuration instruction.

In this manner of allocating the End.AD SID, the End.AD SID can be used as a VPN identifier, packets sent to SF nodes in different VPNs carry different End.AD SIDs, and the packets in the different VPNs can be distinguished based on the different End.AD SIDs.

Optionally, a flow identifier corresponding to the third packet is the flow identifier corresponding to the first packet, and the third packet includes the VPN identifier. After the first proxy node sends the third packet to the service function node, the first proxy node may further receive a fourth packet from the service function node, where a flow identifier corresponding to the fourth packet is the flow identifier corresponding to the first packet, and the fourth packet includes the VPN identifier and a payload. The first proxy node performs query based on the VPN identifier, the endpoint dynamic proxy SID, and the flow identifier corresponding to the fourth packet, to obtain the SRH of the first packet. The first proxy node generates a fifth packet based on the fourth packet and the SRH of the first packet, where the fifth packet includes a payload of the fourth packet and the SRH of the first packet. The first proxy node sends the fifth packet.

In this manner, a method for providing a dynamic proxy service in an SRv6 VPN scenario is provided. The mapping relationship between the End.AD SID and the VPN identifier carried in the packet is established. In this way, even if packets in different VPNs correspond to a same flow identifier, because VPN identifiers of the packets in the different VPNs correspond to different End.AD SIDs, indexes that are of the packets in the different VPNs and that are cached in the proxy node can be distinguished based on the End.AD SIDs. Therefore, a case in which SRHs of packets in a plurality of VPNs are hit by using a same index can be avoided, to ensure query accuracy.

Optionally, before the first proxy node sends the second packet to the second proxy node, the first proxy node may detect a fault event, where the fault event includes at least one of an event that a link between the first proxy node and the service function node is faulty or an event that the first proxy node is faulty. In this case, the second packet forwarded by the first proxy node may further include the payload of the first packet, and the control information is further used to indicate the second proxy node to send the payload of the first packet to the service function node.

In this manner, a method for providing a dynamic proxy service in a fault scenario is provided. When detecting a fault event, the local proxy node re-encapsulates a packet on which dynamic proxy processing is to be performed, and forwards a re-encapsulated packet to the peer proxy node, to indicate the peer proxy node to perform a dynamic proxy operation in place of the local proxy node, strip the SRH from the re-encapsulated packet, and transmit a payload of the re-encapsulated packet to the SF node. In this way, when a device fault or a link fault occurs on the local proxy node, local traffic is transmitted to the peer end in a bypass manner for further forwarding. Therefore, in the fault scenario, this can also ensure that the packet is processed by the SF node and normally transmitted, to greatly improve network stability, reliability, and robustness.

Optionally, the first proxy node may be connected to the second proxy node through a first link. Based on this topology, in a process in which the first proxy node sends the second packet, the first proxy node may send the second packet to the second proxy node through a first outbound interface corresponding to the first link.

In this manner, the first proxy node may select a peer link (peer link) as a forwarding path of the second packet, so that the second packet can be transmitted to the peer end through the peer link.

Optionally, the first proxy node may be connected to a routing node through a second link, and the routing node is connected to the second proxy node through a third link. Based on this topology, in a process in which the first proxy node sends the second packet, the first proxy node may send the second packet to the routing node through a second outbound interface corresponding to the second link, where the second packet is forwarded by the routing node to the second proxy node through the third link.

In this manner, the first proxy node may select a path on which forwarding is performed by the routing node as a forwarding path of the second packet, so that the second packet can be transmitted to the peer end after being forwarded by the routing node.

Optionally, in a process in which the first proxy node sends the second packet, the first proxy node may detect a status of the first link. If the first link is in an available state, the first proxy node may send the second packet to the second proxy node through the first outbound interface corresponding to the first link. If the first link is in an unavailable state, the first proxy node may send the second packet to the routing node through the second outbound interface corresponding to the second link.

In this manner, if the peer link is in an available state, the first proxy node preferentially uses the peer link, so that the second packet is preferentially transmitted to the second proxy node through the peer link. In this case, because the peer link is shorter than the path on which forwarding is performed by the routing node, the peer link includes fewer nodes than the path on which forwarding is performed by the routing node, so that a delay of transmitting the second packet can be reduced.

Optionally, in a process in which the first proxy node sends the second packet, the first proxy node may continuously send a plurality of second packets to the second proxy node.

In this manner, transmission reliability of the second packet is implemented through repeated sending. Because the SRH of the first packet may be transmitted to the second proxy node by using any one of the plurality of second packets, a probability that the SRH is lost in a transmission process is reduced, implementation is simple, and feasibility is high.

Optionally, after the first proxy node sends the second packet to the second proxy node, when the first proxy node does not receive a sixth packet, the first proxy node may further retransmit the second packet to the second proxy node, where a source address of the sixth packet is the first bypass SID, the sixth packet includes a second bypass SID corresponding to the first proxy node, the second bypass SID is used to identify that a destination node of the sixth packet is the first proxy node, and the sixth packet is used to indicate that the second packet is received.

In this manner, transmission reliability of the second packet is implemented by using an acknowledgment (ACK) mechanism. The first proxy node can acknowledge, by determining whether the first proxy node receives the sixth packet, whether the second proxy node receives the SRH. When the second proxy node does not obtain the SRH, the first proxy node ensures, through retransmission, that the SRH is transmitted to the second proxy node, to ensure SRH transmission reliability.

According to a second aspect, a packet transmission method is provided. In the method, a first proxy node and a second proxy node are connected to a same service function node, and the second proxy node receives, from the first proxy node, a second packet that includes an SRH of a first packet, a first bypass SID corresponding to the second proxy node, and control information. The second proxy node determines that the control information indicates the second proxy node to store the SRH of the first packet. Therefore, the second proxy node parses the second packet to obtain the SRH of the first packet, and the second proxy node stores the SRH of the first packet in a second cache entry.

According to the method, a new SID with a bypass function is extended for an End.AD SID. Therefore, when receiving a packet that carries the End.AD SID, a local proxy node uses this new SID to transmit an SRH of the packet to a peer proxy node in a bypass manner, so that the peer proxy node can also obtain the SRH of the packet, and therefore the SRH of the packet can be stored in the peer proxy node. In this way, synchronization of the SRH of the packet can be implemented between the two proxy nodes that are dual-homed to the same SF node, so that the SRH of the packet is redundantly backed up. In this case, after processing the packet, the SF node may choose to return the processed packet to the peer proxy node. Because the peer proxy node obtains the SRH of the packet in advance, the peer proxy node can restore the SRH of the packet by using a previously stored SRH, so that the packet processed by the SF node can be normally transmitted by using the restored SRH.

Optionally, in a process of parsing the second packet, the second proxy node may delete the first bypass SID from a segment list of an SRH of the second packet; and decrease a segment left SL of the SRH of the second packet by one, to obtain the SRH of the first packet.

In the foregoing optional manner, one SID (the first bypass SID) is deleted from the SRH of the packet sent by the peer end, and an SL field in the SRH is modified, to restore the SRH previously received by the peer end. A processing operation is very simple. Therefore, the process of obtaining the SRH may be performed by a data plane without relying on a control plane. According to an experiment, the foregoing packet generation logic is configured for a microcode of a forwarding chip, so that the forwarding chip can perform the process of obtaining the SRH. Therefore, a microcode architecture is supported, and practicality is strong.

Optionally, the second packet may include an extension header, and the control information may be carried in the extension header of the second packet.

In this manner, if a new function needs to be added on the basis of the method provided in this embodiment, additional information may continue to be added to the extension header. For example, if the second proxy node needs to be indicated to perform specific behavior or a specific service, other control information corresponding to the behavior or service may also be added to the extension header. In this way, the second packet has a good extensibility capability, and an SRH backup function provided in this embodiment is used with another function.

Optionally, the control information may be directly carried in the first bypass SID.

In this manner, a function of controlling the peer proxy node to store the SRH can be implemented by using the bypass SID. In this way, an extra byte occupied by the control information in the packet is avoided, to reduce a data amount of the packet, and reduce packet transmission overheads.

Optionally, the second packet may include an IP header, and the control information may be carried in the IP header of the second packet.

The IP header of the second packet may be obtained by re-encapsulating an original IP header of the first packet. In this case, the control information is directly carried in the IP header, so that the IP header can perform both a routing function and a function of carrying the control information. In this way, an extra byte occupied by the control information in the packet can also be avoided, to reduce a data amount of the packet, and reduce packet transmission overheads.

Optionally, the SRH of the second packet may include a TLV, and the control information may be carried in the TLV in the SRH.

In this manner, a capability that the SRH carries the information by using the TLV is used, so that an extra byte occupied by the control information in the packet can also be avoided, to reduce a data amount of the packet, and reduce packet transmission overheads.

Optionally, in a process in which the second proxy node stores the SRH of the first packet, the second proxy node stores the SRH of the first packet in the second cache entry by using an identifier of the second cache entry as an index.

Optionally, before the second proxy node stores the SRH, the second proxy node may determine that a service function of the service function node includes modifying a flow identifier.

Optionally, the second packet may further include an identifier of a first cache entry used by the first proxy node to store the SRH of the first packet. The second proxy node determines that the control information further indicates the second proxy node to store a mapping relationship between the identifier of the first cache entry and the identifier of the second cache entry. The second proxy node may further store the mapping relationship between the identifier of the first cache entry and the identifier of the second cache entry.

In this manner, the control information can be used to indicate the second proxy node to maintain a mapping relationship between a cache entry in which the SRH is stored locally and a cache entry in which the SRH is stored at the peer end. In this case, if the SF node returns, to the second proxy node, the packet for which the flow identifier is modified, the second proxy node can find, by using the mapping relationship based on the identifier that is of the cache entry and that is carried in the packet, a cache entry of an SRH locally cached in the second proxy node, so that the SRH is found from the local cache entry to restore the SRH. In this way, a scenario in which dual-homing access is performed when the SF node is an SF node in a NAT type can be supported.

Optionally, after the second proxy node stores the mapping relationship between the identifier of the first cache entry and the identifier of the second cache entry, the second proxy node may further receive a fourth packet from the service function node. The second proxy node queries the mapping relationship between the identifier of the first cache entry and the identifier of the second cache entry based on the identifier that is of the first cache entry and that is carried in the fourth packet, to obtain the identifier that is of the second cache entry and that corresponds to the identifier of the first cache entry. The second proxy node queries the second cache entry by using the identifier of the second cache entry as the index, to obtain the SRH of the first packet. The second proxy node may generate a fifth packet based on the fourth packet and the SRH of the first packet. The second proxy node sends the fifth packet. The fifth packet includes a payload of the fourth packet and the SRH of the first packet.

In this manner, the second proxy node implements a dynamic proxy function. In this way, the SRH of the packet is restored, so that the packet can continue to be forwarded on an SR network by using the SRH. In addition, because service function processing is performed on the payload of the packet by the SF node, another node can obtain the processed payload, and then continue to perform another service function of an SFC. In particular, even if the SF node is an SF node with a NAT function, when the flow identifier corresponding to the packet is changed in a packet transmission process, the second proxy node can find a cache entry of a locally cached SRH from the mapping relationship based on the maintained mapping relationship between the cache entries by using the identifier that is of the cache entry and that is carried in the packet as an index to find the SRH and restore the SRH. Therefore, the second proxy node can support access to the SF node with the NAT function, to provide a dynamic proxy function for the SF node that implements the NAT function.

Optionally, a flow identifier corresponding to the second packet is a flow identifier corresponding to the first packet, and the SRH of the first packet includes an endpoint dynamic proxy SID. In a process in which the second proxy node stores the SRH of the first packet, the second proxy node may store the SRH of the first packet in the second cache entry by using the flow identifier corresponding to the second packet and the endpoint dynamic proxy SID in the SRH as indexes.

In this manner, the SRH is stored by using the flow identifier and the End.AD SID as the indexes, so that indexes of SRHs of packets in different VPNs can be distinguished based on different End.AD SIDs, to ensure that the indexes of the SRHs of the packets in the different VPNs are different. In this way, the SRHs of the packets in the different VPNs are stored separately, to implement information isolation between the different VPNs.

Optionally, the second proxy node receives a configuration instruction. The second proxy node may store a mapping relationship between the endpoint dynamic proxy SID and a VPN identifier according to the configuration instruction, where the configuration instruction includes an endpoint dynamic proxy SID corresponding to a service function node in each VPN.

In this manner of allocating the End.AD SID, the End.AD SID can be used as a VPN identifier, packets sent by SF nodes in different VPNs carry different End.AD SIDs, and the packets in the different VPNs can be distinguished based on the different End.AD SIDs.

Optionally, after the second proxy node stores the SRH of the first packet in the second cache entry by using the flow identifier corresponding to the first packet and the endpoint dynamic proxy SID as the indexes, the second proxy node may further receive a fourth packet from the service function node. The second proxy node queries the second cache entry based on the VPN identifier carried in the fourth packet, the endpoint dynamic proxy SID, and a flow identifier corresponding to the fourth packet, to obtain the SRH of the first packet. The second proxy node may generate a fifth packet based on the fourth packet and the SRH of the first packet, and send the fifth packet. The fifth packet includes a payload of the fourth packet and the SRH of the first packet.

In this manner, a method for providing a dynamic proxy service in an SRv6 VPN scenario is provided. The mapping relationship between the End.AD SID and the VPN identifier carried in the packet is established. In this way, even if packets in different VPNs correspond to a same flow identifier, because VPN identifiers of the packets in the different VPNs correspond to different End.AD SIDs, indexes that are of the packets in the different VPNs and that are cached in the proxy node can be distinguished based on the End.AD SIDs. Therefore, a case in which SRHs of packets in a plurality of VPNs are hit by using a same index can be avoided, to ensure query accuracy.

Optionally, after the second proxy node receives the second packet, if the second proxy node determines that the control information further indicates the second proxy node to send the payload of the first packet to the service function node, the second proxy node may further generate, based on the second packet sent by the first proxy node, a third packet that carries the payload of the first packet, and send the third packet to the service function node.

In this manner, a method for providing a dynamic proxy service in a fault scenario is provided. When detecting a fault event, the local proxy node re-encapsulates a packet on which dynamic proxy processing is to be performed, and forwards a re-encapsulated packet to the peer proxy node, to indicate the peer proxy node to perform a dynamic proxy operation in place of the local proxy node, strip the SRH from the re-encapsulated packet, and transmit a payload of the re-encapsulated packet to the SF node. In this way, when a device fault or a link fault occurs on the local proxy node, local traffic is transmitted to the peer end in a bypass manner for further forwarding. Therefore, in the fault scenario, this can also ensure that the packet is processed by the SF node and normally transmitted, to greatly improve network stability, reliability, and robustness.

Optionally, the second proxy node is connected to the first proxy node through a first link. In a process in which the second proxy node receives the second packet, the second proxy node may receive the second packet from the first proxy node through a first inbound interface corresponding to the first link.

In this manner, a peer link is used as a forwarding path of the second packet, so that the second packet can be transmitted to the second proxy node locally through the peer link.

Optionally, the second proxy node is connected to a routing node through a third link, and the routing node is connected to the first proxy node through a second link. In a process in which the second proxy node receives the second packet, the second proxy node may receive the second packet from the routing node through a second inbound interface corresponding to the third link, where the second packet may be sent by the first proxy node to the routing node through the second link.

In this manner, a path on which forwarding is performed by the routing node is used as a forwarding path of the second packet, so that the second packet is transmitted to the second proxy node locally after being forwarded by the routing node.

Optionally, the second proxy node may continuously receive a plurality of second packets from the first proxy node.

In this manner, transmission reliability of the second packet is implemented through repeated sending. Because the SRH of the first packet may be transmitted to the second proxy node by using any one of the plurality of second packets, a probability that the SRH is lost in a transmission process is reduced, implementation is simple, and feasibility is high.

Optionally, after the second proxy node receives the second packet from the first proxy node, the second proxy node generates a sixth packet based on the first bypass SID, a second bypass SID corresponding to the second proxy node, and the second packet, and sends the sixth packet to the first proxy node, where a source address of the sixth packet is the first bypass SID, the sixth packet includes a second bypass SID corresponding to the first proxy node, the second bypass SID is used to identify that a destination node of the sixth packet is the first proxy node, and the sixth packet is used to indicate that the second packet is received.

In this manner, transmission reliability of the second packet is implemented by using an ACK mechanism. The first proxy node can acknowledge, by determining whether the first proxy node receives the sixth packet, whether the second proxy node receives the SRH. When the second proxy node does not obtain the SRH, the first proxy node ensures, through retransmission, that the SRH is transmitted to the second proxy node, to ensure SRH transmission reliability.

According to a third aspect, a first proxy node is provided. The first proxy node has functions of implementing packet transmission according to any one of the first aspect or the optional manners of the first aspect. The first proxy node includes at least one module, and the at least one module is configured to implement the packet transmission method according to any one of the first aspect or the optional manners of the first aspect. For specific details of the first proxy node according to the third aspect, refer to any one of the first aspect or the optional manners of the first aspect. The details are not described herein again.

According to a fourth aspect, a second proxy node is provided. The second proxy node has functions of implementing packet transmission according to any one of the second aspect or the optional manners of the second aspect. The second proxy node includes at least one module, and the at least one module is configured to implement the packet transmission method according to any one of the second aspect or the optional manners of the second aspect. For specific details of the second proxy node according to the fourth aspect, refer to any one of the second aspect or the optional manners of the second aspect. The details are not described herein again.

According to a fifth aspect, a first proxy node is provided. The first proxy node includes a processor, and the processor is configured to execute instructions, so that the first proxy node performs the packet transmission method according to any one of the first aspect or the optional manners of the first aspect. For specific details of the first proxy node according to the fifth aspect, refer to any one of the first aspect or the optional manners of the first aspect. The details are not described herein again.

According to a sixth aspect, a second proxy node is provided. The second proxy node includes a processor, and the processor is configured to execute instructions, so that the second proxy node performs the packet transmission method provided according to any one of the second aspect or the optional manners of the second aspect. For specific details of the second proxy node according to the sixth aspect, refer to any one of the second aspect or the optional manners of the second aspect. The details are not described herein again.

According to a seventh aspect, a computer-readable storage medium is provided. The storage medium stores at least one instruction, and the instruction is read by a processor, so that a first proxy node performs the packet transmission method according to any one of the first aspect or the optional manners of the first aspect.

According to an eighth aspect, a computer-readable storage medium is provided. The storage medium stores at least one instruction, and the instruction is read by a processor, so that a second proxy node performs the packet transmission method according to any one of the second aspect or the optional manners of the second aspect.

According to a ninth aspect, a computer program product is provided. When the computer program product runs on a first proxy node, the first proxy node is enabled to perform the packet transmission method according to any one of the first aspect or the optional manners of the first aspect.

According to a tenth aspect, a computer program product is provided. When the computer program product runs on a second proxy node, the second proxy node is enabled to perform the packet transmission method according to any one of the second aspect or the optional manners of the second aspect.

According to an eleventh aspect, a chip is provided. When the chip runs on a first proxy node, the first proxy node is enabled to perform the packet transmission method according to any one of the first aspect or the optional manners of the first aspect.

According to a twelfth aspect, a chip is provided. When the chip runs on a second proxy node, the second proxy node is enabled to perform the packet transmission method according to any one of the second aspect or the optional manners of the second aspect.

According to a thirteenth aspect, a packet transmission system is provided. The packet transmission system includes a first proxy node and a second proxy node, the first proxy node is configured to perform the method according to any one of the first aspect or the optional manners of the first aspect, and the second proxy node is configured to perform the method according to any one of the second aspect or the optional manners of the second aspect.

BRIEF DESCRIPTION OF DRAWINGS

FIG. 7 is a schematic diagram of an extension header according to an embodiment of this application;

FIG. 8 is a schematic diagram of a bypass SID according to an embodiment of this application;

DESCRIPTION OF EMBODIMENTS

Figure 1:
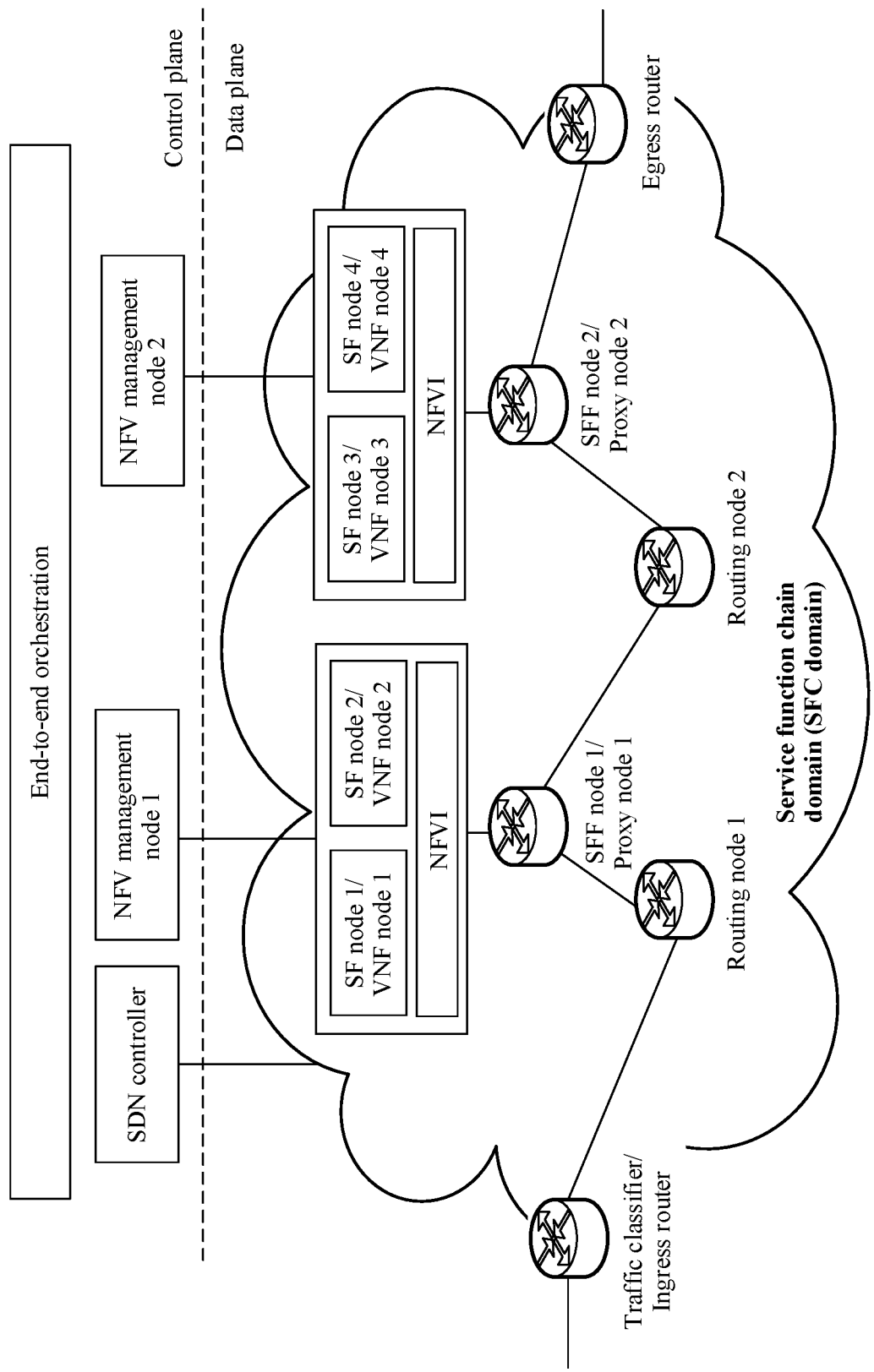
FIG. 1 is a diagram of a system architecture of an SFC according to an embodiment of this application.

To make objectives, technical solutions, and advantages of this application clearer, the following further describes implementations of this application in detail with reference to accompanying drawings.

The term "at least one" in this application means one or more, and the term "a plurality of" in this application means two or more. For example, "a plurality of second packets" means two or more second packets. The terms "system" and "network" may be used interchangeably in this specification.

In this application, terms such as "first" and "second" are used to distinguish between same items or similar items that have basically same functions. It should be understood that there is no logical or time sequence dependency between "first", "second", and "$n^{th}$", and a quantity and an execution sequence are not limited.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should be understood that determining B based on A does not mean that B is determined based on only A, but B may alternatively be determined based on A and/or other information.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" appearing in the entire specification does not refer to a same embodiment. In addition, these particular features, structures, or characteristics may be combined in one or more embodiments in any proper manner.

The following describes an example of a system architecture of a service function chain.

Service functions (such as a firewall and load balancing) of a conventional telecommunications network are usually closely coupled to hardware resources. Each service node is in a product form of a dedicated device. Consequently, deployment is complex, and it is difficult for capacity expansion, migration, and upgrade. On the SFC, each service function is virtualized as one SF node, and a plurality of SF nodes are combined to obtain an ordered service function set, that is, a service function chain. On the SFC, traffic passes through SF nodes on a service chain in a specified sequence, and the SF nodes process a packet in sequence, to complete a service processing procedure. Based on the SFC technology, the service functions can be decoupled from the hardware resources, to facilitate flexible service provisioning and rapid service deployment. For example, if a new service is provisioned, a complex operation of hardware device reconstruction and upgrade in the conventional telecommunications network can be avoided, and a new SF node can be added to a service chain provided by the SFC, so that running of the new service can be supported based on the newly added SF node. In addition, the SFC can be flexibly combined with other virtualization technologies. For example, the SFC can be combined with network function virtualization (NFV). In this case, an NFV management node, for example, a virtualized network function manager (VNFM), in the NFV can serve as a control plane of the SFC to control each node on the SFC. For another example, the SFC can be combined with software-defined networking (SDN). In this case, an SDN controller in the SDN can serve as a control plane of the SFC to control each node on the SFC.

The system architecture of the SFC may include a plurality of nodes, each node has a corresponding function, and different nodes cooperate with each other to implement an overall function of the service chain. Usually, the system architecture of the SFC may include a traffic classifier (CF), an SF node, a proxy node, a service function forwarder (SFF) node, and a routing node.

For example, FIG. 1 is a diagram of a system architecture of an SFC according to an embodiment of this application. In FIG. 1, the SF node is an SF node 1, an SF node 2, an SF node 3, or an SF node 4, the SFF node is an SFF node 1 or an SFF node 2, the proxy node is a proxy node 1 or a proxy node 2, and the routing node is a routing node 1 or a routing node 2. A service function chain domain (SFC domain) in FIG. 1 is a set of SFC-enabled nodes.

It should be noted that the SFF node and the proxy node may be integrated into a same device, that is, a hardware device in which the SFF node is located also implements a function of the proxy node. For example, refer to FIG. 1. The SFF node 1 and the proxy node 1 are located in a same hardware device, and the SFF node 2 and the proxy node 2 are located in a same hardware device.

The traffic classifier may be an ingress router on the SFC. The traffic classifier is configured to classify received traffic according to a classification rule. If the traffic meets the classification criterion, the traffic classifier forwards the traffic, so that the traffic enters a service chain provided by the SFC. Usually, after determining that the traffic meets the classification criterion, the traffic classifier adds SFC information to each of packets corresponding to the traffic, so that the packets arrive at SF nodes in sequence on a network based on the SFC information in a sequence corresponding to the service function chain. Therefore, the SF nodes perform service processing in sequence. The traffic classifier may be a router, a switch, or another network device.

The SF node is configured to perform service processing on a packet. Usually, the SF node may be connected to one or more SFF nodes, and the SF node may receive one or more to-be-processed packets from the one or more SFF nodes. A service function corresponding to the SF node may be set based on a service scenario. For example, the service function corresponding to the SF node may be user authentication, a firewall, network address translation (NAT), bandwidth control, virus detection, cloud storage, deep packet inspection (DPI), intrusion detection, or intrusion prevention. The SF node may be a server, a host, a personal computer, a network device, or a terminal device.

The SFF node is configured to forward the received packet to the SF node based on the SFC information. Usually, after processing the packet, the SF node returns the packet to a same SFF node, that is, an SFF node that previously sends a packet existing before processing to the SF node, and the SFF node returns a processed packet to a network. The SFF node may be a router, a switch, or another network device.

The SFF node and the SF node each may be used as a data plane on the SFC. In an embodiment, the SFF node and the SF node may establish a tunnel, and the SFF node and the SF node may transmit a packet through the tunnel. The tunnel may be a virtual extensible local area network (VXLAN), a generic routing encapsulation (GRE) tunnel, a mobile IP-in-IP (IP-in-IP) encapsulation tunnel, or the like. In another embodiment, the SFF node and the SF node may not transmit a packet through a tunnel, but may directly transmit an IP packet or an Ethernet packet.

The data plane on the SFC may be controlled by a control plane on the SFC. The control plane on the SFC may include one or more SFC controllers. For example, refer to FIG. 1. The SFC controller may be an SDN controller, an NFV management node 1, or an NFV management node 1. In an embodiment, before packet transmission, a client on the SFC may send information such as an attribute, a configuration, and a policy of the service function chain to the SFC controller, and the SFC controller may generate information about the service function chain based on the information sent by the client and a topology of the SFC, for example, a classification rule of a packet to enter the SFC and an identifier of each SF node corresponding to the service function chain, and send the information about the service function chain to the traffic classifier and another node on the SFC, so that the traffic classifier classifies received packets and adds SFC information based on the information sent by the SFC controller.

It should be understood that a type of each node in the system architecture of the SFC shown in FIG. 1 is optional. In this embodiment of this application, there may be more types of nodes in the system architecture of the SFC than those shown in FIG. 1. In this case, the system architecture of the SFC may further include another type of node. Alternatively, there may be fewer types of nodes in the system architecture of the SFC than those shown in FIG. 1. The type of the node in the system architecture of the SFC is not limited in this embodiment of this application.

It should be understood that a quantity of nodes in the system architecture of the SFC shown in FIG. 1 is optional. In this embodiment of this application, there may be more or fewer nodes in the system architecture of the SFC than those shown in FIG. 1. For example, there may be only one routing node, or there are dozens, hundreds, or more routing nodes. For another example, there are dozens, hundreds, or more SF nodes. The quantity of nodes in the system architecture of the SFC is not limited in this embodiment of this application.

The foregoing describes the system architecture of the SFC. The SFC can be combined with the SRv6 technology. A combination of the two technologies is usually referred to as an SRv6 SFC. The following describes an example of a system architecture of the SRv6 SFC.

Segment routing (SR) is a protocol designed based on source routing to forward a data packet on a network. The SR is used to divide a forwarding path into segments, allocate segment identifiers (SIDs) to the segments and nodes in the network, and arrange the SIDs in an orderly manner, to obtain a list including the SIDs. This list is usually referred to as a segment list (SID list, which is also referred to as a segment identifier list) in segment routing over internet protocol version 6 (Segment Routing over Internet Protocol Version 6, SRv6), and is usually referred to as a label stack in segment routing-multiprotocol label switching (SR-MPLS). The segment list may indicate a forwarding path. Based on the SR technology, a node and a path through which a packet carrying the SID list passes can be specified, to meet a traffic optimization requirement. For example, the packet may be compared to luggage, and the SR may be compared to a label on the luggage. If the luggage needs to be sent from a region A to a region D through a region B and a region C, a label "first to the region B, then to the region C, and finally to the region D" may be put on the luggage at an origin region, that is, the region A. In this way, at each region, only the label on the luggage needs to be identified, and the luggage is forwarded from one region to another based on the label on the luggage. Based on the SR technology, a source node adds a label to a packet, and an intermediate node may forward the packet to a next node based on the label until the packet arrives at a destination node. For example, <SID 1, SID 2, SID 3> is inserted into a packet header of the packet. In this case, the packet is first forwarded to a node corresponding to the SID 1, forwarded to a node corresponding to the SID 2, and then forwarded to a node corresponding to the SID 3.

SRv6 means that an SR technology is applied to an IPv6 network and a 128-bit IPv6 address is used as a SID. When forwarding a packet, a node that supports SRv6 queries a local SID table (local SID table, which is also referred to as a local segment identifier table or my SID table) based on a destination address (Destination Address, DA) of the packet. When the destination address of the packet matches any SID in the local SID table, the node determines that the destination address hits the local SID table, and performs a corresponding operation based on a topology, an instruction, or a service corresponding to the SID, for example, may forward the packet through an outbound interface corresponding to the SID. If the destination address of the packet does not match any SID in the local SID table, the node queries an IPv6 routing FIB based on the destination address and forwards the packet based on an entry that is hit by the destination address in the routing FIB. The local SID table is a list that includes SIDs and that is locally stored in the node. A name of the local SID table usually includes a prefix of "local (local)", to distinguish between the local SID table and a segment list carried in the packet.

In the system architecture of the SRv6 SFC, a head node in SRv6 may be a traffic classifier on the SFC, and an SRv6 node in SRv6 may be a routing node, an SFF node, a proxy node, or an SF node on the SFC. Specifically, the SFC information may be in an SRv6 encapsulation format, and the SFC information may be a segment list. SIDs in the segment list in the packet are orchestrated, so that a forwarding path of the packet on the SFC or various service processing operations to be performed on the packet can be indicated. Specifically, the segment list includes one or more SIDs arranged in sequence. Each SID is in a form of a 128-bit IPv6 address, and each SID can represent a topology, an instruction, or a service in essence. The destination address of the packet is a SID in a segment list to which an SL currently points. After receiving the packet, the node on the SFC reads the destination address of the packet and performs a forwarding operation based on the destination address. If the node that receives the packet supports SRv6, the node queries the local SID table based on the destination address. When the destination address hits a SID in the local SID table, the node performs a corresponding operation based on a topology, an instruction, or a service corresponding to the SID. When the destination address does not hit a SID in the local SID table, the node queries an IPv6 routing FIB based on the destination address and forwards the packet based on an entry that is hit by the destination address in the routing FIB. If the node that receives the packet does not support SRv6, the node directly queries the IPv6 routing FIB based on the destination address and forwards the packet.

In some scenarios, the SF node may be a node that does not support SRv6, that is, an SRv6-unaware (SRv6-unaware) node. The SF node may not identify an SRH. In this case, a proxy node can be used to ensure that the SF node that does not identify the SRH can normally process the packet.

The proxy node is configured to: identify the SRH on behalf of the SF node, strip the SRH of the packet, and forward a packet that does not include the SRH to the SF node. In this case, because the packet received by the SF node does not include the SRH, the SF node that does not support SRv6 can process the packet.

Figure 2:
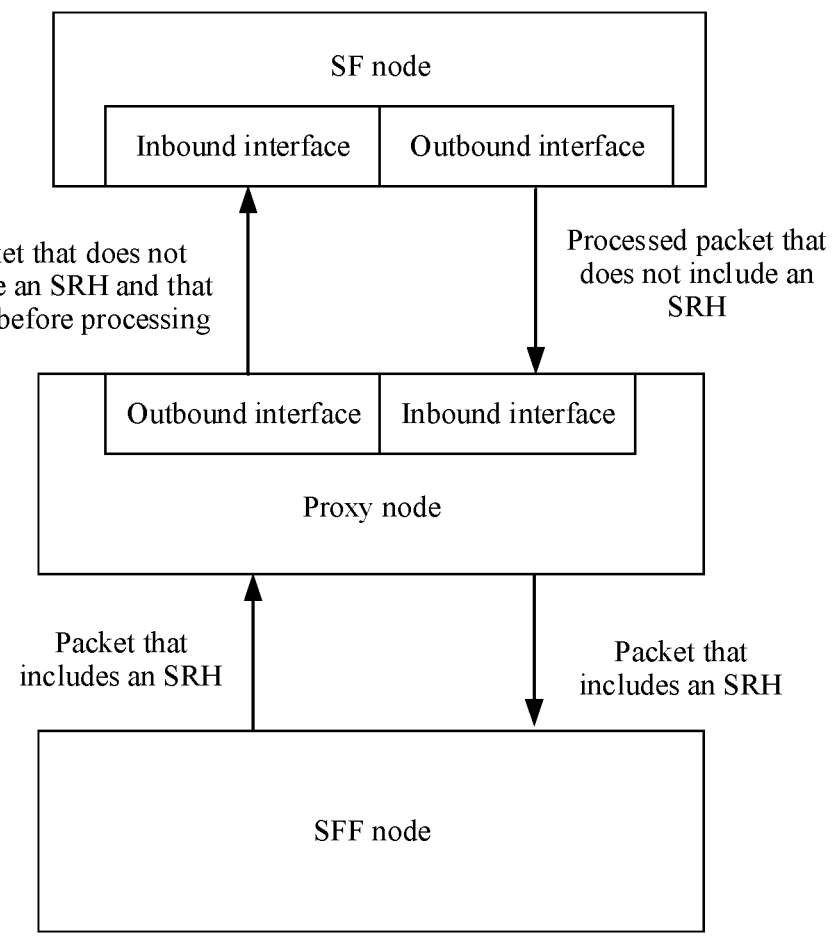
FIG. 2 is a schematic diagram of performing a proxy operation on an SRv6 SFC according to an embodiment of this application.

FIG. 2 is a schematic diagram of performing a proxy operation on an SRv6 SFC according to an embodiment of this application. A proxy node can communicate with an SFF node and an SF node, and the proxy node receives a packet that includes an SRH from the SFF node on behalf of the SF node. The proxy node strips the SRH from the packet to obtain a packet that does not include the SRH and sends, through an outbound interface, the packet that does not include the SRH. The SF node receives, through an inbound interface, the packet that does not include the SRH, processes the packet, and then sends, through the outbound interface, the packet that does not include the SRH. The proxy node receives the packet that does not include the SRH, encapsulates the SRH in the packet to obtain the packet that includes the SRH, and sends, through the outbound interface, the packet that includes the SRH, so that the packet is returned to the SFF node. The proxy node may be a network device, for example, a router or a switch, or the proxy node may be a server, a host, a personal computer, or a terminal device. The proxy nodes may include a dynamic proxy, a static proxy, a shared memory proxy, a pseudo proxy, and the like. A difference between the dynamic proxy and the static proxy lies in that the stripped SRH is cached in a dynamic proxy operation, and the stripped SRH is discarded in a static proxy operation.

It should be understood that it is merely an optional manner to dispose the SFF node and the proxy node in an integrated manner. In another embodiment, the SFF node and the proxy node may alternatively be disposed in different hardware devices. A hardware device on which the SFF node is located may communicate, through a network, with a hardware device on which the proxy node is located.

The foregoing describes the overall architecture of the SRv6 SFC. The following describes an example of an architecture of a dual-homing access system based on the SRv6 SFC. Dual-homing access may mean that an SF node is dual-homed to a proxy node, that is, a same SF node is connected to two proxy nodes. Based on dual-homing access based on the SRv6 SFC, a packet that needs to be sent to the SF node for processing can be sent from a routing node to the SF node through one proxy node or through the other proxy node. In this way, network reliability can be greatly improved through a redundant path.

Figure 3:
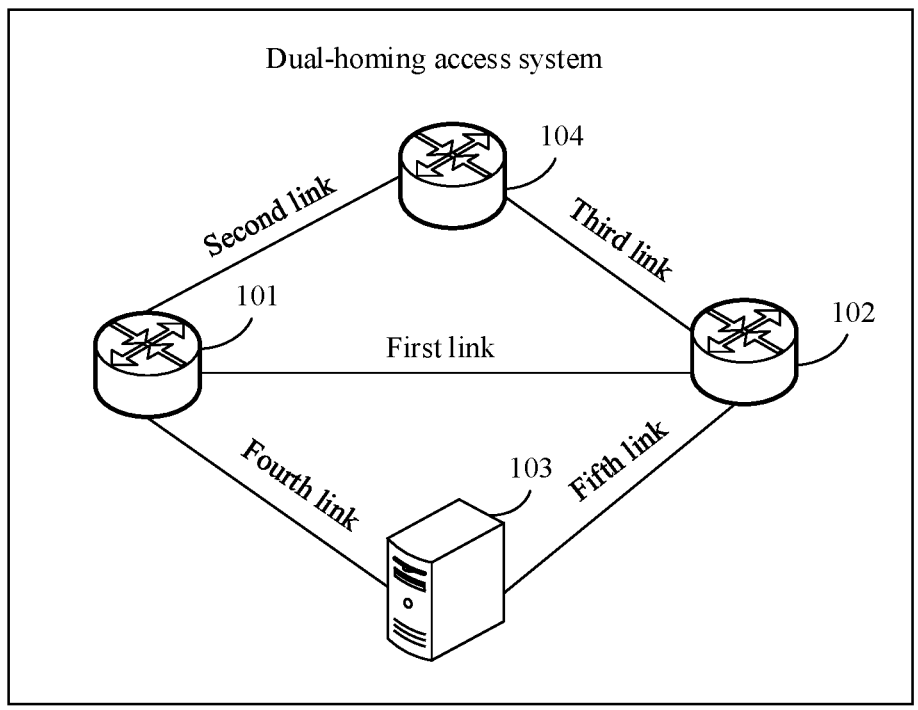
FIG. 3 is an architectural diagram of a dual-homing access system according to an embodiment of this application.

FIG. 3 is an architectural diagram of a dual-homing access system according to an embodiment of this application. The system includes a first proxy node 101, a second proxy node 102, an SF node 103, and a routing node 104. The first proxy node 101 and the second proxy node 102 are connected to a same SF node 103. Each node in the system may be a node on an SFC. For example, the first proxy node 101 may be the proxy node 1 in FIG. 1, the second proxy node 102 may be the proxy node 2 in FIG. 1, the SF node 103 may be the SF node 1 or the SF node 2 in FIG. 1, and the routing node 104 may be the routing node 2 in FIG. 1.

In the system shown in FIG. 3, different nodes may establish a link, and are connected through the link. For example, in FIG. 3, the first proxy node 101 may be connected to the second proxy node 102 through a first link, the first proxy node 101 may be connected to the routing node 104 through a second link, the routing node 104 may be connected to the second proxy node 102 through a third link, the first proxy node 101 may be connected to the SF node 103 through a fourth link, and the second proxy node 102 may be connected to the SF node 103 through a fifth link.

The first proxy node 101 and the second proxy node 102 may be nodes that have an equivalence relationship, that is, the first proxy node 101 and the second proxy node 102 have a same function or play a same role in a packet transmission process. The first proxy node 101 may be denoted as a local proxy, and the second proxy node 102 may be denoted as a peer proxy. Similarly, the second proxy node 102 may be denoted as a local proxy, and the first proxy node 101 may be denoted as a peer proxy. A link between the first proxy node 101 and the second proxy node 102 may be denoted as a peer link.

Because the first proxy node 101 and the second proxy node 102 have the equivalence relationship, usually, the routing node 104 may choose to send a received packet to the first proxy node 101, or may choose to send a received packet to the second proxy node 102. Therefore, the packet may be forwarded from the first proxy node 101 to the SF node 103, or may be forwarded from the second proxy node 102 to the SF node 103. Similarly, after processing the packet, the SF node 103 may choose to send a processed packet to the first proxy node 101, or may choose to send a processed packet to the second proxy node 102. Therefore, the processed packet may be returned from the first proxy node 101 to the routing node 104, or may be returned from the second proxy node 102 to the routing node 104. It can be learned that the SF node 103 is connected to both the first proxy node 101 and the second proxy node 102, to implement a dual-homing access function.

Dual-homing access is performed. Therefore, a load sharing function can be implemented. The first proxy node 101 may perform a dynamic proxy operation on a packet to be transmitted to the SF node 103, or the second proxy node 102 may perform a dynamic proxy operation on a packet to be transmitted to the SF node 103, so that the two proxy nodes are used to jointly perform the dynamic proxy operation, to reduce pressure of processing the packet by a single proxy node. In addition, a packet processed by the SF node 103 may be returned to the routing node 104 through the first proxy node 101, or may be returned to the routing node 104 through the second proxy node 102, so that traffic processed by the SF node 103 is offloaded, to reduce pressure of forwarding the packet by a single proxy node. In addition, the packet is transmitted on the two links, to increase transmission bandwidth and improve a transmission speed. In addition, transmission reliability can be improved. If the first proxy node 101 or the fourth link is faulty, the packet may still be returned to the routing node 104 through the second proxy node 102, or if the second proxy node 102 or the fifth link is faulty, the packet may still be returned to the routing node 104 through the first proxy node 101. This avoids a problem that packet transmission is interrupted when a single proxy node is faulty.

It should be understood that the networking mode shown in FIG. 3 is merely optional. In FIG. 3, a peer link is deployed between the first proxy node 101 and the second proxy node 102, so that network reliability can be improved. In a fault scenario, traffic arriving at the first proxy node 101 may be transmitted to the second proxy node 102 in a bypass manner through the peer link. This avoids occupying bandwidth between the routing node and the proxy node.

In another embodiment, the dual-homing access system may alternatively use another networking mode. For example, refer to FIG. 4. No peer link may be deployed between the first proxy node 101 and the second proxy node 102. This networking deployment is simple, and an outbound interface occupied by a peer link is avoided. Therefore, interface resources of the first proxy node 101 and interface resources of the second proxy node 102 are saved.

Figure 4:
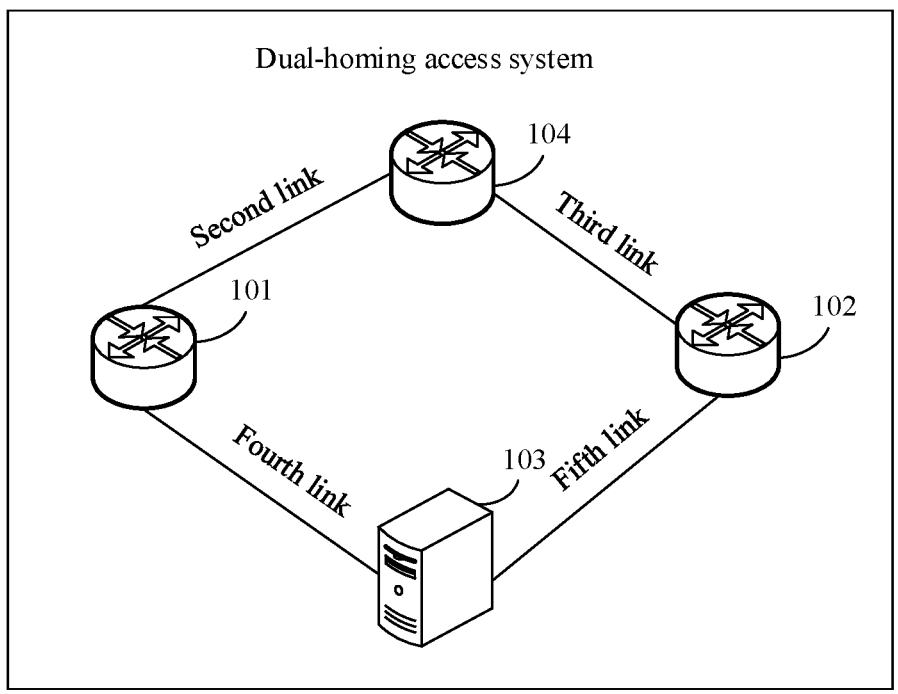
FIG. 4 is an architectural diagram of a dual-homing access system according to an embodiment of this application.

It should be understood that each link shown in FIG. 3 or FIG. 4 may be an IP link for one hop, or may be a combination of IP links for a plurality of hops. If two nodes are connected through IP links for a plurality of hops, a forwarding path between the two nodes may include one or more intermediate nodes, and the intermediate node may forward a packet between the two nodes. A quantity of hops of an IP link included in each link is not limited in this embodiment.

If two nodes are located on an IP link for one hop, it may be considered that the two nodes are on-link. From a perspective of IP routing, the two nodes are reachable through one hop. For example, if an IPv4 packet is forwarded between the two nodes, when one node sends the IPv4 packet, a time to live (TTL) value in the IPv4 packet is decreased by one, and the other node may be reached. For another example, if an IPv6 packet is forwarded between two the nodes, when one node sends the IPv6 packet, a hop limit (hop limit) in the IPv6 packet is decreased by one, and the other node may be reached.

It should be noted that, if the two nodes are located on the IP link for one hop, it does not mean that the two nodes need to be physically directly connected. If the two nodes are located on the IP link for one hop, the two nodes are physically directly connected, or certainly the two nodes are not physically directly connected. For example, when the two nodes are connected by using one or more layer 2 switches, it may also be considered that the two nodes are located on the IP link for one hop.

In addition, if the two nodes are located on IP links for a plurality of hops, it may be considered that the two nodes are off-link. From a perspective of IP routing, the two nodes are reachable through a plurality of hops.

It should be understood that the dual-homing access system described in FIG. 3 or FIG. 4 is merely optional, and two proxy nodes that have an equivalence relationship on the SFC are also merely optional. In another embodiment, the SFC may have more than two proxy nodes that have an equivalence relationship. Any proxy node may have one or more peer proxies, and any proxy node may access one or more peer links. The proxy node may be connected to a corresponding peer proxy through each peer link.

The foregoing describes the architecture of the dual-homing access system based on the SRv6 SFC. The following describes an example of a procedure of a packet transmission method based on the foregoing architecture of the system.

Figure 5A:
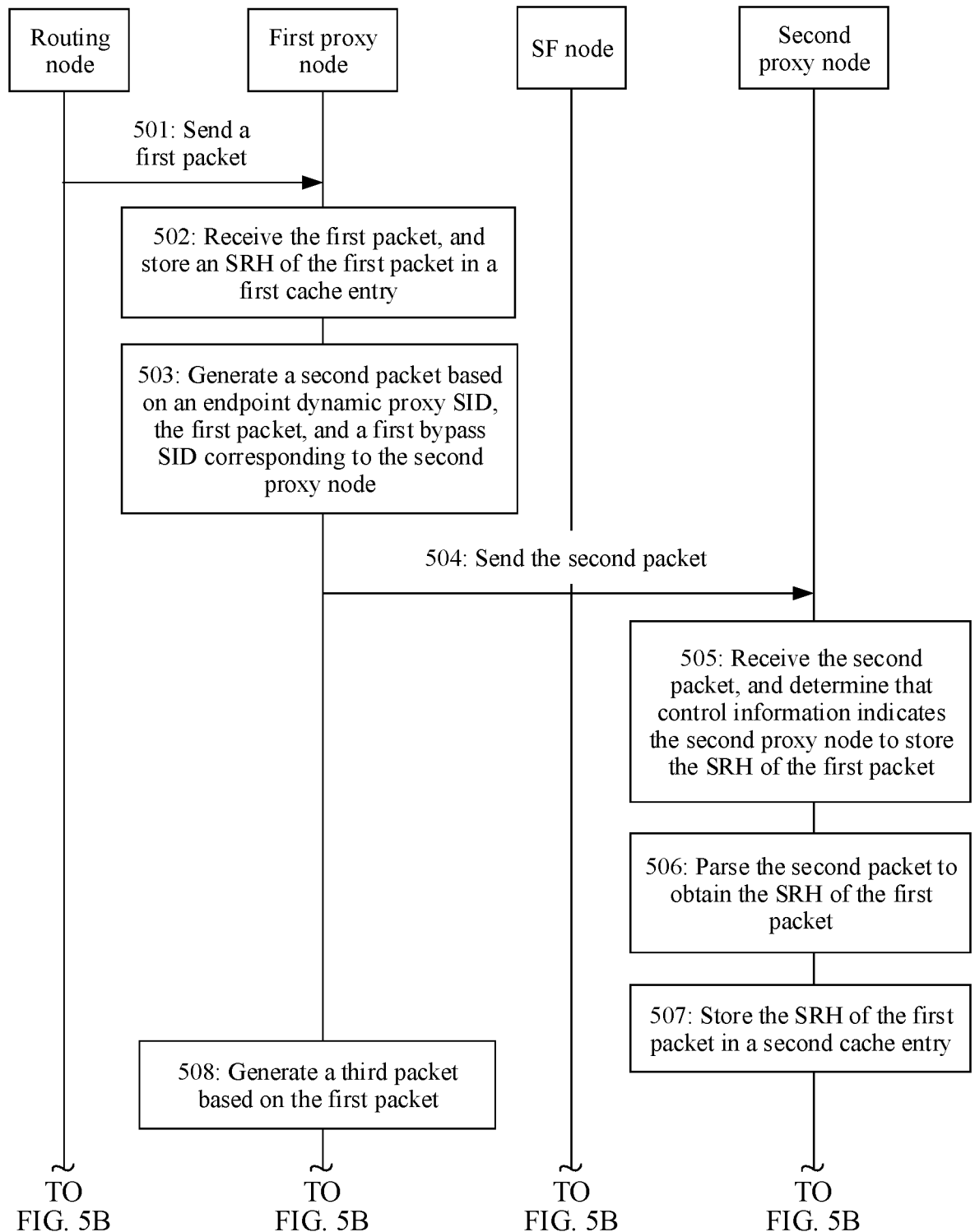
FIG. 5A and FIG. 5B are a flowchart of a packet transmission method according to an embodiment of this application.
Figure 5B:
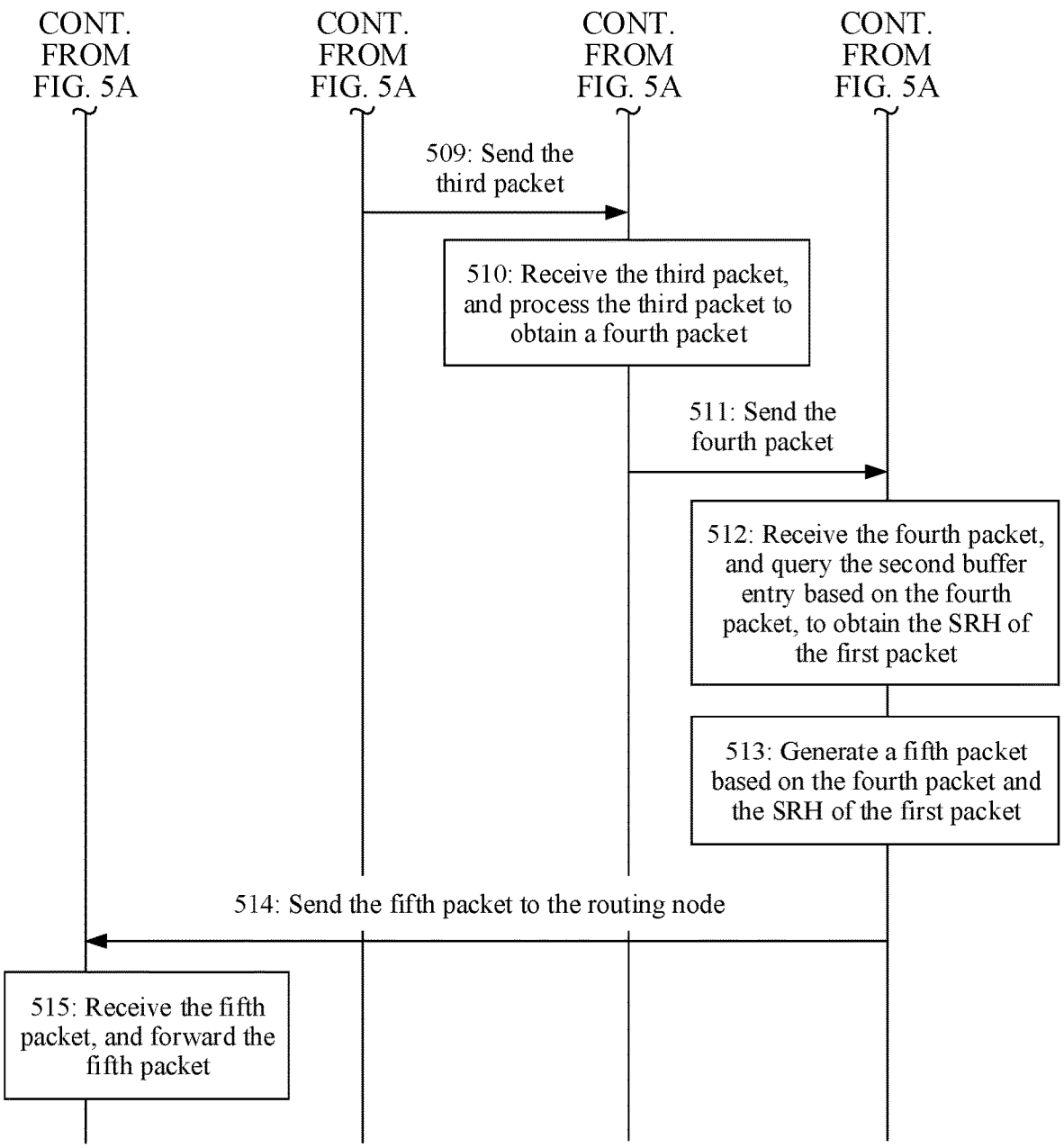

FIG. 5A and FIG. 5B are a flowchart of a packet transmission method according to an embodiment of this application. As shown in FIG. 5A and FIG. 5B, interaction bodies of the method include a first proxy node, a second proxy node, an SF node, and a routing node. The term "node" in this specification may be a device. For example, the routing node may be a network device, for example, a router or a switch. For example, the routing node may be the routing node 104 in FIG. 3 or FIG. 4. The first proxy node may be a network device, for example, a router, a switch, or a firewall. For example, the first proxy node may be the first proxy node 101 in FIG. 3 or FIG. 4. The first proxy node may alternatively be a computing device, for example, may be a host, a server, a personal computer, or another device. The second proxy node may be a network device, for example, a router, a switch, or a firewall. For example, the second proxy node may be the second proxy node 102 in FIG. 3 or FIG. 4. The second proxy node may alternatively be a computing device, for example, may be a host, a server, a personal computer, or another device. The SF node may be a computing device, for example, may be a host, a server, a personal computer, or another device. For example, the SF node may be the SF node 103 in FIG. 3 or FIG. 4. The method may include the following steps.

Step 501: The routing node sends a first packet to the first proxy node.

Figure 6:
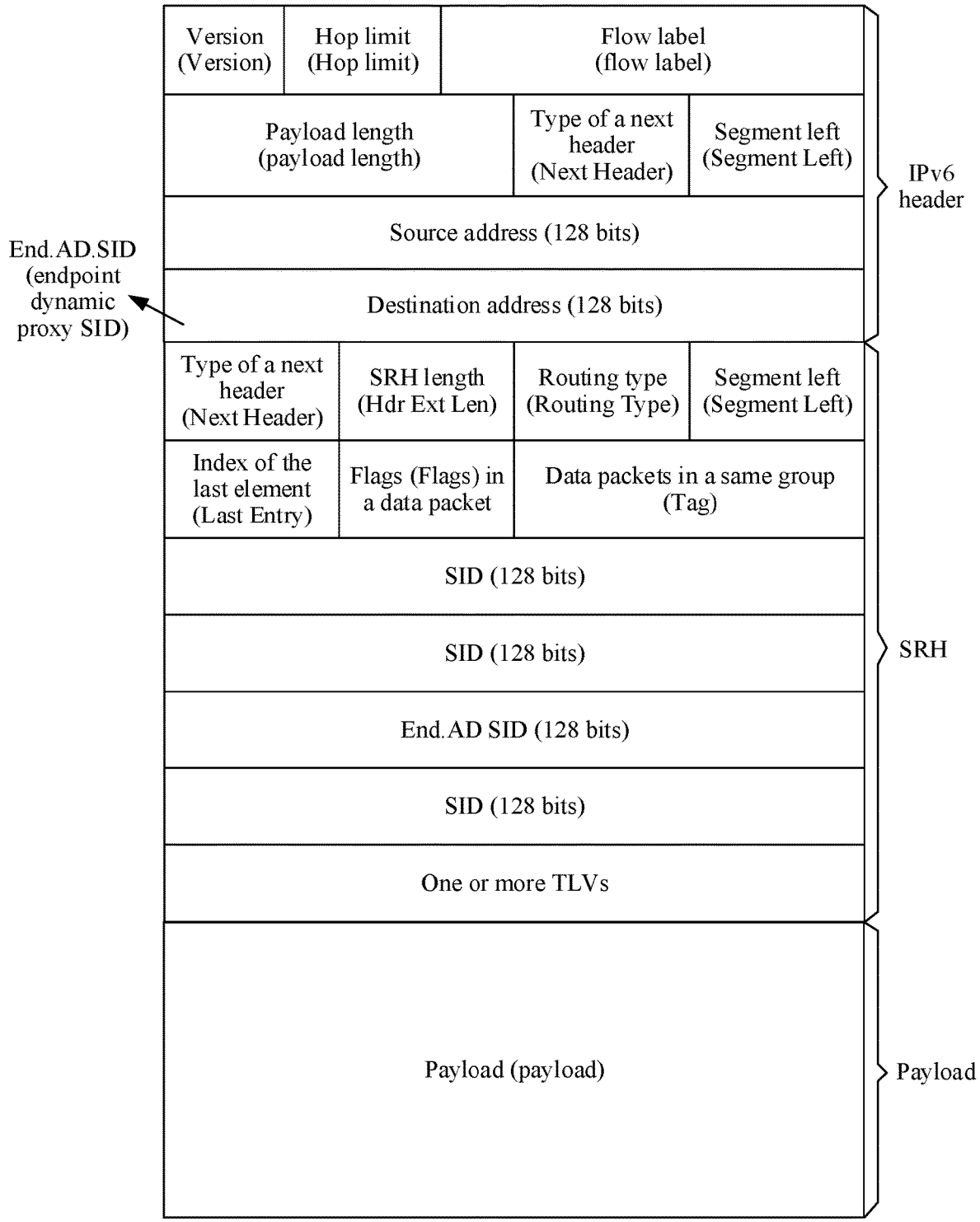
FIG. 6 is a schematic diagram of a first packet according to an embodiment of this application.

The first packet is a packet whose payload is to be processed by the SF node. FIG. 6 is a schematic diagram of a first packet according to an embodiment of this application. The first packet may be an SRv6 packet. The first packet may include an IPv6 header, an SRH, and a payload. The IPv6 header may include a source address and a destination address, the SRH may include a segment list, an SL, and one or more TLVs, and the segment list may include one or more SIDs. The payload of the first packet may be an IPv4 packet, an IPv6 packet, or an Ethernet frame. A destination address of the first packet may be used to carry an active SID in the segment list. The active SID is also referred to as an active segment, and is a SID that needs to be processed by an SR node that receives a packet. In SR MPLS, the active SID is an outermost label of a label stack. In IPv6, the active SID is a destination address of a packet. For example, if the segment list includes five SIDs: a SID 0, a SID 1, a SID 2, a SID 3, and a SID 4, and a value of the SL is 2, it indicates that two SIDs that are not executed in the segment list are the SID 0 and the SID 1, a currently executed SID in the segment list is the SID 2, and two executed SIDs in the segment list are the SID 3 and the SID 4. In this embodiment, the destination address of the first packet may be an endpoint dynamic proxy SID (End.AD SID, where AD represents a dynamic proxy). That is, the active SID of the first packet may be the End.AD SID.

The source address in the IPv6 header of the first packet may be used to identify a device that encapsulates the SRH. For example, the source address may be an address of a traffic classifier, or the source address may be an address of a head node. Optionally, the IPv6 header of the first packet may not carry the source address.

It should be understood that FIG. 6 is merely an example of the first packet. In this embodiment of this application, a quantity of fields in the first packet may be greater than or less than that shown in FIG. 6, and a type of a field in the first packet may be more than or fewer than that shown in FIG. 6. In addition, a location and a length of each field in the first packet shown in FIG. 6 may be adaptively changed based on an actual requirement. A location of each field in the packet and a length of each field in the packet are not limited in this embodiment.

The End.AD SID is used to indicate the first proxy node or the second proxy node to perform a dynamic proxy operation. The dynamic proxy operation is also referred to as an End.AD operation, and the dynamic proxy operation may specifically include operations such as stripping an SRH of a packet, caching the SRH of the packet, and sending a packet from which the SRH is stripped. The End.AD SID may be pre-configured on the first proxy node or the second proxy node, and the End.AD SID may be pre-stored in a local SID table of the first proxy node or the second proxy node. The End.AD SID may be published to a network by the first proxy node or the second proxy node. The traffic classifier may receive the published End.AD SID, and add the End.AD SID to the packet, so that after the packet that carries the End.AD SID is forwarded to the first proxy node or the second proxy node, the first proxy node or the second proxy node is triggered to perform a dynamic proxy operation on the packet.

A manner of sending the first packet by the routing node may be a flow-based manner or a packet-based manner. The manner of sending the first packet is not limited in this embodiment.

Step 502: The first proxy node receives the first packet from the routing node, and the first proxy node stores the SRH of the first packet in a first cache entry.

For an operation performed by the first proxy node on the first packet, in an embodiment, the first proxy node may read the destination address of the first packet, and the first proxy node may query a local SID table based on the destination address of the first packet, to determine whether the destination address matches a SID in the local SID table. When the destination address matches the End.AD SID in the local SID table, that is, the destination address hits the End.AD SID in the local SID table, the first proxy node may determine that the first packet is an SRv6 packet, and perform a dynamic proxy operation corresponding to the End.AD SID.

The first cache entry is a cache entry used by the first proxy node to store the SRH of the first packet. The first proxy node may include an interface board, the interface board may include a forwarding entry memory, and the first cache entry may be stored in the forwarding entry memory. In an embodiment, the first proxy node may detect whether the SRH of the first packet is already stored in a cache. If the SRH of the first packet is not stored in the cache, the first proxy node allocates a cache entry to the SRH of the first packet, to obtain the first cache entry, and stores the SRH of the first packet in the first cache entry. In addition, if the first proxy node detects that the SRH of the first packet is stored in the cache, the first proxy node may skip the step of storing the SRH of the first packet.

A manner of detecting whether the SRH of the first packet is already stored in the cache may include: The first proxy node compares an SRH in each cache entry with the SRH of the first packet, and if the SRH in any cache entry is the same as the SRH of the first packet, determines that the SRH of the first packet is stored in the cache entry; or if the SRH in each cache entry is different from the SRH of the first packet, determines that the SRH of the first packet is not stored in the cache, and needs to update the cache to store the SRH of the first packet. In an embodiment, the first proxy node may compare all content of the SRH in the cache entry with all content of the SRH of the first packet, or may compare some content of the SRH in the cache entry with some content of the SRH of the first packet, and may compare a hash value of the SRH in the cache entry with a hash value of the SRH of the first packet. A comparison manner is not limited in this embodiment.

In an embodiment, a manner of storing the SRH of the first packet may include any one of the following storage manners 1 to 3.

Storage manner 1: The first proxy node may obtain a flow identifier corresponding to the first packet, and store the SRH of the first packet by using the flow identifier corresponding to the first packet as an index. If the first proxy node may store the SRH of the first packet in a key-value storage manner, the flow identifier is a key, and the SRH of the first packet is a value.

The flow identifier is used to identify a data flow to which a packet belongs. Packets in a same data flow correspond to a same flow identifier, and the flow identifier may be one or more values of one or more fields in the packet. For example, the flow identifier corresponding to the first packet may be a 5-tuple, MAC frame header information, or application layer information of the first packet. The 5-tuple may include a source IP address, a source port number, a destination IP address, a destination port number, and a transport layer protocol number of the packet. The MAC frame header information may include a source MAC address, a destination MAC address, an Ethernet type, and a VLAN tag of the packet. The application layer information may be one or more values of one or more fields in a payload of the packet.

Storage manner 2: The first proxy node may obtain an identifier of the first cache entry, and store the SRH of the first packet by using the identifier of the first cache entry as an index. If the first proxy node may store the SRH of the first packet in a key-value storage manner, the identifier of the first cache entry is a key, and the SRH of the first packet is a value. In addition, if the storage manner 2 is used, for a packet transmission procedure, reference may be made to the following embodiment shown in FIG. 36A and FIG. 36B and the following embodiment shown in FIG. 37A and FIG. 37B.

Storage manner 3: The first proxy node may store the SRH of the first packet by using a flow identifier corresponding to the first packet and the End.AD SID as indexes. If the first proxy node may store the SRH of the first packet in a key-value storage manner, a combination of the flow identifier and the End.AD SID is a key, and the SRH of the first packet is a value. In addition, if the storage manner 3 is used, for a packet transmission procedure, reference may be made to the following embodiment shown in FIG. 38A and FIG. 38B and the following embodiment shown in FIG. 39A and FIG. 39B.

Step 502 is performed, so that the SRH of the first packet can be stored in the first proxy node. In this case, if the SF node or the second proxy node sends a packet that does not include the SRH to the first proxy node in a subsequent process, the first proxy node may find the SRH of the first packet from a pre-stored cache, to restore the SRH.

Step 503: The first proxy node generates a second packet based on the endpoint dynamic proxy SID, the first packet, and a first bypass SID corresponding to the second proxy node.

The second packet is a packet used to transmit the SRH of the first packet to a peer proxy node. In this embodiment, the second packet may be a control packet. The second packet may include the first bypass SID, control information, and the SRH of the first packet. A source address of the second packet may be a second bypass SID corresponding to the first proxy node or other information that can identify the first proxy node. The second packet may be an SRv6 packet, and the second packet may include an IPv6 header, an SRH, and a payload. The IPv6 header may include the source address of the second packet and a destination address of the second packet. The SRH of the second packet may include each SID in the SRH of the first packet and the first bypass SID. The payload of the second packet may be the payload of the first packet. It should be noted that it is an optional manner that the second packet includes the payload of the first packet. In another embodiment, the second packet may not include the payload of the first packet. A source address of the IPv6 header of the second packet may be the second bypass SID corresponding to the first proxy node, and the second bypass SID is used to identify that a source node of the second packet is the first proxy node.

In an optional embodiment, a processing policy corresponding to the End.AD SID may be pre-configured on the first proxy node. The processing policy may include: performing a dynamic proxy operation and an operation of generating and sending the second packet. Therefore, after receiving the first packet, based on the End.AD SID in the first packet, the first proxy node performs step 502, step 508, and step 509 to provide a dynamic proxy service, and also performs step 503 and step 504 to control the second proxy node to store the SRH. In this manner, a capability of performing programming by using the SID in SRv6 is fully utilized, and an operation corresponding to the End.AD SID is extended.

In a process of configuring the End.AD SID, in an embodiment, a configuration operation may be performed on the first proxy node in advance. The first proxy node may receive a configuration instruction, and obtain the End.AD SID from the configuration instruction. The first proxy node may store the End.AD SID, for example, store the End.AD SID in a local SID table of the first proxy node. Similarly, a configuration operation may be performed on the second proxy node in advance. The second proxy node may receive a configuration instruction, and obtain the End.AD SID from the configuration instruction. The second proxy node may store the End.AD SID, for example, store the End.AD SID in a local SID table of the second proxy node. The configuration operation may be performed by a user on the first proxy node or the second proxy node, or may be performed by a control plane on the SFC, for example, an SDN controller or an NFVM. This is not limited in this embodiment.

In an embodiment, the first proxy node and the second proxy node may be in an anycast endpoint dynamic proxy SID (anycast End.AD SID) relationship. Anycast, also referred to as floodcast, is a communication mode in Ipv6, and means that a same address is used to identify a group of nodes that provide a same or corresponding service, so that a packet that uses this address as a destination address can be routed to any node in the group of nodes. In this embodiment, a same End.AD SID may be allocated to the first proxy node and the second proxy node, so that the End.AD SID configured on the first proxy node is the same as the End.AD SID configured on the second proxy node. In this case, if the routing node receives the packet whose destination address is the End. AD SID, the routing node may send the packet to the first proxy node, or may send the packet to the second proxy node. Therefore, a dynamic proxy operation may be performed on the packet by using the first proxy node, or a dynamic proxy operation may be performed on the packet by using the second proxy node, to facilitate implementation of a dual-homing access function. In addition, a corresponding anycast index (anycast index) may be configured for an anycast End.AD SID. The anycast index is used to identify End.AD SIDs of a same group of nodes that have an anycast relationship. For a same End.AD SID, an anycast index configured for the End.AD SID on the first proxy node may be the same as an anycast index configured for the End.AD SID on the second proxy node.

For example, the first proxy node may receive the following configuration instructions, to configure the End.AD SID as an anycast End.AD SID, and configure an anycast index corresponding to the End.AD SID.

[proxy1]segment-routing ipv6
[proxy1—segment-routing-ipv6] locator t1 ipv6-prefix A::1 64 static 32
[proxy1—segment-routing-ipv6-locator]opcode ::2 end-ad anycast-index 10
[proxy1—segment-routing-ipv6-locator-endad] encapsulation ip ipv4 outbound Ethernet1/0/0 next-hop 1.1.1.1 inbound Ethernet1/0/1

In the foregoing configuration instructions, proxy1 represents the first proxy node; the first row of configuration instruction means that IPv6 SR needs to be configured; the second row of configuration instruction means that the Locator (locator information) is t1, the IPv6 prefix is A::1 64, and the static routing is 32; the third row of configuration instruction means that the Locator of the IPv6 SR is configured, the operation code is ::2, and the anycast index corresponding to the End.AD SID is 10; and the fourth row of configuration instruction means that the End.AD SID of the IPv6 SR is configured, the IPv4 packet is obtained through encapsulation, the IPv4 packet is sent by using an Ethernet port 0 with a slot 1 and a subboard 0 as the outbound interface, the next-hop address is 1.1.1.1, and the inbound interface is an Ethernet port 1 with a slot 1 and a subboard 0. A scenario reflected in the foregoing configuration instructions is that the payload of the first packet is the IPv4 packet, and a manner of generating a third packet by the proxy node is obtaining the IPv4 packet carried in the first packet, and using the IPv4 packet as the third packet.

The bypass SID is a new SID provided in this embodiment. The bypass SID is used to identify that a destination node of the packet is a peer proxy node. A local proxy node may use the packet to carry the bypass SID to send the packet to the peer proxy node, that is, send the packet of the local proxy to the peer proxy. Specifically, the local proxy node uses the packet to carry the bypass SID of the peer proxy node to transmit the packet to the peer proxy node, so as to implement a function of transmitting the packet from the local end to the peer proxy node in a bypass manner. The bypass SID may be referred to as an End.ADB SID, and the End.ADB SID is a bypass SID for End.AD SID (is a SID that has a bypass function and that is extended through a dynamic proxy operation). A name of the End.ADB SID may be considered as a combination of "End.AD SID" and "B", where "B" in "ADB" represents bypass. The bypass SID may be in a form of an IPv6 address, and the bypass SID may include 128 bits. The bypass SID may include locator information (Locator) and function information (Function), and a format of the bypass SID is Locator:Function. The Locator occupies a high bit of the bypass SID, and the Function occupies a low bit of the bypass SID. Optionally, the bypass SID may further include arguments information (Arguments), and a format of the bypass SID is Locator:Function:Arguments.

In an embodiment, the bypass SID may be a node SID, and each bypass SID may uniquely correspond to one proxy node. If the system architecture of the SFC includes a plurality of proxy nodes, there may be a plurality of bypass SIDs. Each bypass SID corresponds to one of the plurality of proxy nodes. In this way, a packet that carries one bypass SID can be uniquely routed to one proxy node, and is sent to a proxy node corresponding to the bypass SID. In this embodiment, the architecture of the dual-homing access system is used as an example for description. The system includes the first proxy node and the second proxy node. For ease of differentiation and description, a bypass SID corresponding to the second proxy node is referred to as the first bypass SID. The first bypass SID is used to send the packet to the second proxy node. The first bypass SID may be published to the network by the first proxy node. In this case, another node on the SFC may receive the published first bypass SID. In addition, similarly, a bypass SID corresponding to the first proxy node is referred to as the second bypass SID. The second bypass SID is used to send the packet to the first proxy node. The second bypass SID may be published to the network by the second proxy node. In this case, another node on the SFC may receive the published second bypass SID.

For a manner of obtaining the first bypass SID by the first proxy node, a configuration operation may be performed on the first proxy node in advance. The first proxy node may receive a configuration instruction, and obtain the first bypass SID from the configuration instruction. The first proxy node may store the first bypass SID, for example, store the first bypass SID in a local SID table of the first proxy node. When receiving the first packet, the first proxy node may read the pre-stored first bypass SID, to obtain the first bypass SID. The configuration operation may be performed by the user on the first proxy node, or may be performed by a network controller, for example, an SDN controller or an NFVM. This is not limited in this embodiment.

For example, the first proxy node may receive the following configuration instructions:
[proxy1] segment-routing ipv6
[proxy1—segment-routing-ipv6] locator t2 ipv6-prefix B:: 64 static 32
[proxy1—segment-routing-ipv6-locator] opcode ::1 end-adb peer-sid C::2

In the foregoing configuration instructions, proxy1 represents the first proxy node; the first row of configuration instruction means that IPv6 SR needs to be configured; the second row of configuration instruction means that the Locator (locator information) is t2, the IPv6 prefix is B:: 64, and the static routing is 32; and the third row of configuration instruction means that the operation code is ::1, and the first bypass SID corresponding to the second proxy node is C::2.

Similarly, a configuration operation may be performed on the second proxy node in advance. The second proxy node may receive a configuration instruction, and obtain the second bypass SID from the configuration instruction, for example, store the second bypass SID in a local SID table of the second proxy node. For example, the second proxy node may receive the following configuration instructions:
[proxy2] segment-routing ipv6
[proxy2—segment-routing-ipv6] locator t2 ipv6-prefix C:: 64 static 10
[proxy2—segment-routing-ipv6-locator] opcode ::2 end-adb peer-sid B::1

In the foregoing configuration instructions, proxy2 represents the second proxy node; the first row of configuration instruction means that IPv6 SR needs to be configured; the second row of configuration instruction means that the Locator (locator information) is t2, the IPv6 prefix is C:: 64, and the static routing is 10; and the third row of configuration instruction means that the operation code is ::2, and the second bypass SID corresponding to the first proxy node is B::1.

It should be noted that the bypass SIDs configured on the first proxy node and the second proxy node may be in a mutual reference relationship. To be specific, the first bypass SID configured on the first proxy node references the second proxy node, to indicate that the first bypass SID is used to transmit the packet to the second proxy node. Similarly, the second bypass SID configured on the second proxy node references the first proxy node, to indicate that the second bypass SID is used to transmit the packet to the first proxy node.

It should be understood that a one-to-one correspondence between the bypass SID and the proxy node is merely an example. In another embodiment, there may alternatively be another correspondence between the bypass SID and the proxy node. This is not limited in this embodiment.

The control information is used to indicate the second proxy node to store the SRH of the first packet. In an embodiment, the control information may include a first flag and a second flag. The first flag is used to identify whether the packet is a copied packet. For example, the first flag may be denoted as a copy flag (Copy flag, C-flag). The second packet may include a copy flag field, and the first flag may be carried in the copy flag field. For example, a length of the first flag may be 1 bit. Optionally, in the embodiment in FIG. 5A and FIG. 5B, the second packet may be a packet obtained by encapsulating a copy of the first packet. Therefore, the first flag may be set to 1, and the first flag may identify that the second packet is the copied packet. The second flag is used to identify whether the packet is an acknowledgment packet. For example, the second flag may be denoted as an acknowledgment flag (acknowledgment flag, A-flag). The second packet may include an acknowledgment flag field, and the second flag may be carried in the acknowledgment flag field. For example, a length of the second flag may be 1 bit. Optionally, in the embodiment in FIG. 5A and FIG. 5B, the second flag may be set to 0, and the second flag may identify that the second packet is not an acknowledgment packet.

The control information may be carried at any location in the second packet. For example, a location of the control information may include any one of the following (1) to (4).

(1) The control information is carried in an extension header of the second packet.

The extension header may include two types: a hop-by-hop option header (hop-by-hop option header) and a destination option header (destination option header). As specified in the protocol, if the packet carries a routing header (routing header), the destination option header may include two locations: One location is that the destination option header is before the routing header. In this case, the extension header is parsed by anode specified in the routing header. The other location is that the destination option header is after the routing header. In this case, the extension header is parsed by a final destination node of the packet.

In an embodiment, the extension header of the second packet may be the destination option header, the destination option header may be located before the SRH, and the control information may be carried in the destination option header. In this manner, because the second packet includes the SRH of the first packet, and the SRH is a type of the routing header, the second proxy node specified in the SRH may parse the extension header, so that the second proxy node reads the control information in the extension header, to store the SRH based on the control information.

FIG. 7 is a schematic diagram of an extension header according to an embodiment of this application. The extension header may include one or more of the following fields:

1. Type of a next header: A packet may further include one or more extension headers or one or more higher-layer headers after the extension header, and the next header is used to indicate a type of the extension header or the higher-layer header after the extension header of the packet. A length of the next header may be 1 byte.

2. Header extended length (header Extended Length, Hdr Ext Len): The header extended length is used to indicate a length of the extension header. The length indicated by Hdr Ext Len does not include the first 8 bytes of the extension header, that is, the length indicated by Hdr Ext Len is a length from the ninth byte to the last byte of the extension header. Hdr Ext Len may be in a unit of 8 bytes. A value of Hdr Ext Len may be set to 2.

3. Option Type (OptType): The option type is used to indicate a type of an option in the extension header. A length of the option type may be 1 byte. The option type may be a standardized experimental type, so that different vendors can communicate with each other, or the option type may be an experimental option type. For example, a value of the experimental option type may include 0x1E, 0x3E, 0x5E, 0x7E, 0x9E, 0xBE, 0xDE, or 0xFE. As specified in the protocol, two bits of two most significant digits in the option type define a processing action performed when an unidentified option is received, and a bit of the third most significant digit in the option type indicates whether data of the option is allowed to be modified in a forwarding process. In this embodiment, the value of the option type of the extension header may be set to 0x1E. If two bits of two most significant digits in the option type are 00, it indicates that if the option is received and is not identified, the option is ignored and a remaining part of the packet continues to be processed. The third most significant bit in the option type indicates that the data of the option is allowed to be modified in the forwarding process. 4. Option length (OptLen): The option length is used to indicate a length of an option in the extension header. For example, in FIG. 7, the length indicated by OptLen may be a length from the first byte following OptLen to the last byte of the option in the extension header. A value of OptLen may be set to 20.

5. Suboption type (SubOptType): An option may be in a nested structure. One option may include one or more suboptions. A value of the suboption type may be set to 1. This value indicates that the suboption is used for information synchronization to be performed between two nodes that support an SRv6 SFC dynamic proxy operation, that is, SRH synchronization.

6. Suboption Length (SubOptLen): The suboption length is used to indicate a length of a data part of a suboption. A length of SubOptLen is 1 byte, and SubOptLen may be in a unit of a byte. A value of the suboption length may be set to 20.

7. Reserved field (reserved1): A length of the reserved field is 1 byte. A transmit end may set a value of the reserved field to 0, and a receive end may ignore the reserved field.

8. Target board (TB) index: The target board index is a hardware index of a board that generates a cache entry, and a length of the target board index is 1 byte. The TB index may be set when an N-flag is set to 1. The TB index may be set to 0 if an N-flag is default.

9. Flag field (flags): The flag field is a currently undefined reserved flag field, and a length of the flag field may be 28 bits. A transmit end may set a value of the reserved field to 0, and a receive end may ignore the reserved field.

10. First flag: The first flag is used to identify whether a packet is a copied packet, and may be denoted as a copy flag, C, or a C-flag. A length of the first flag may be 1 bit. If a value of the first flag is set to 1, it may indicate that the packet is the copied packet, and is usually a control packet. For example, the packet is a second packet or a sixth packet forwarded in a normal scenario. If a value of the first flag is set to 0, it may indicate that the packet is not the copied packet, and is usually a data packet. For example, the packet is a second packet forwarded in a fault scenario. For a procedure of transmitting the second packet in the normal scenario, refer to the embodiment in FIG. 5A and FIG. 5B. For a procedure of transmitting the second packet in the fault scenario, refer to the following embodiment in FIG. 41A and FIG. 41B.

11. Second flag: The second flag is used to identify whether a packet is an acknowledgment packet, and may be denoted as an acknowledgment flag, A, or an A-flag. A length of the second flag may be 1 bit. If a value of the second flag is set to 1, it may indicate that the packet is the acknowledgment packet, for example, the packet is a sixth packet. If a value of the second flag is set to 0, it may indicate that the packet is not the acknowledgment packet, for example, the packet is a second packet forwarded in a normal scenario.

12. Third flag: The third flag is used to identify whether an SF node associated with an End.AD SID is an SF node of a NAT type, that is, whether the SF node modifies, in a packet processing process, a flow identifier corresponding to a packet, and may be denoted as a NAT flag (network address translation flag), N, a NAT flag, or an N-flag. A length of the third flag may be 1 bit. If the SF node associated with the End.AD SID is the SF node of the NAT type, a value of the third flag may be set to 1. If the third flag is default, the third flag may be set to 0. If the value of the third flag is set to 1, a TB field and a cache index field may be set.

13. Cache index: The cache index is used to carry an identifier of the cache entry. A length of a cache index is 4 bytes. The cache index may be set when a third flag is set to 1. The cache index may be set to 0 if a third flag is default.

14. Anycast index: The anycast index is an index uniquely corresponding to an anycast End.AD SID, and a length of the anycast index is 4 bytes. A receive end may check the anycast index in the packet.

15. Reserved field (Reserved2): A length of the reserved field is 4 bytes. A transmit end sets a value of the reserved field to 0, and a receive end ignores the reserved field.

(2) The control information is carried in the first bypass SID.

FIG. 8 is a schematic diagram of using a bypass SID to carry control information according to an embodiment of this application. The bypass SID may include one or more of locator information (Locator), function information (Function), or arguments information (Arguments). The control information may be carried in the function information of the first bypass SID, or may be carried in the arguments information of the first bypass SID. The arguments information may be included in the function information. In this manner, a function of controlling the peer proxy node to store the SRH can be implemented by using the bypass SID. In this way, a quantity of extra bytes occupied by the control information in the packet is reduced, to reduce a data amount of the packet, and reduce packet transmission overheads.

(3) The control information is carried in an IP header of the second packet.

For example, the control information may be carried in an IPv6 header of the second packet. The control information may be carried in a part other than the first bypass SID in the IPv6 header. In addition, if the payload of the second packet is an IPv6 packet, that is, a form of the second packet is similar to a form of an IP-in-IP packet, and the IP-in-IP packet includes an outer IPv6 header and an inner IPv6 header, the control information may be carried in the outer IPv6 header.

(4) The control information is carried in a TLV in the SRH of the second packet.

The SRH of the second packet may include one or more TLVs, and the control information may be carried in the TLV. In this manner, a function of controlling the second proxy node to store the SRH can be implemented by using the SRH. In this way, a quantity of extra bytes occupied by the control information in the packet is reduced, to reduce a data amount of the packet, and reduce packet transmission overheads.

There may be a plurality of formats of the second packet. The format of the second packet may vary with a network topology structure and/or a requirement of the first proxy node for path planning, or may vary with a manner of carrying the control information. Examples of Implementation 1 and Implementation 2 are described below with reference to FIG. 9 to FIG. 18.

Implementation 1: The destination address of the second packet may be the first bypass SID. For example, refer to FIG. 10, FIG. 11, FIG. 12, and FIG. 13. A destination address (Destination Address, DA) field of an IPv6 header of the second packet may carry the first bypass SID.

This manner may be applied to a plurality of scenarios. Examples of Scenario 1 to Scenario 3 are described below.

Figure 9:
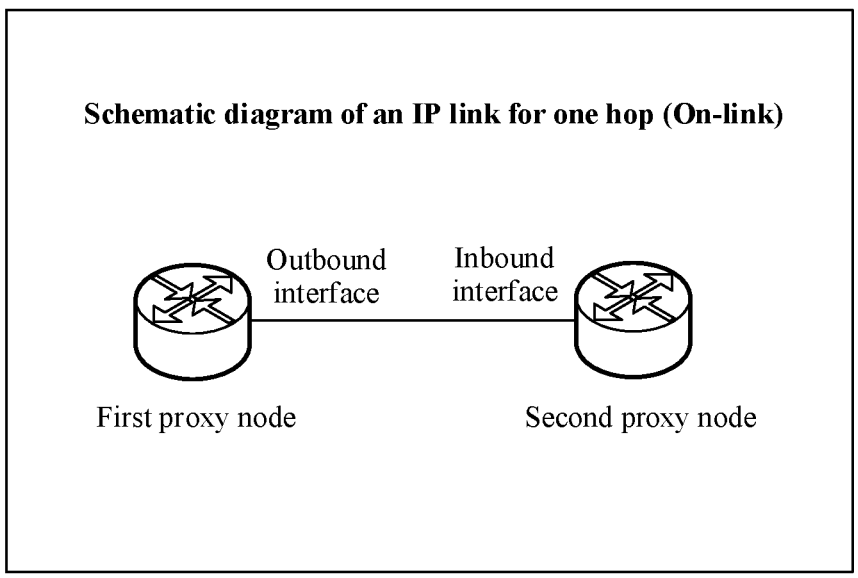
FIG. 9 is a network topology diagram of a first proxy node and a second proxy node according to an embodiment of this application.

Scenario 1: The first proxy node and the second proxy node are located on an IP link for one hop (on-link). For a specific concept of on-link, refer to the foregoing descriptions. Details are not described herein again. FIG. 9 is a schematic diagram in which a first proxy node and a second proxy node are located on an IP link for one hop.

In an SRv6 network, a destination address of an IPv6 header of an SRv6 packet is usually used to identify a next SR node that forwards a packet. Therefore, if the first proxy node and the second proxy node are located on the IP link for one hop, the first proxy node uses the destination address to carry a first bypass SID, to indicate that a next SR node of the second packet is the second proxy node Scenario 2: The first proxy node and the second proxy node are located on IP links for a plurality of hops (off-link), and an SR function is not enabled on an intermediate node between the first proxy node and the second proxy node.

For an intermediate node on which the SR function is not enabled, when receiving the second packet, the intermediate node may query a routing FIB based on the destination address (that is, the first bypass SID) of the second packet, and forward the packet based on an entry that is hit by the destination address in the routing FIB.

Scenario 3: The first proxy node and the second proxy node are located on IP links for a plurality of hops, and do not have a service requirement of specifying an intermediate node that forwards the second packet.

Scenario 3 may include a plurality of cases, and may include a case in which an SR function is enabled on the intermediate node, or may include a case in which an SR function is not enabled on the intermediate node. For example, if the IP links for a plurality of hops form a plurality of forwarding paths, and the first proxy node does not specify a forwarding path through which the second packet needs to be forwarded, regardless of whether the SR function is enabled on the intermediate node, the first bypass SID may be carried in the destination address. For another example, if the IP links for a plurality of hops form a unique forwarding path, for example, there is only one intermediate node between the first proxy node and the second proxy node, regardless of whether the SR function is enabled on the intermediate node, the first proxy node does not need to specify the intermediate node, and the second packet may still be forwarded to the second proxy node through the intermediate node.

For an intermediate node on which the SR function is enabled, when receiving the second packet, the intermediate node may query a local SID table based on the destination address, that is, the first bypass SID, of the second packet, that is, match the first bypass SID with each SID in the local SID table. Therefore, because the first bypass SID is not a SID published by the intermediate node, and is not stored in a local SID table of the intermediate node, the intermediate node determines that the first bypass SID does not hit the local SID table, and the intermediate node forwards the second packet in a conventional IP routing manner. Specifically, the intermediate node queries the routing FIB based on the first bypass SID, and forwards the second packet based on an entry that is hit by the destination address in the routing FIB.

Based on different manners of carrying the control information, there may be specifically a plurality of formats of the second packet implemented in Implementation 1. Examples of Implementation 1.1 to Implementation 1.4 are described below with reference to FIG. 10 to FIG. 13.

Figure 10:
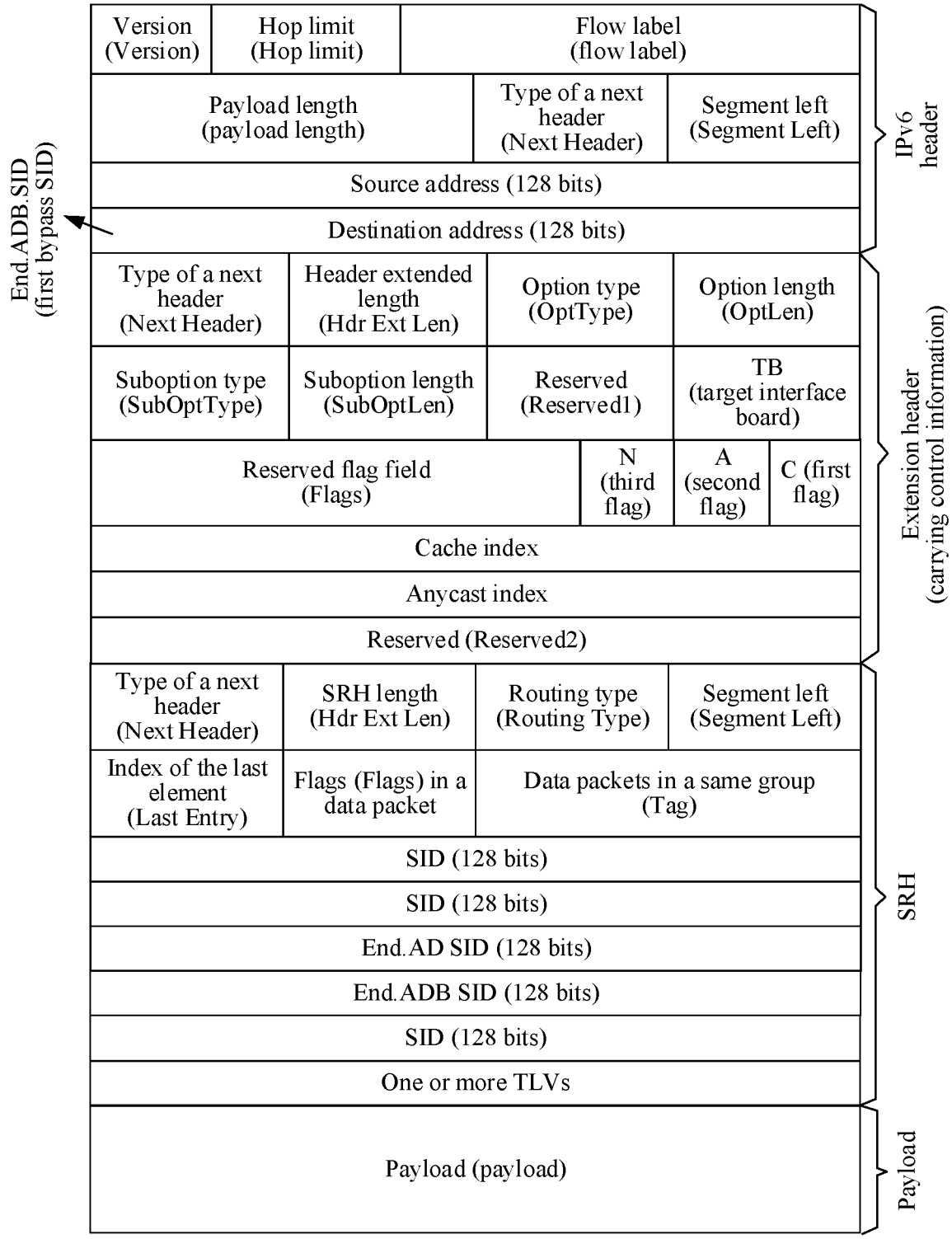
FIG. 10 is a schematic diagram of a second packet according to an embodiment of this application.

Implementation 1.1: Refer to FIG. 10. If the extension header is used to carry the control information, a format of the second packet may be shown in FIG. 10. The second packet includes an IPv6 header, an extension header, an SRH, and a payload, and the extension header may be located between the IPv6 header and the SRH.

Figure 11:
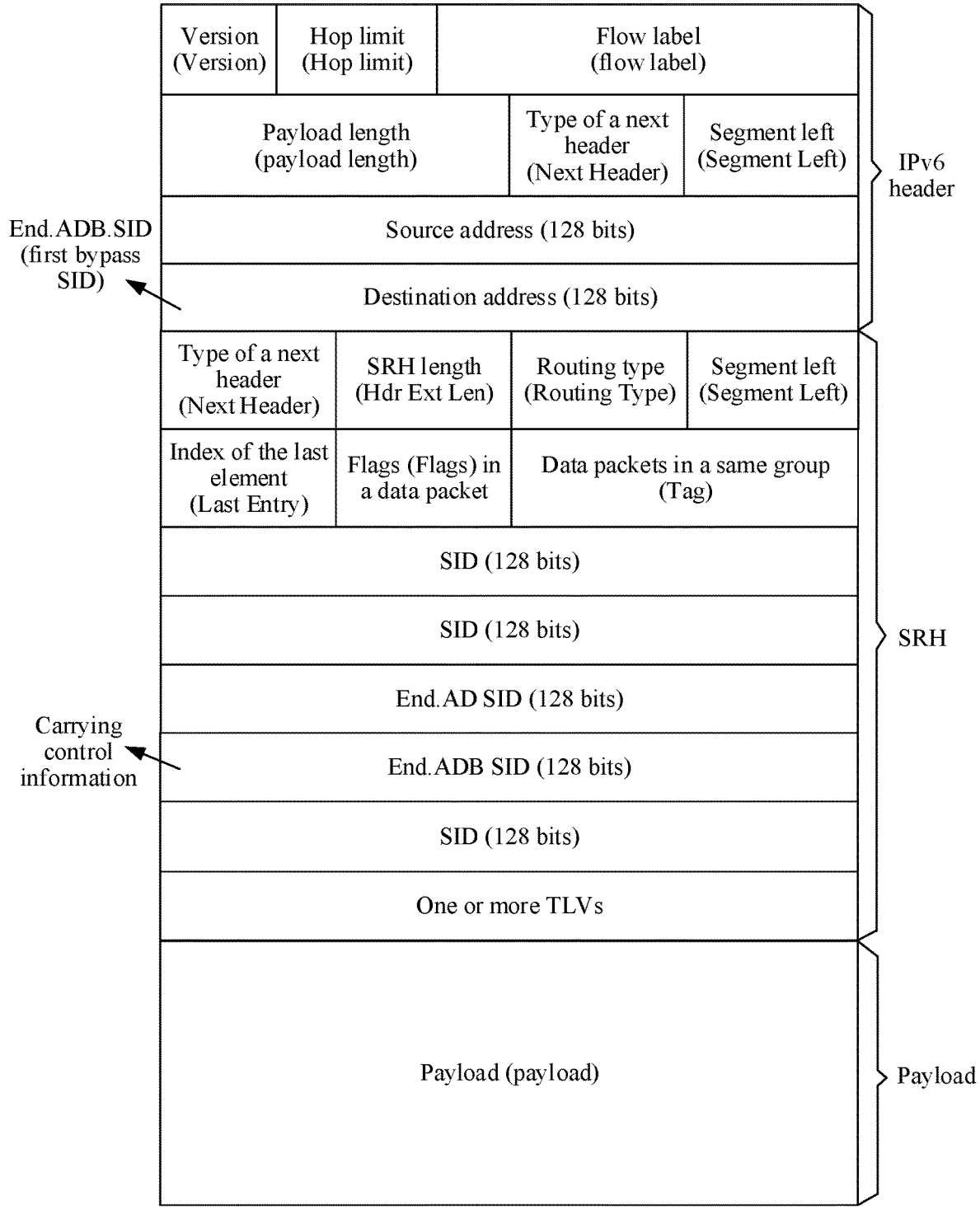
FIG. 11 is a schematic diagram of a second packet according to an embodiment of this application.

Implementation 1.2: Refer to FIG. 11. If the first bypass SID (that is, an End.ADB SID in the figure) is used to carry the control information, a format of the second packet may be shown in FIG. 11. The second packet includes an IPv6 header, an SRH, and a payload. It can be learned from comparison between FIG. 10 and FIG. 11 that in Implementation 1.2, a length of the second packet is reduced, and a function of compressing the second packet can be implemented.

Figure 12:
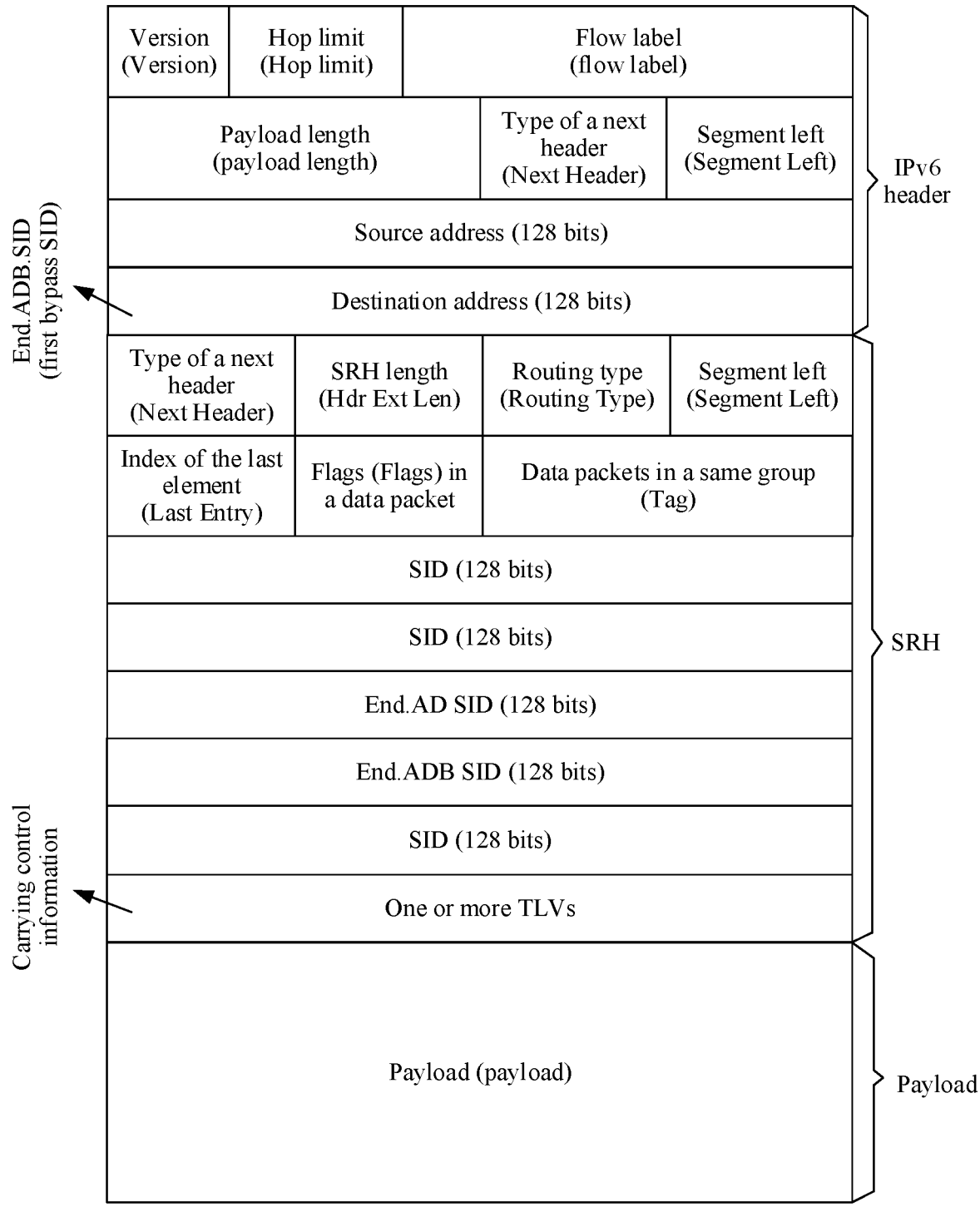
FIG. 12 is a schematic diagram of a second packet according to an embodiment of this application.

Implementation 1.3: Refer to FIG. 12. If the TLV in the SRH is used to carry the control information, a format of the second packet may be shown in FIG. 12. The second packet includes an IPv6 header, an SRH, and a payload.

Figure 13:
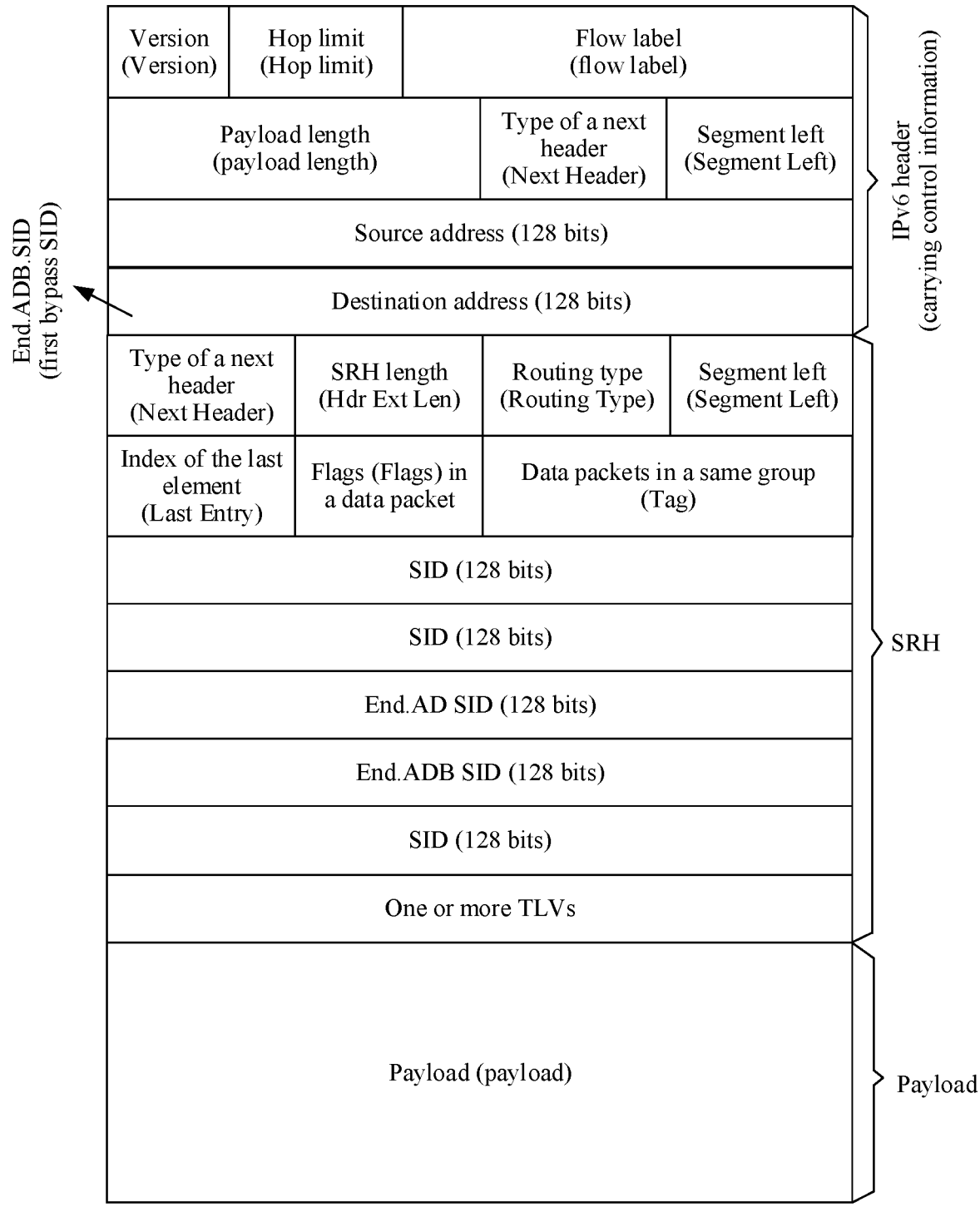
FIG. 13 is a schematic diagram of a second packet according to an embodiment of this application.

Implementation 1.4: Refer to FIG. 13. If the IPv6 header is used to carry the control information, a format of the second packet may be shown in FIG. 13. The second packet includes an IPv6 header, an SRH, and a payload.

Implementation 2: The destination address of the second packet may be a SID corresponding to a next SR node. For example, refer to FIG. 15, FIG. 16, FIG. 17, and FIG. 18. A destination address (DA) field of an IPv6 header of the second packet may carry the SID corresponding to the next SR node. The SID corresponding to the next SR node may be published to an SR network by the next SR node, and the SID corresponding to the next SR node may be stored in a local SID table of the next SR node.

This manner may be applied to a scenario in which the first proxy node and the second proxy node are located on IP links for a plurality of hops, and have a service requirement of specifying an intermediate node that forwards the second packet. The first proxy node may use the destination address to carry the SID corresponding to the next SR node, to indicate that the second packet needs to be forwarded from the local end to the SR node, so that the second packet arrives at the second proxy node after being forwarded by the SR node.

Figure 14:
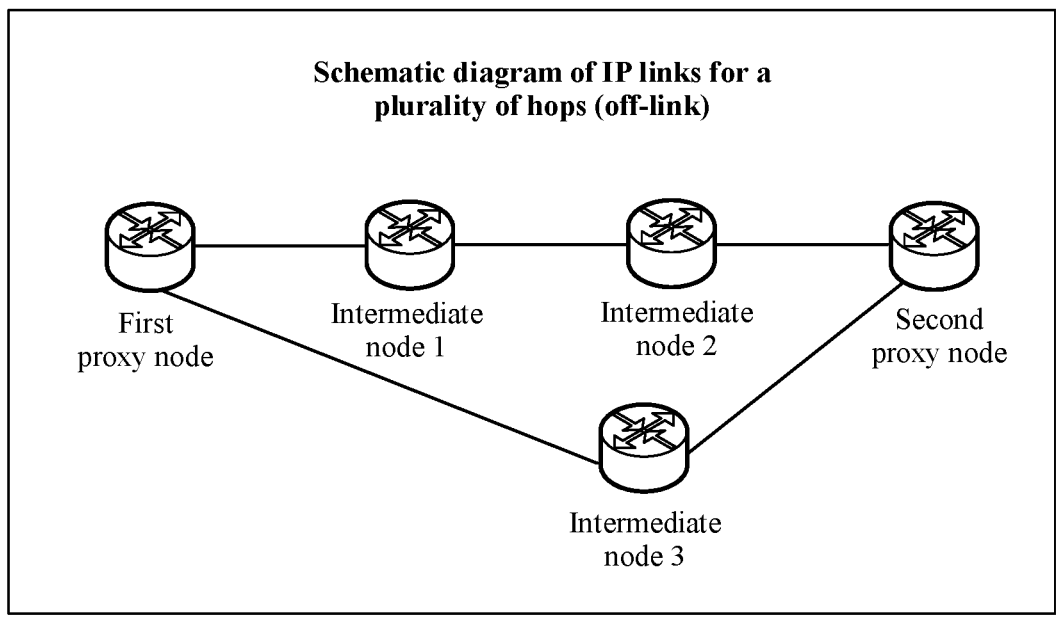
FIG. 14 is a network topology diagram of a first proxy node and a second proxy node according to an embodiment of this application.

For example, FIG. 14 is a schematic diagram in which a first proxy node and a second proxy node are located on IP links for a plurality of hops. Intermediate nodes between the first proxy node and the second proxy node include an intermediate node 1, an intermediate node 2, and an intermediate node 3. An SR function is enabled on the intermediate node 1, the intermediate node 2, and the intermediate node 3. When the first proxy node needs to specify that the second packet is forwarded to the second proxy node through the intermediate node 3, the destination address of the second packet may carry a SID corresponding to the intermediate node 3. In this case, when receiving the second packet, the intermediate node 3 may query a local SID table based on the destination address of the second packet, determine that the destination address of the second packet hits a SID in the local SID table, and perform an operation corresponding to the SID, for example, forward the second packet to the second proxy node.

It should be understood that a quantity of intermediate nodes between the first proxy node and the second proxy node may be set based on a networking requirement. There may be more or fewer intermediate nodes, for example, there may be only one intermediate node, or may be more intermediate nodes. The quantity of intermediate nodes between the two proxy nodes located on the IP links for a plurality of links is not limited in this embodiment.

Based on different manners of carrying the control information, there may be specifically a plurality of formats of the second packet implemented in Implementation 2. Examples of Implementation 2.1 to Implementation 2.4 are described below with reference to FIG. 15, FIG. 16, FIG. 17, and FIG. 18.

Figure 15:
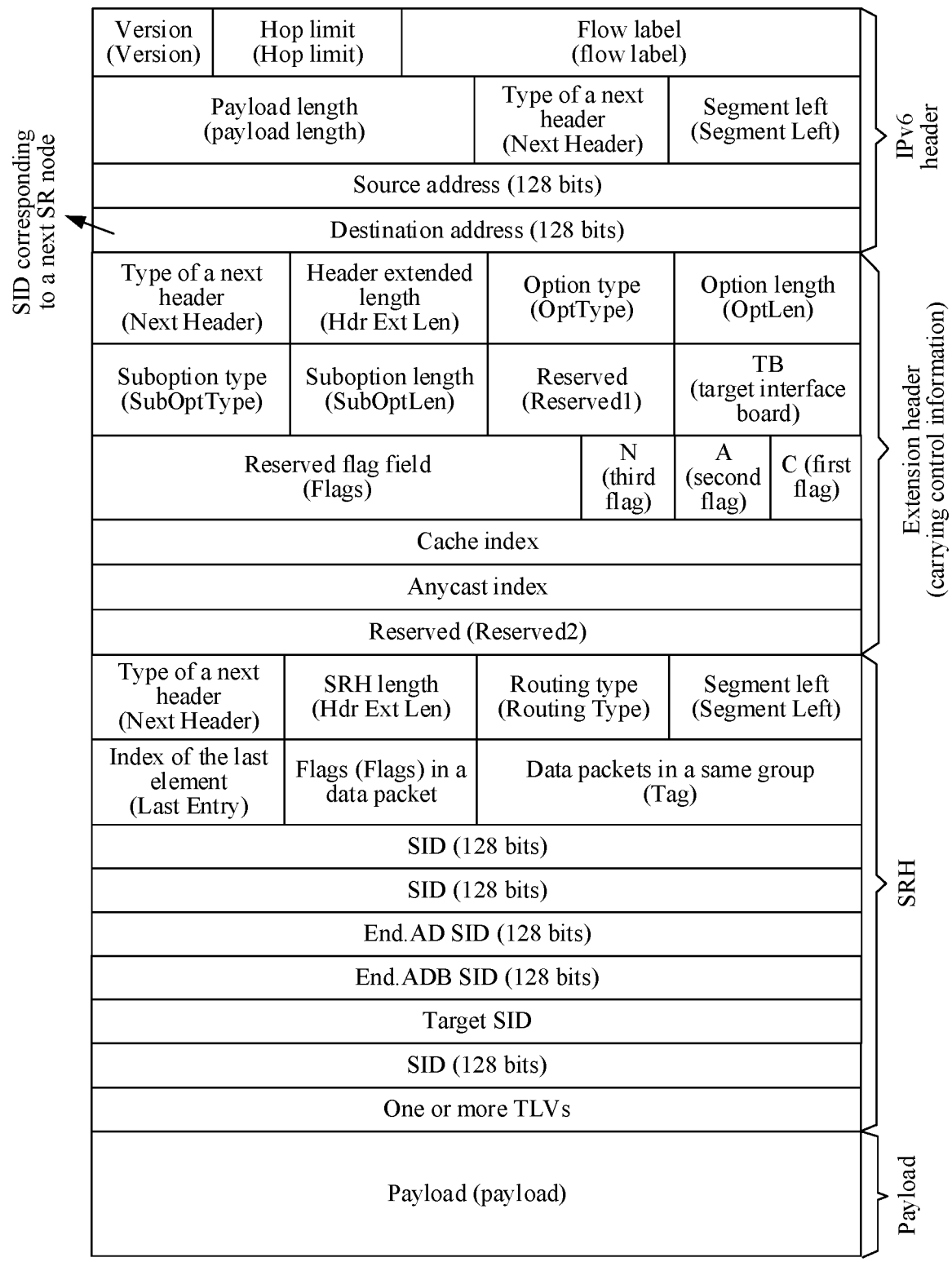
FIG. 15 is a schematic diagram of a second packet according to an embodiment of this application.

Implementation 2.1: Refer to FIG. 15. If the extension header is used to carry the control information, a format of the second packet may be shown in FIG. 15. The second packet includes an IPv6 header, an extension header, an SRH, and a payload.

Figure 16:
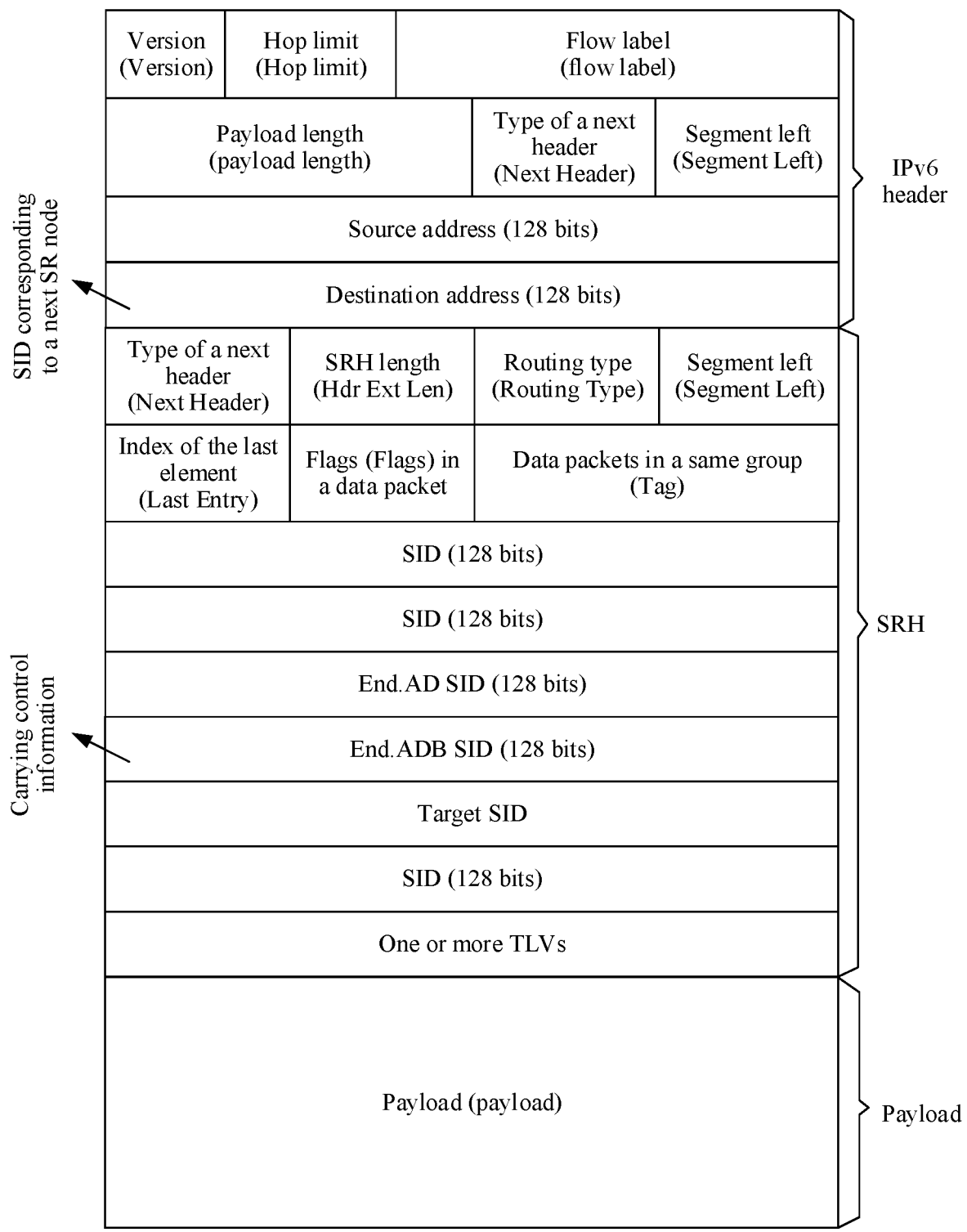
FIG. 16 is a schematic diagram of a second packet according to an embodiment of this application.

Implementation 2.2: Refer to FIG. 16. If the first bypass SID (that is, an End.ADB SID in FIG. 16) is used to carry the control information, a format of the second packet may be shown in FIG. 16. The second packet includes an IPv6 header, an SRH, and a payload.

Figure 17:
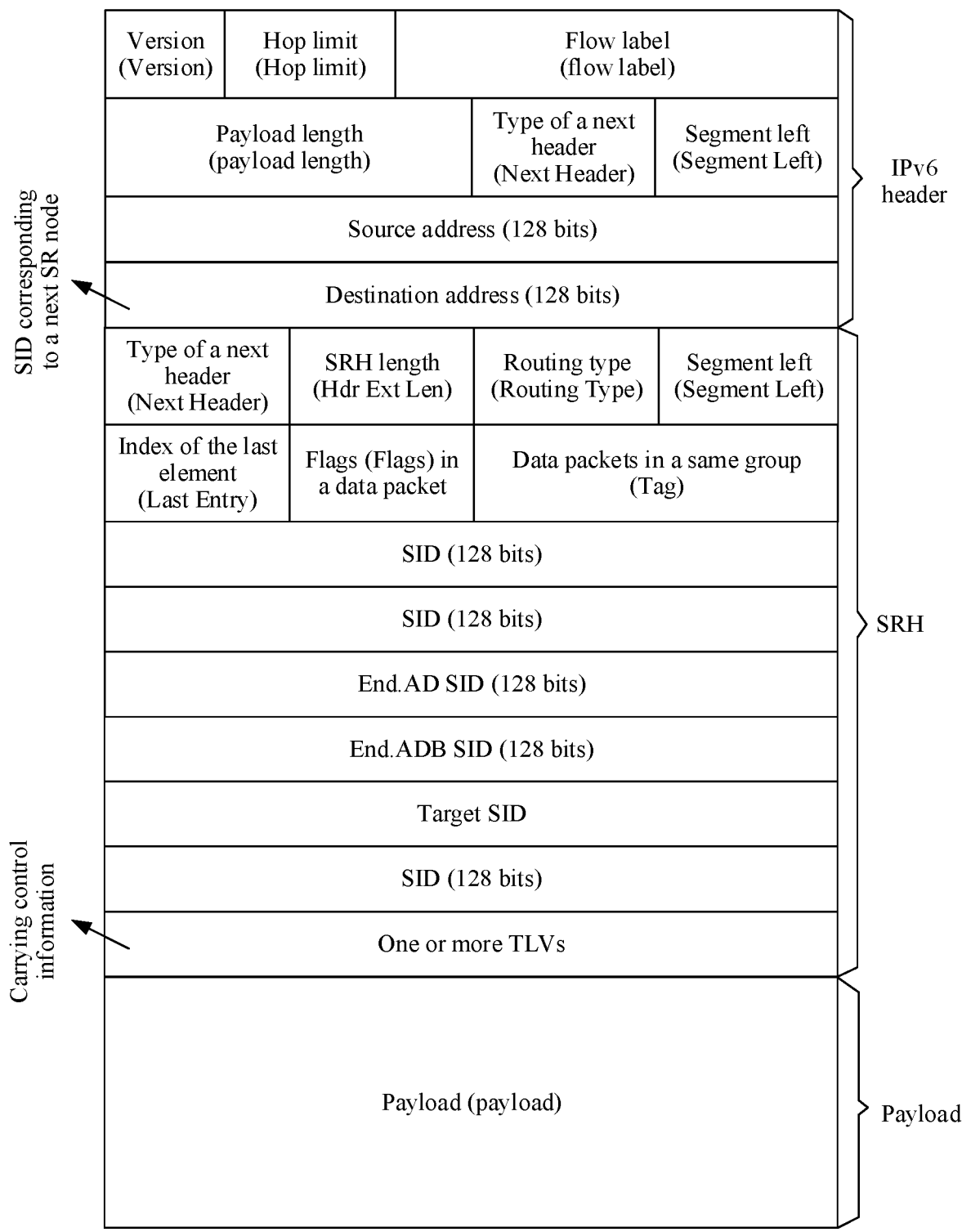
FIG. 17 is a schematic diagram of a second packet according to an embodiment of this application.

Implementation 2.3: Refer to FIG. 17. If the TLV in the SRH is used to carry the control information, a format of the second packet may be shown in FIG. 17. The second packet includes an IPv6 header, an SRH, and a payload.

Figure 18:
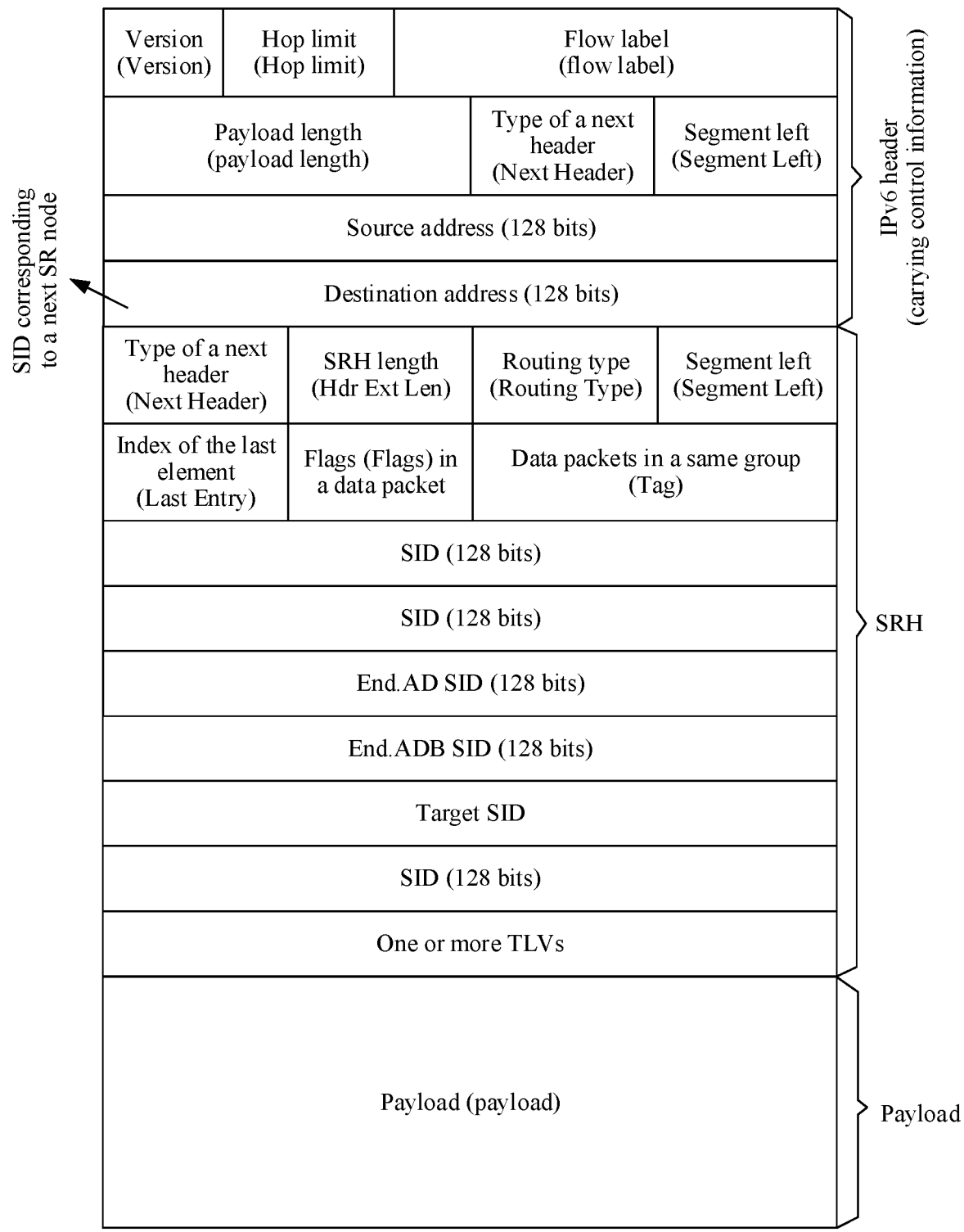
FIG. 18 is a schematic diagram of a second packet according to an embodiment of this application.

Implementation 2.4: Refer to FIG. 18. If the IPv6 header is used to carry the control information, a format of the second packet may be shown in FIG. 18. The second packet includes an IPv6 header, an SRH, and a payload.

In an embodiment, a process of generating the second packet may include step 1 to step 3.

Step 1: The first proxy node inserts the first bypass SID into a segment list of the SRH of the first packet.

Figure 19:
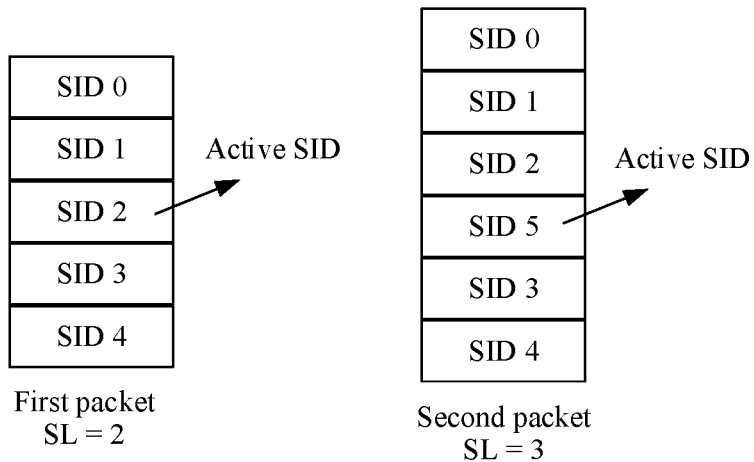
FIG. 19 is a schematic diagram of updating a segment list according to an embodiment of this application.

The first proxy node may insert the first bypass SID into the segment list by performing a push operation in SR, so that after the first bypass SID is inserted, the segment list further includes the first bypass SID in addition to each SID of the original first packet. For a location at which the first bypass SID is inserted into the segment list, the first proxy node may insert the first bypass SID after the active SID in the SRH, that is, insert the first bypass SID after the End.AD SID. FIG. 19 is a schematic diagram of inserting a first bypass SID according to an embodiment of this application. A left side of FIG. 19 shows a segment list of a first packet, and a right side of FIG. 19 shows a segment list of a second packet. In FIG. 19, the End.AD SID is a SID 2, and the first bypass SID is a SID 5. In this case, the first proxy node inserts the SID 5 after the SID 2.

It should be noted that the foregoing descriptions are provided in a sequence from a SID 0 to the SID 5. A location of the SID 0 is referred to as a front location, and a location of the SID 5 is referred to as a rear location. When parsing the SRH, an SRv6 node usually reads SIDs in the SRH in an inverse order. For example, in FIG. 19, in the SRH of the first packet, the $1^{st}$ read and executed SID is a SID 4, the $2^{nd}$ read and executed SID is a SID 3, the 3rd read and executed SID is the SID 2, . . . , and the last read and executed SID is the SID 0.

Step 2: The first proxy node updates an SL of the SRH of the first packet.

Step 3: The first proxy node updates the destination address of the first packet to obtain the second packet.

The step of updating the SL is performed. Therefore, an SL of the second packet generated by the first proxy node is greater than an SL of the received first packet. In an SRv6 network, an SL of an SRH of an SRv6 packet is usually used to identify a quantity of to-be-processed SIDs. Therefore, a value of the SL is modified to indicate that compared with the first packet received by the first proxy node, in the second packet sent by the first proxy node, the SRH includes more to-be-processed SIDs, so that the second proxy node and/or the intermediate node between the first proxy node and the second proxy node process/processes the more SIDs based on the SL.

The operation of updating the destination address is performed. Therefore, a next to-be-processed SID of the second packet can be updated from the End.AD SID to another SID, so that when querying a local SID table based on the destination address, the second proxy node and/or the intermediate node perform/performs an operation corresponding to the another SID.

It should be noted that step 1 to step 3 are different from normal forwarding operations in SRv6. In SRv6, usually, each SID in the SRH is inserted into the SRv6 packet by a head node. For each SRv6 node other than the head node, each time receiving the SRv6 packet, the SRv6 node only performs an operation corresponding to an active SID in the SRH, but does not insert a SID into the SRH or delete a SID from the SRH, that is, each intermediate SRv6 node does not change a SID list in the SRH. In addition, the SRv6 node decreases the SL of the SRH by one, that is, performs SL−−, to indicate that the local end executes one SID in the SRH. Therefore, a quantity of remaining unexecuted SIDs in the SRH is decreased by one. In this embodiment, because the first bypass SID in the SRH is inserted into the first packet by the first proxy node, the first proxy node increases the SL of the SRH by one, that is, performs SL++, to indicate that a quantity of remaining unexecuted SIDs in the SRH is increased by one. The newly added unexecuted SID is the first bypass SID, and the first bypass SID needs to be transmitted to the second proxy node, so that the second proxy node performs an operation corresponding to the first bypass SID. After the SL is increased by one, the active SID in the SRH is updated from End.AD SID to the first bypass SID.

It should be understood that, descriptions are provided in this embodiment only by using an example in which step 1, step 2, and step 3 are performed in sequence. A time sequence of step 1, step 2, and step 3 is not limited in this embodiment. In an embodiment, the three steps may be performed in another sequence. For example, step 3, step 1, and step 2 are performed in sequence, or step 2, step 1, and step 3 are performed in sequence. Certainly, the three steps may alternatively be performed in parallel, that is, step 1, step 2, and step 3 may be performed simultaneously.

In an embodiment, if the control information is carried in the extension header, the first proxy node may not only perform step 1, step 2, and step 3, but also perform step 4.

Step 4: The first proxy node generates an extension header, and encapsulates the extension header in the first packet.

It should be understood that a time sequence of step 4, step 1, step 2, and step 3 is not limited in this embodiment. For example, step 4 may alternatively be performed before step 1, step 2, and step 3.

In an embodiment, the first proxy node may copy the first packet, to obtain two copies of the first packet, where one is the first packet, and the other is a copy of the first packet. The first proxy node may generate a second packet by using one copy of the first packet, and generate a third packet by using the other copy of the first packet. Optionally, the first proxy node may generate the second packet by using the copy of the first packet, and generate the third packet by using the first packet. The second packet may carry a first flag (C-flag), to indicate that the second packet is a packet obtained by copying the first packet.

The foregoing described manner of generating the second packet may include a plurality of implementations based on different specific scenarios. Examples of Implementation 1 and Implementation 2 are described below.

Implementation 1: The first proxy node increases the SL of the first packet by one. Step 2 may be: updating the destination address of the first packet to the first bypass SID.

Refer to FIG. 19. A left side of FIG. 19 shows an SL of a first packet. If a value of the SL of the first packet is 2, it indicates that two unexecuted SIDs in the segment list are a SID 0 and a SID 1, a current active SID in the segment list is a SID 2, and two executed SIDs in the segment list are a SID 3 and a SID 4. The first proxy node may increase the SL by one, so that the value of the SL is updated from 2 to 3. As shown on a right side of FIG. 19, if the value of the SL of the second packet is 3, it indicates that three unexecuted SIDs in the segment list are the SID 0, the SID 1, and the SID 2, a current active SID in the segment list is a SID 5, and two executed SIDs in the segment list are the SID 3 and the SID 4. In addition, the first proxy node may modify a destination address of an IPv6 header of the first packet, so that the destination address of the first packet is updated from the End.AD SID to the first bypass SID.

Implementation 1 may be applied to a plurality of scenarios. For example, the first proxy node and the second proxy node are located on an IP link for one hop. For another example, the first proxy node and the second proxy node are located on IP links for a plurality of hops (off-link), and the SR function is not enabled on the intermediate node between the first proxy node and the second proxy node does. For still another example, the first proxy node and the second proxy node are located on IP links for a plurality of hops, and do not have a service requirement of specifying the intermediate node that forwards the second packet. A specific scenario in which the first proxy node performs Implementation 1 is not limited in this embodiment.

The second packet obtained in Implementation 1 may be shown in FIG. 10, FIG. 11, FIG. 12, or FIG. 13.

Implementation 2: The first proxy node may further insert one or more target SIDs into the segment list of the SRH of the first packet. Step 1 may be: The first proxy node increases the SL of the first packet by N, where N is a positive integer greater than 1. Step 2 may be: The first proxy node updates the destination address of the first packet to a SID corresponding to a next SR node in the one or more target SIDs.

The one or more target SIDs are used to indicate a target forwarding path, and the target SID may be a node SID or a link SID (also referred to as an adjacent SID). The target SID may identify one intermediate node, one link, one or more instructions, one service, or one VPN.

The target forwarding path is a path from the first proxy node to the second proxy node. The target forwarding path may be a strict explicit path, that is, a path on which each link or each intermediate node is specified. The target forwarding path may alternatively be a loose explicit path, that is, a path on which some links or some intermediate nodes are specified. The target forwarding path may be one link, or may be a combination of a plurality of links. The target forwarding path may be a path at a data link layer, a path at a physical layer, or a path established by using a tunneling technology. The target forwarding path may be a path for transmitting an optical signal, or may be a path for transmitting an electrical signal.

Figure 20:
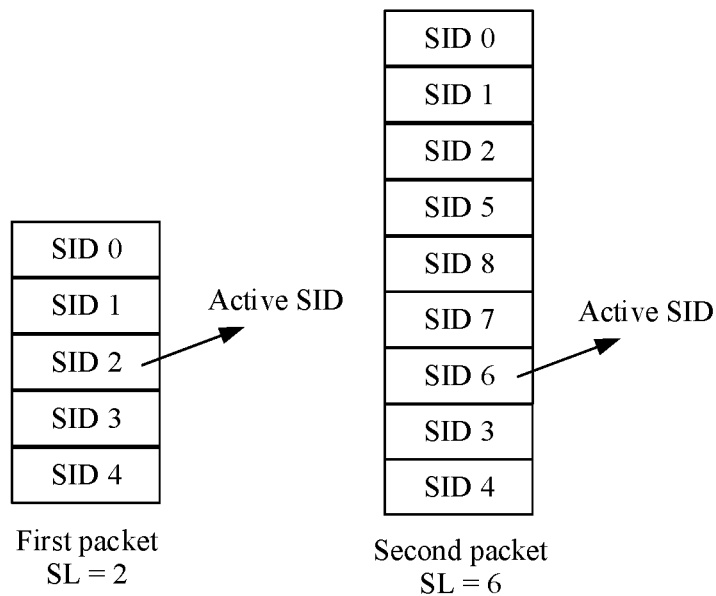
FIG. 20 is a schematic diagram of updating a segment list according to an embodiment of this application.

For example, refer to FIG. 14 and FIG. 20. If there are the intermediate node 1, the intermediate node 2, and the intermediate node 3 between the first proxy node and the second proxy node, one or more target SIDs inserted by the first proxy node may be three SIDs: a SID 6 corresponding to the intermediate node 1, a SID 7 corresponding to the intermediate node 2, and a SID 20 corresponding to the intermediate node 3. For example, a left side of FIG. 20 shows an SL of a first packet. If a value of the SL of the first packet is 2, it indicates that two unexecuted SIDs in the segment list are a SID 0 and a SID 1, a current active SID in the segment list is a SID 2, and two executed SIDs in the segment list are a SID 3 and a SID 4. The first proxy node may update the value of the SL from 2 to 6. As shown on a right side of FIG. 20, if the value of the SL of the second packet is 6, it indicates that six unexecuted SIDs in the segment list are the SID 0, the SID 1, the SID 2, a SID 5, a SID 8, and a SID 7, a current active SID in the segment list is a SID 6, and two executed SIDs in the segment list are the SID 3 and the SID 4.

In this manner, it may be specified that the target forwarding path is: the first proxy node→the intermediate node 1→the intermediate node 2→the intermediate node 3→the second proxy node. It should be noted that, using a SID corresponding to each node as a target SID is merely an example. If the target forwarding path is a loose explicit path, the one or more target SIDs inserted by the first proxy node may be SIDs corresponding to some intermediate nodes.

The second packet obtained in Implementation 2 may be shown in FIG. 15, FIG. 16, FIG. 17, or FIG. 18.

Implementation 2 may be applied to a plurality of scenarios. For example, the first proxy node and the second proxy node are located on IP links for a plurality of hops, and have a service requirement of specifying the intermediate node that forwards the second packet. A specific scenario in which the first proxy node performs Implementation 2 is not limited in this embodiment.

Figure 21:
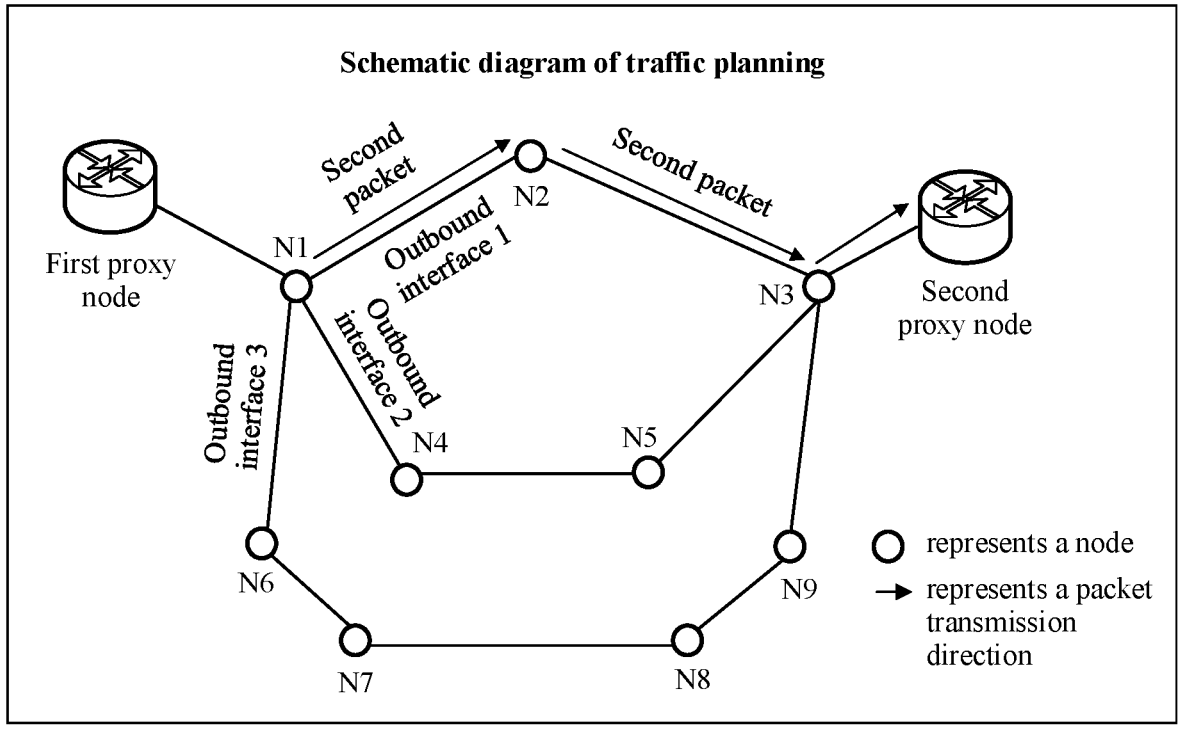
FIG. 21 is a schematic diagram of traffic planning according to an embodiment of this application.

In some embodiments, the first proxy node may perform traffic planning by inserting the target SID. For example, FIG. 21 is a schematic diagram of performing traffic planning by using a target SID according to an embodiment of this application. In FIG. 21, there are 10 forwarding nodes: a node N1, a node N2, a node N3, . . . , and a node N9 between the first proxy node and the second proxy node, and there are three paths from the first proxy node to the second proxy node: (N1, N2, N3), (N1, N4, N5, N3), and (N1, N6, N7, N8, N9, N3). The target SID may be used to control the second packet to be transmitted to the second proxy node through one specified path in the three paths. For example, if bandwidth of the path (N1, N2, N3) is largest, to transmit the second packet through the path (N1, N2, N3), a SID that corresponds to a link (N1, N2) and that is published by the node N1 may be used as the target SID, and the target SID may be carried in the segment list of the second packet. Therefore, when receiving the packet, the node N1 queries a local SID table based on the target SID, obtains, through query, an outbound interface 1 bound to the link (N1, N2), and selects the outbound interface 1 to send the second packet, so that after the packet is sent through the outbound interface 1, the packet reaches the node N2, and then reaches the second proxy node through a link (N2, N3).

In this manner, at least the following effects can be achieved: A forwarding path of the second packet can be selected based on a service requirement, and the second packet can be controlled to be transmitted through a specified target forwarding path, to facilitate path planning and implement traffic optimization.

In addition, the first proxy node may modify a destination address of an IPv6 header of the first packet, so that the destination address of the first packet is updated from the End.AD SID to a SID corresponding to a next SR node.

It should be noted that Implementation 1 and Implementation 2 are merely examples. In some other embodiments, the second packet may be generated in another implementation. For example, a binding SID (BSID) may be used to identify the target forwarding path. In this case, the first proxy node may insert the first bypass SID and the BSID into the segment list of the SRH of the first packet, update the destination address of the IPv6 header of the first packet to the BSID, and increase the SL of the first packet by 2. When receiving the second packet, the next SR node queries a local SID table based on the BSID, and then may perform an End.B6. Insert operation (an insertion operation in SRv6) to insert a new SRH into the second packet, or perform an End.B6.Encaps operation (an encapsulation operation in SRv6) to insert an outer IPv6 header that includes the SRH into the second packet. Based on the BSID, a depth of the SRH can be reduced and a function of compressing the SRH can be implemented.

Figure 22:
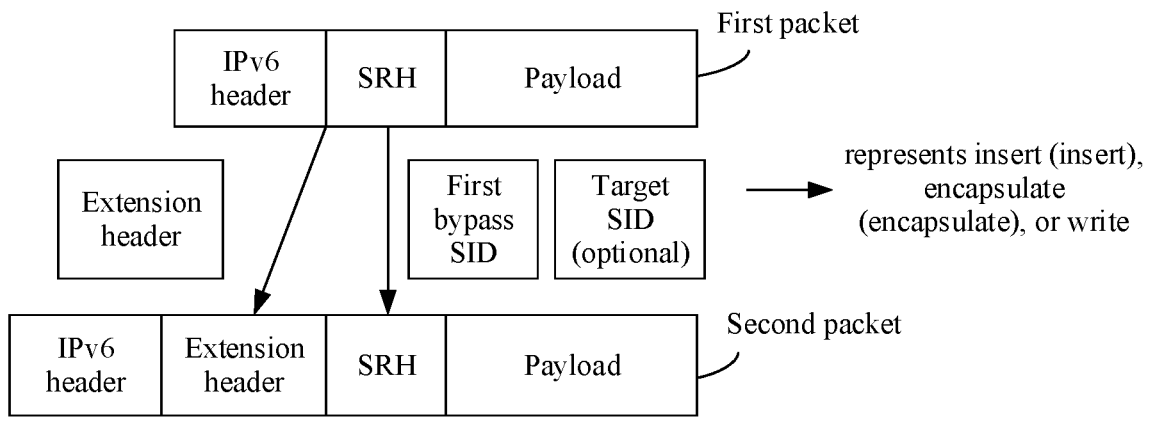
FIG. 22 is a schematic diagram of evolving a first packet to a second packet according to an embodiment of this application.
Figure 23:
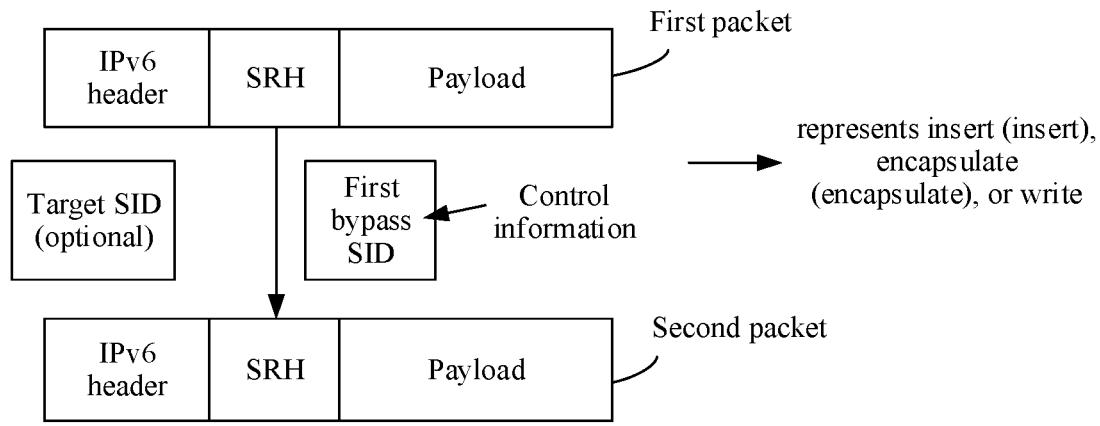
FIG. 23 is a schematic diagram of evolving a first packet to a second packet according to an embodiment of this application.
Figure 24:
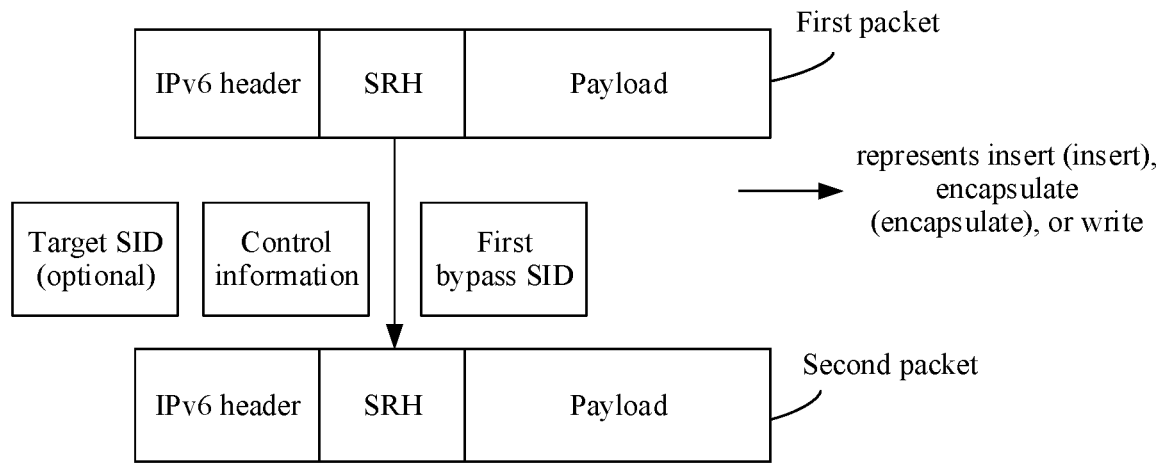
FIG. 24 is a schematic diagram of evolving a first packet to a second packet according to an embodiment of this application.
Figure 25:
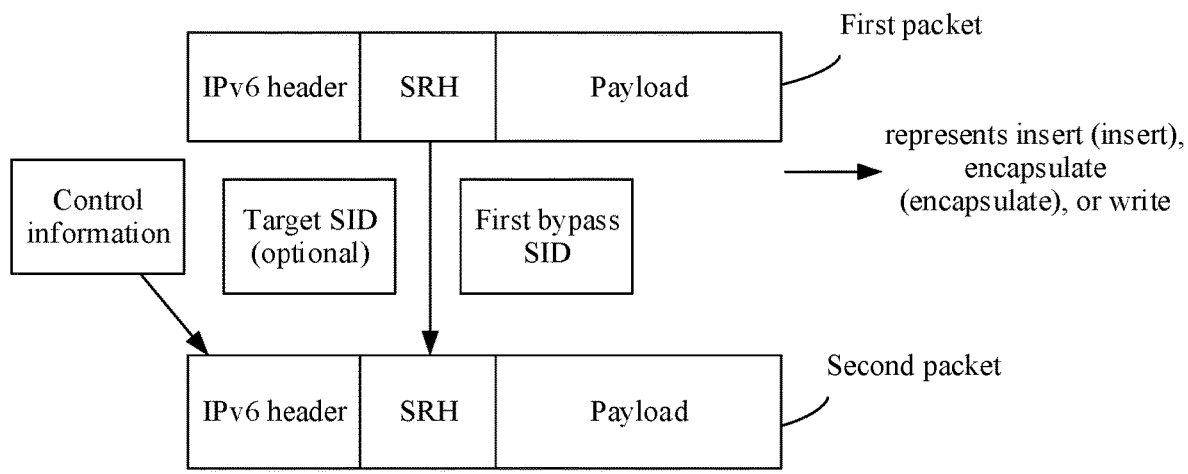
FIG. 25 is a schematic diagram of evolving a first packet to a second packet according to an embodiment of this application.

Based on step 1 to step 4, refer to FIG. 22, FIG. 23, FIG. 24, and FIG. 25. FIG. 22 is a schematic diagram of converting a first packet to a second packet according to an embodiment of this application. FIG. 22 is applicable to describing a case in which an extension header is used to carry control information. It can be learned from FIG. 22 that two pieces of information may be added to the first packet. One is a first bypass SID used to transmit the packet to the second proxy node, and the other is an extension header used to carry the control information. The second packet can be obtained through such a simple operation. In addition, optionally, a target SID may be added to indicate a target forwarding path. FIG. 23 is applicable to describing a case in which a bypass SID is used to carry control information. It can be learned from FIG. 23 that the second packet can be obtained by adding a first bypass SID to the first packet. FIG. 24 is applicable to describing a case in which a TLV is used to carry control information. It can be learned from FIG. 24 that the second packet can be obtained by adding a first bypass SID to the first packet and writing control information to the TLV in the SRH. FIG. 25 is applicable to describing a case in which an IP header is used to carry control information. It can be learned from FIG. 25 that the second packet can be obtained by adding a first bypass SID to the first packet and writing control information to the IPv6 header.

The second packet is generated in this manner, so that at least the following effects can be achieved:

Usually, each SRH cached by the proxy node is dynamically learned from a packet by a data plane (for example, a forwarding chip) of the proxy node in a packet forwarding process. The data plane usually does not send the SRH to a CPU to avoid affecting forwarding performance of the data plane. For the CPU of the proxy node, because the CPU does not obtain the SRH, the CPU cannot generate a packet that includes the SRH, and the CPU cannot back up the SRH to the second proxy node by using the packet. For the data plane of the proxy node, because the data plane can usually only perform a simple processing operation, it is very complex, difficult, and not feasible for the data plane to generate an entire packet starting from 0 based on the SRH. It can be learned that how to back up the SRH to the second proxy node and implement the backup by using the data plane is a great technical difficulty. In the foregoing proposed packet generation method, the received first packet is copied, a SID (the first bypass SID) is inserted, and the extension header is encapsulated, to obtain the second packet. Compared with a manner of generating the entire packet starting from 0, in this manner, a processing operation is very simple. Therefore, the process of generating the packet may be performed by the data plane without relying on a control plane, to successfully overcome this technical difficulty. According to an experiment, the foregoing packet generation logic is configured for a microcode of the forwarding chip, so that the forwarding chip can perform step 503. Therefore, a microcode architecture is supported, and practicality is strong.

In an embodiment, a trigger condition for generating the second packet may include one or more of Condition (1) to Condition (3).

Condition (1): It is detected that the first cache entry is generated.

The first proxy node may detect the cache. If the cache originally does not include the first cache entry, and the first cache entry is newly added to the cache after the first packet is received, it is detected that the first cache entry is generated. Therefore, the first proxy node generates the second packet and sends the second packet.

Condition (2): It is detected that the first cache entry is updated.

The first proxy node may detect the first cache entry in the cache. If a write operation is performed on the first cache entry, the first cache entry is updated. Therefore, the first proxy node generates the second packet and sends the second packet.

In addition, if it is not detected, after the first packet is received, that the first cache entry is generated or updated, it indicates that the first proxy node has previously stored the SRH of the first packet. Therefore, in this embodiment, synchronization of a cache entry is usually maintained between the first proxy node and the second proxy node. If the first proxy node has stored the SRH, it indicates that the second proxy node has also stored the SRH of the first packet with a high probability. In this case, the first proxy node may not perform the steps of generating the second packet and sending the second packet.

Condition (1) or Condition (2) is used to trigger a procedure of forwarding the second packet. Therefore, at least the following effects can be achieved: Each time the first proxy node receives a new SRH, because the new SRH triggers generation of a cache entry, forwarding of the second packet is triggered. Therefore, the new SRH can be transmitted to the second proxy node in a timely manner through forwarding of the second packet, to ensure that the new SRH is synchronized with the second proxy node in real time. In addition, because the previously stored SRH does not trigger generation of a cache entry, forwarding of the second packet is not triggered. Therefore, processing overheads of generating the second packet for transmitting the SRH and network overheads of transmitting the second packet are avoided.

In an example scenario, a data flow including N data packets arrives at the first proxy node. When the first proxy node receives the $1^{st}$ first packet in the data flow, an SRH of the $1^{st}$ first packet is a new SRH for the first proxy node. In this case, the first proxy node generates the first cache entry, to store the SRH of the $1^{st}$ first packet. In this case, because Condition (1) is met, the first proxy node is triggered to generate the second packet and send the second packet, so that the SRH of the $1^{st}$ first packet is transmitted to the second proxy node by using the second packet, and the SRH of the $1^{st}$ first packet is also stored on the second proxy node. When the first proxy node receives any first packet in the $2^{nd}$ first packet, the $3^{rd}$ first packet, . . . , and the last first packet in the data flow, because SRHs of all first packets in the same data flow are usually the same, the SRHs of the first packets are stored SRHs for the first proxy node. In this case, the first proxy node does not generate the first cache entry. In this case, because Condition (1) is not met, the first proxy node does not generate the second packet or send the second packet, so that overheads of forwarding (N−1) second packets are avoided. In addition, when receiving each first packet in the data flow, the first proxy node or the second proxy node may encapsulate the SRH of the $1^{st}$ first packet in the first packet to restore the packet. Herein, N is a positive integer.

Condition (3): It is detected that a sending period of the second packet elapses at a current time point.

The first proxy node may periodically send the second packet. Specifically, the first proxy node may set a sending period for the second packet, and generate the second packet and send the second packet each time a sending period elapses.

In this manner, the first proxy node may periodically synchronize the SRH of the first packet with the second proxy node by using the second packet, so that the second proxy node can periodically refresh the cached SRH, to improve SRH synchronization reliability.

Step 504: The first proxy node sends the second packet to the second proxy node.

A forwarding path on which the first proxy node sends the second packet may include one or more of the following forwarding path 1 and forwarding path 2.

Forwarding path 1: The first proxy node sends the second packet through a peer link (peer link).

Refer to FIG. 3. The peer link between the first proxy node and the second proxy node may be the first link, the first proxy node may send the second packet through the first link, and the second proxy node may receive the second packet through the first link.

A process of transmitting the second packet through the peer link may include step 1.1 and step 1.2.

Step 1.1: The first proxy node sends the second packet to the second proxy node through a first outbound interface corresponding to the first link.

The first outbound interface is an outbound interface that is of the first proxy node and that corresponds to the first link. The first proxy node may receive a configuration instruction in advance, where the configuration instruction is used to indicate a correspondence between the first link and the first outbound interface, and the first proxy node may obtain the correspondence between the first link and the first outbound interface from the configuration instruction, and store the correspondence between the first link and the first outbound interface in a routing entry. After generating the second packet, the first proxy node may select the first outbound interface corresponding to the first link, and send the second packet through the first outbound interface, so that the second packet is transmitted to the second proxy node through the first link. For example, the first proxy node may receive the following configuration instructions:

[proxy1] segment-routing ipv6
[proxy1—segment-routing-ipv6] service-chain peer-link
   Ethernet2/0/0 next-hop FE80::1

In the foregoing configuration instructions, proxy1 represents the first proxy node; the first row of configuration instruction means that IPv6 SR needs to be configured; and the second row of configuration instruction means that an outbound interface corresponding to a peer link on a service function chain is an Ethernet port 0 with a slot 2 and a subboard 0, and a next hop is FE80::1.

Step 1.2: The second proxy node receives the second packet from the first proxy node through a first inbound interface corresponding to the first link.

The first inbound interface is an inbound interface that is of the second proxy node and that corresponds to the first link. The second packet may reach the first inbound interface of the second proxy node through the first link, and enter the second proxy node through the first inbound interface.

In an embodiment, the first proxy node may implement the forwarding path 1 in a manner of specifying an outbound interface. Specifically, an outbound interface of the second packet may be specified as the first outbound interface. Therefore, when the second packet needs to be sent, the first proxy node sends the second packet by default through the first outbound interface, or may implement the forwarding path 1 in a manner of specifying a next hop. Specifically, the next hop of the first proxy node may be specified as the second proxy node. Therefore, when the second packet needs to be sent, the first proxy node uses the second proxy node as the next hop by default, and sends the second packet through the first outbound interface.

Forwarding path 2: A routing node forwards the second packet.

Refer to FIG. 3. A process of forwarding the second packet by the routing node may include step 2.1 to step 2.3.

Step 2.1: The first proxy node sends the second packet to the routing node through a second outbound interface corresponding to a second link.

The second outbound interface is an outbound interface that is of the first proxy node and that corresponds to the second link. The first proxy node may receive a configuration instruction in advance, where the configuration instruction is used to indicate a correspondence between the second link and the second outbound interface, and the first proxy node may obtain the correspondence between the second link and the second outbound interface from the configuration instruction, and store the correspondence between the second link and the second outbound interface in a routing entry. After generating the second packet, the first proxy node may select the second outbound interface corresponding to the second link, and send the second packet through the second outbound interface, so that the second packet is transmitted to the second proxy node through the second link.

Step 2.2: The routing node forwards the second packet to the second proxy node through a third link.

Step 2.3: The second proxy node receives the second packet from the routing node through a second inbound interface corresponding to the third link.

The second inbound interface is an inbound interface that is of the second proxy node and that corresponds to the third link. The second packet may reach the second inbound interface of the second proxy node through the third link, and enter the second proxy node through the second inbound interface.

In an embodiment, the first proxy node may preferentially use the forwarding path 1 to transmit the second packet. In an embodiment, the forwarding path 1 may be preferentially used by performing step (1) to step (3).

Step (1): The first proxy node detects a status of the first link, and if the first link is in an available state, the first proxy node performs step (2), or if the first link is in an unavailable state, the first proxy node performs step (3).

The first proxy node may detect whether the first link is deployed and whether a status of the first outbound interface is up (up), and if the first link is deployed and the status of the first outbound interface is up, determine that the first link is in the available state, or if the first link is not deployed or the status of the first outbound interface is down (down), determine that the first link is in the unavailable state.

Step (2): The first proxy node sends the second packet to the second proxy node through the first outbound interface corresponding to the first link.

Step (3): The first proxy node sends the second packet to the routing node through the second outbound interface corresponding to the second link.

The forwarding path 1 is preferentially used, so that the second packet is preferentially transmitted to the second proxy node through the peer link. In this case, because the forwarding path 1 is shorter than the forwarding path 2, the forwarding path 1 includes fewer nodes than the forwarding path 2, so that a delay of transmitting the second packet can be reduced.

Optionally, transmission reliability of the second packet can be implemented in either of Manners 1 and 2.

Manner 1: Repeated sending

The first proxy node may generate a plurality of second packets, where the plurality of second packets may be the same. The first proxy node may continuously send the plurality of second packets to the second proxy node, and the second proxy node continuously receives the plurality of second packets from the first proxy node.

In this manner, because the SRH of the first packet may be transmitted to the second proxy node by using any one of the plurality of second packets, a probability that the SRH is lost in a transmission process is reduced, implementation is simple, and feasibility is high.

Manner 2: Acknowledgment mechanism

A corresponding acknowledgment (ACK) packet may be designed for the second packet, so that a receive end of the second packet returns the ACK packet to notify a transmit end of the second packet that the transmit end of the second packet has received the second packet. In an embodiment, a packet transmission procedure according to the acknowledgment mechanism may include step 1 to step 4.

Step 1: The second proxy node generates a sixth packet based on the first bypass SID, a second bypass SID corresponding to the second proxy node, and the second packet.

The sixth packet is an ACK packet corresponding to the second packet, and the sixth packet indicates that it is acknowledged that the second packet is received. The sixth packet is forwarded to the first proxy node, so that an event that the second proxy node receives the second packet can be notified to the first proxy node. An encapsulation format of the sixth packet may be similar to that of the second packet. A difference lies in that the sixth packet includes the second bypass SID corresponding to the first proxy node. For example, a destination address of the sixth packet may be the second bypass SID. The sixth packet may carry a second flag, and the second flag in the sixth packet may indicate that the sixth packet is an acknowledgment packet. For example, the sixth packet may include an extension header, the extension header carries a C-flag and an A-flag, the C-flag is set to 1, and the A-flag is set to 1.

In an embodiment, the second proxy node may re-encapsulate the second packet to obtain the sixth packet. Specifically, a process of generating the sixth packet may include: The second proxy node updates a source address of the second packet to the first bypass SID. The second proxy node updates the destination address of the second packet from the first bypass SID to the second bypass SID. The second proxy node modifies a value of a second flag in the second packet, to obtain the sixth packet. The three steps of updating the source address, updating the destination address, and modifying the second flag may be combined in any sequence. A time sequence of the three steps is not limited in this embodiment.

The sixth packet is generated in this manner. Therefore, at least the following effects can be achieved: The second proxy node may obtain the second packet by modifying the source address, the destination address, and the second flag for the received second packet. Compared with a manner of generating the entire packet starting from 0, in this manner, a processing operation is very simple. Therefore, the process of generating the packet may be performed by a data plane without relying on a control plane, to provide an ACK packet generation manner that can be implemented by the data plane such as a forwarding engine without relying on the control plane such as a CPU. According to an experiment, the foregoing packet generation logic is configured for a microcode of a forwarding chip, so that the forwarding chip can perform the step of generating the sixth packet. Therefore, a microcode architecture is supported, and practicality is strong.

Step 2: The second proxy node sends the sixth packet to the first proxy node.

Step 3: When receiving the sixth packet, the first proxy node determines that the second proxy node receives the second packet.

In some embodiments, the first proxy node may obtain the control information from the second packet, and determine that the control information indicates that the second packet is received. For example, the first proxy node may identify a value of a first flag in the second packet and the value of the second flag in the second packet, and if the value of the first flag is set to 1 and the value of the second flag is set to 1, determine that the control information indicates that the second packet is received.

Step 4: When the first proxy node does not receive the sixth packet, the first proxy node retransmits the second packet to the second proxy node.

In a procedure of forwarding the sixth packet, the first proxy node can acknowledge, by determining whether the first proxy node receives the sixth packet, whether the second proxy node receives the SRH. When the second proxy node does not obtain the SRH, the first proxy node ensures, through retransmission, that the SRH is transmitted to the second proxy node, to ensure SRH transmission reliability.

Step 505: The second proxy node receives the second packet from the first proxy node, and determines that the control information indicates the second proxy node to store the SRH of the first packet.

A specific procedure of transmitting the second packet between the first proxy node and the second proxy node may include a plurality of implementations based on different networking. Examples of Implementation 1 and Implementation 2 are described below.

Implementation 1: If the first proxy node and the second proxy node are located on an IP link for one hop, after the first proxy node sends the second packet through the outbound interface, the second packet may reach the inbound interface of the second proxy node through the link between the first proxy node and the second proxy node. In this case, the second proxy node may receive the second packet through the inbound interface.

Implementation 2: If the first proxy node and the second proxy node are located on IP links for a plurality of links, after the first proxy node sends the second packet through the outbound interface, the second packet may reach an inbound interface of a next node through a link between the first proxy node and the next node. The next node may receive the second packet through the inbound interface, and send the second packet through an outbound interface, until the second packet reaches the inbound interface of the second proxy node. In this case, the second proxy node receives the second packet through the inbound interface.

In a process in which the intermediate node between the first proxy node and the second proxy node forwards the packet, the intermediate node may identify the destination address of the IPv6 header of the second packet, and query a local SID table based on the destination address. When the target SID matches a target SID in the local SID table, the intermediate node performs an operation corresponding to the target SID, for example, selects an outbound interface corresponding to the target SID, and forwards the second packet to a next intermediate node through the outbound interface. In addition, the intermediate node may decrease the SL of the SRH of the second packet by one, and update the destination address of the IPv6 header of the second packet to a SID corresponding to an SL obtained after one is subtracted. For example, refer to FIG. 20. The SRH of the second packet is shown on a right side of FIG. 20. In this case, after receiving the second packet, the intermediate node 1 updates the destination address from a SID 6 to a SID 7, and updates the SL from 6 to 5. After receiving the second packet, the intermediate node 2 updates the destination address from the SID 7 to a SID 8, and updates the SL from 5 to 4. After receiving the second packet, the intermediate node 3 updates the destination address from the SID 8 to a SID 5, and updates the SL from 4 to 3.

For an action performed on the second packet, the first proxy node may read the destination address of the second packet, and the first proxy node may query a local SID table based on the destination address of the second packet, to determine whether the destination address matches a SID in the local SID table. When the destination address matches the first bypass SID in the local SID table, that is, the destination address hits the first bypass SID in the local SID table, the first proxy node may determine that the second packet is an SRv6 packet, and perform an operation corresponding to the first bypass SID.

The operation corresponding to the first bypass SID may include: identifying control information in the second packet; and if the control information indicates to store the SRH of the first packet, obtaining the SRH of the first packet based on the second packet, and storing the SRH of the first packet. The operation corresponding to the first bypass SID may be pre-configured on the second proxy node. For example, the operation corresponding to the first bypass SID may be stored in an entry corresponding to the first bypass SID in the local SID table. When the second packet is received, the local SID table is queried based on the destination address of the second packet, and if it is found that the destination address matches the first bypass SID, that is, the entry corresponding to the first bypass SID is hit, the operation corresponding to the first bypass SID included in the entry is performed.

In some possible embodiments, the second proxy node may identify the value of the first flag in the second packet and the value of the second flag in the second packet, and if the value of the first flag is set to 1 and the second flag is set to 0, determine that the control information indicates to store the SRH of the first packet.

It should be noted that the operation corresponding to the control information and the operation corresponding to the End.AD SID each include the step of storing the SRH of the first packet, and a difference between the operation corresponding to the control information and the operation corresponding to the End.AD SID lies in that the operation corresponding to the End.AD SID includes a step of forwarding the payload of the first packet to the SF node, and the operation corresponding to the control information may not include the step of forwarding the payload of the first packet to the SF node, to avoid a case in which the SF node repeatedly processes the payload of the same packet after both the first proxy node and the second proxy node forward the payload of the first packet to the SF node.

Step 506: The second proxy node parses the second packet to obtain the SRH of the first packet.

The SRH of the second packet may include each SID in the SRH of the first packet, and may further include information other than the SID in the SRH of the first packet. The second proxy node may obtain the SRH of the first packet based on the SRH of the second packet. Specifically, the second proxy node may obtain the SRH of the first packet by performing step 1 and step 2.

Step 1: The second proxy node deletes the first bypass SID from the segment list of the SRH of the second packet.

This step may be considered as an inverse process of step 1 in the process of generating the second packet in step 503. Specifically, the second proxy node may delete the first bypass SID from the segment list by performing a pop (pop) operation in SR, so that after the first bypass SID is deleted, the segment list is restored to the original segment list of the first packet. The second proxy node may delete the active SID in the SRH, that is, delete the first bypass SID after the End.AD SID. Refer to FIG. 19. The left side of FIG. 19 shows the segment list of the first packet, and the right side of FIG. 19 shows the segment list of the second packet. In FIG. 19, the End.AD SID is the SID 2, and the first bypass SID is the SID 5. In this case, the second proxy node may delete the SID 5 after the SID 2, to restore the segment list from the right side to the left side.

Optionally, the second proxy node may further delete one or more target SIDs from the segment list of the SRH of the second packet.

Refer to FIG. 20. The left side of FIG. 20 shows the segment list of the first packet, and the right side of FIG. 20 shows the segment list of the second packet. In FIG. 20, there are a total of three target SIDs: the SID 6, the SID 7, and the SID 8. In this case, the second proxy node may delete the SID 6, the SID 7, and the SID 8, to restore the segment list from the right side to the left side.

Step 2: The second proxy node decreases an SL of the SRH of the second packet by one, to obtain the SRH of the first packet.

This step may be considered as an inverse process of step 2 in the process of generating the second packet in step 503. For example, refer to FIG. 19. The right side of FIG. 19 shows the SL of the second packet. If a value of the SL of the second packet is 3, it indicates that three unexecuted SIDs in the segment list are the SID 0, the SID 1, and the SID 2, a current active SID in the segment list is the SID 5, and two executed SIDs in the segment list are the SID 3 and the SID 4. The second proxy node may decrease the SL by one, so that the value of the SL is updated from 3 to 2. As shown on the left side of FIG. 19, if the value of the SL of the first packet is 2, it indicates that two unexecuted SIDs in the segment list are the SID 0 and the SID 1, a current active SID in the segment list is the SID 2, and two executed SIDs in the segment list are the SID 3 and the SID 4. In addition, in a scenario in which the first proxy node specifies an intermediate node that forwards the second packet, because the SL of the second packet may be decreased by the intermediate node in a transmission process, the second packet received by the second proxy node may be different from the second packet sent by the first proxy node due to an update to the SL. Therefore, an SL of the second packet received by the second proxy node may be less than an SL of the second packet sent by the first proxy node. For example, refer to FIG. 20. When the first proxy node sends the second packet, the SL of the second packet is 6. The intermediate node 1 updates the SL from 6 to 5, the intermediate node 2 updates the SL from 5 to 4, and the intermediate node 3 updates the SL from 4 to 3. In this case, the SL of the second packet received by the second proxy node is 3.

It should be noted that step 1 and step 2 are different from normal forwarding operations in SRv6. In SRv6, usually, each SID in the SRH is inserted into the SRv6 packet by a head node. For each SRv6 node other than the head node, each time receiving the SRv6 packet, the SRv6 node only performs an operation corresponding to an active SID in the SRH, but does not push a SID into the SRH or pop up a SID in the SRH, that is, each intermediate SRv6 node does not change a SID list in the SRH.

In this embodiment, the first bypass SID in the SRH of the second packet is inserted by the first proxy node, and the first bypass SID is not a SID originally included in the SRH of the first packet. Therefore, the second proxy node deletes the first bypass SID from the SRH of the second packet, to strip encapsulation of the first bypass SID, and restore the SRH of the second packet to the SRH of the first packet.

In this manner, from a perspective of the routing node, because the SRH of the packet obtained by the second proxy node is basically the same as the SRH of the packet previously sent by the routing node to the first proxy node, if the second proxy node subsequently receives a processed packet, the SRH restored by the second proxy node can be basically the same as the SRH of the packet previously sent by the routing node. In this case, after the second proxy node returns, to the routing node, the packet whose SRH is restored, the SRH of the packet obtained by the routing node is basically the same as the SRH of the previously sent packet, to avoid a case in which the SRH is lost because the SRH is not identified by the SF node, and implement a proxy function of the second proxy node. In addition, from a perspective of the SF node, after the SF node chooses to forward the processed packet to the first proxy node or the second proxy node, because the SRHs stored in the first proxy node and the second proxy node are basically the same, after either of the first proxy node and the second proxy node receives the packet, the SRHs restored to the packets are basically the same, to ensure that the first proxy node and the second proxy node have equivalent functions, and meet an architecture in which dual-homing is implemented based on the two proxy nodes.

It should be understood that, that the SRHs of the two packets are basically the same herein means that main content of the SRHs of the two packets is the same, but the SRHs of the two packets do not need to be completely the same. In an embodiment, the SRHs of the two packets may be slightly different. For example, segment lists of the SRHs of the two packets are the same, but SLs of the SRHs of the two packets are different. For example, an SL is decreased by 1 because the End.AD SID is executed by the first proxy node. For another example, content of a TLV changes because some parameters included in the TLV in the SRH are identified and processed by the two proxy nodes, or are identified and processed by the forwarding node between the two proxy nodes. These cases in which there are slight differences shall also fall within the protection scope of this embodiment of this application.

Step 507: The second proxy node stores the SRH of the first packet in a second cache entry.

The second cache entry is a cache entry used by the second proxy node to store the SRH of the first packet. The second proxy node may include an interface board, the interface board may include a forwarding entry memory, and the second cache entry may be located in the forwarding entry memory of the second proxy node. In an embodiment, the second proxy node may detect whether the SRH of the first packet is already stored in a cache. If the SRH of the first packet is not stored in the cache, the second proxy node allocates a cache entry to the SRH of the first packet, to obtain the second cache entry, and stores the SRH of the first packet in the second cache entry. In addition, if the second proxy node detects that the SRH of the first packet is stored in the cache, the second proxy node may skip the step of storing the SRH of the first packet.

With reference to step 505 to step 507, in some possible embodiments, in an example in which the first bypass SID is denoted as S and the second proxy node is denoted as N, operations performed based on the first bypass SID may be as follows:

When N receives a packet destined to S and S is a local End.ADB SID, N does/Note: When N receives a data packet whose destination address is S and S is a bypass SID published by N, N performs the following steps/
 decrement SL/Note: Decrease an SL by one/
 update the IPv6 DA with SRH[SL]/Note: Update an IPv6 destination address by using an SRH[SL]/
 lookup the local SID table using the updated DA/Note: Query a local SID table by using the updated destination address.
 forward accordingly to the matched entry/Note: Perform a forwarding operation based on a matched entry in the local SID table.

After the SL is decreased by one, the SRH[SL] corresponds to the End.AD SID. After the destination address is updated by using the SRH[SL], the destination address is updated to the End.AD SID. In this case, the local SID table is queried by using the End.AD SID, so that the matched entry corresponding to the End.AD SID is found. The matched entry corresponding to the End.AD SID in the local SID table may be used to indicate an operation corresponding to the End.AD SID. The matched entry corresponding to the End.AD SID may be pre-configured, so that the operation corresponding to the End.AD SID includes: detecting whether a packet includes control information, and if the packet includes the control information, storing an SRH of the packet and skipping forwarding a payload of the packet to the SF node.

In an embodiment, a forwarding rule of the second proxy node may be pre-configured. The second proxy node is configured to forbid (must not) to respond to the first proxy node by using the second packet after receiving the second packet. Therefore, when receiving the second packet, the first proxy node is prevented from repeatedly performing steps of generating the second packet and sending the second packet to the second proxy node, to avoid a loop of forwarding the second packet between the first proxy node and the second proxy node.

Step 508: The first proxy node generates a third packet based on the first packet.

The third packet is a packet used to transmit the payload of the first packet to the SF node. The third packet may include the payload of the first packet but does not include the SRH of the first packet. In some embodiments, the third packet may be the payload of the first packet. In some other embodiments, the third packet may include the payload of the first packet and a tunnel header. In a process of generating the third packet, the first proxy node may strip the SRH from the first packet, to obtain the third packet. The third packet may be a data packet.

Optionally, the third packet may further include a tunnel header (tunnel header). Specifically, the first proxy node may establish a transmission tunnel with the SF node. In this case, the first proxy node may not only strip the SRH of the first packet, but also generate a tunnel header corresponding to the transmission tunnel, and encapsulate the tunnel header, so that the third packet includes the tunnel header. The tunnel header of the third packet may be a VXLAN tunnel header, a GRE tunnel header, an IP-in-IP tunnel header, or the like. The first proxy node may first strip the SRH of the first packet, and then encapsulate the tunnel header in the first packet from which the SRH is stripped, or may first encapsulate the tunnel header in the first packet, and then strip the SRH from the first packet in which the tunnel header is encapsulated. A time sequence of stripping the SRH and encapsulating the tunnel header in the process of generating the third packet is not limited in this embodiment. It should be understood that it is an optional manner that the third packet includes the tunnel header. In another embodiment, the first proxy node may directly use the first packet from which the SRH is stripped as the third packet. In this case, the third packet may alternatively not include the tunnel header.

The third packet may include a source address and a destination address. If the first proxy node and the SF node establish a transmission tunnel, the tunnel header of the third packet may include a source address and a destination address, where the source address in the tunnel header of the third packet is used to identify the first proxy node, and the destination address in the tunnel header of the third packet is used to identify the SF node. An address of the first proxy node and an address of the SF node may be pre-configured on the first proxy node. In the process of generating the third packet, the first proxy node may query the configuration to obtain the address of the first proxy node and the address of the SF node, and write the address of the first proxy node to the source address in the tunnel header and write the address of the SF node to the destination address in the tunnel header. Mutual reference may be made between addresses configured on the first proxy node and the SF node. For example, the address that is of the first proxy node and that is configured on the first proxy node may be the same as an address that is of the first proxy node and that is configured on the SF node, and the address that is of the SF node and that is configured on the first proxy node may be the same as an address that is of the SF node and that is configured on the SF node. Forms of the source address and the destination address in the tunnel header may be determined based on a configuration operation, for example, each may be a form of an IPv4 address, each may be a form of an IPv6 address, or certainly each may be configured as another form based on a requirement.

In addition, if the first proxy node and the SF node do not establish a transmission tunnel, the source address of the third packet may be an address of a source device of a payload, for example, an address of a terminal device, and the destination address of the third packet may be an address of a destination device to be finally reached after the payload is processed, for example, an address of another terminal device.

The third packet sent by the first proxy node to the SF node may have a plurality of formats based on different actual service scenarios.

Figure 26:
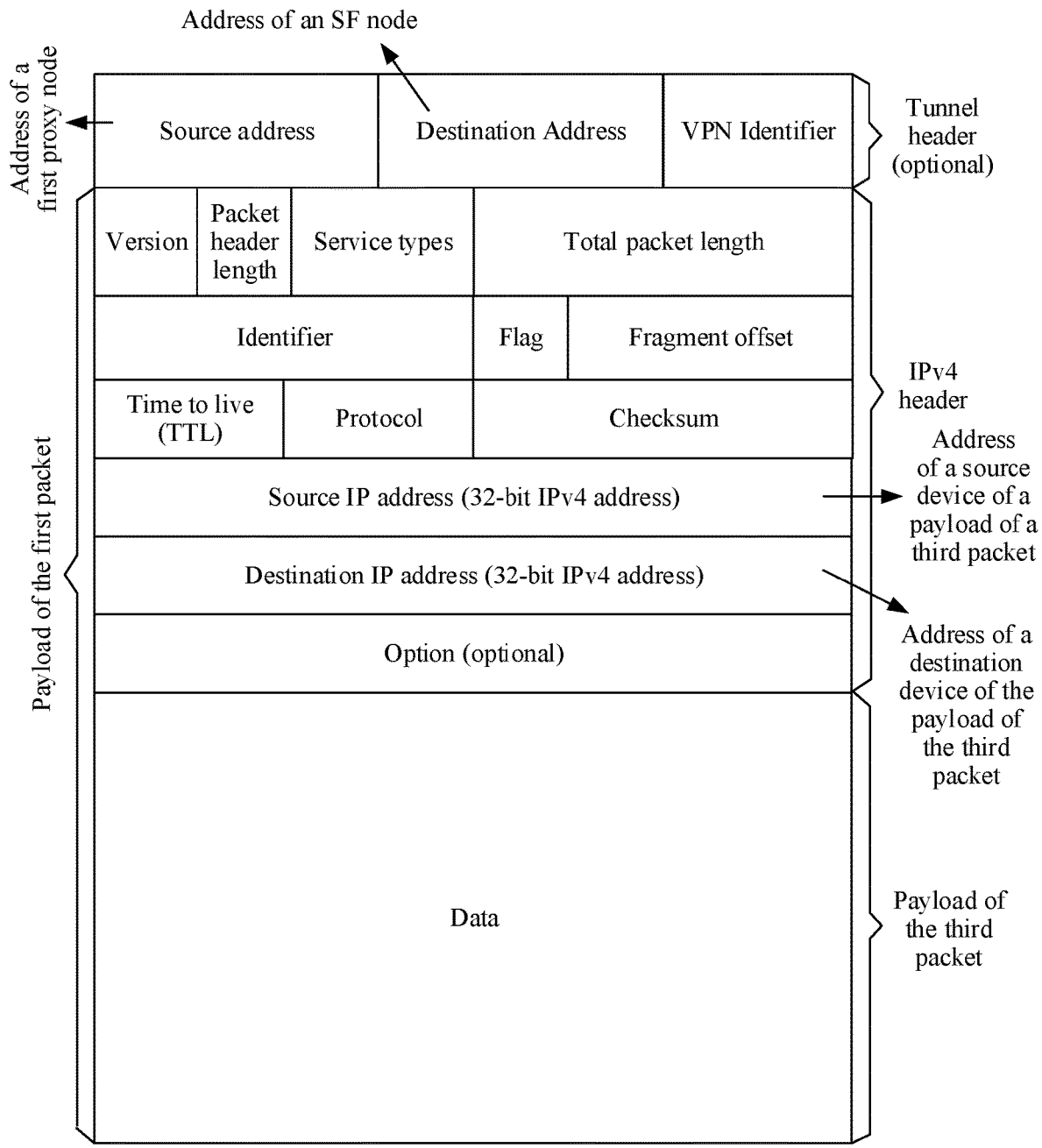
FIG. 26 is a schematic diagram of a third packet according to an embodiment of this application.

For example, refer to FIG. 26. If the payload of the first packet is an IPv4 packet, the third packet may be shown in FIG. 26, and the third packet may be an IPv4 packet. Optionally, if the first proxy node and the SF node establish a transmission tunnel, the third packet may further include a tunnel header in addition to the IPv4 packet, and the tunnel header may be before an IPv4 header of the IPv4 packet.

Figure 27:
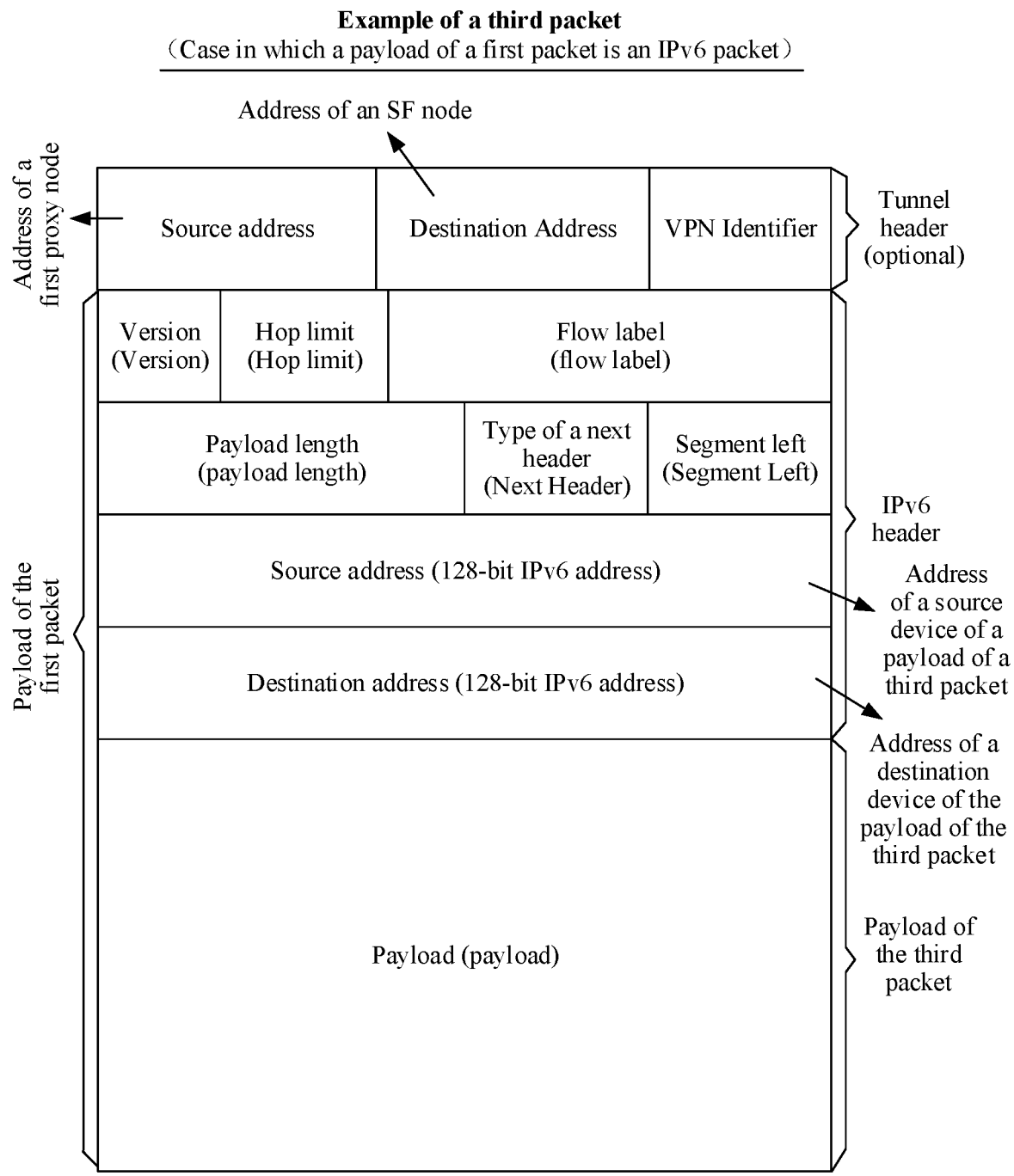
FIG. 27 is a schematic diagram of a third packet according to an embodiment of this application.

Refer to FIG. 27. If the payload of the first packet is an IPv6 packet, the third packet may be shown in FIG. 27, and the third packet may be an IPv6 packet. Optionally, if the first proxy node and the SF node establish a transmission tunnel, the third packet may further include a tunnel header in addition to the IPv6 packet, and the tunnel header may be before an IPv6 header of the IPv6 packet.

Figure 28:
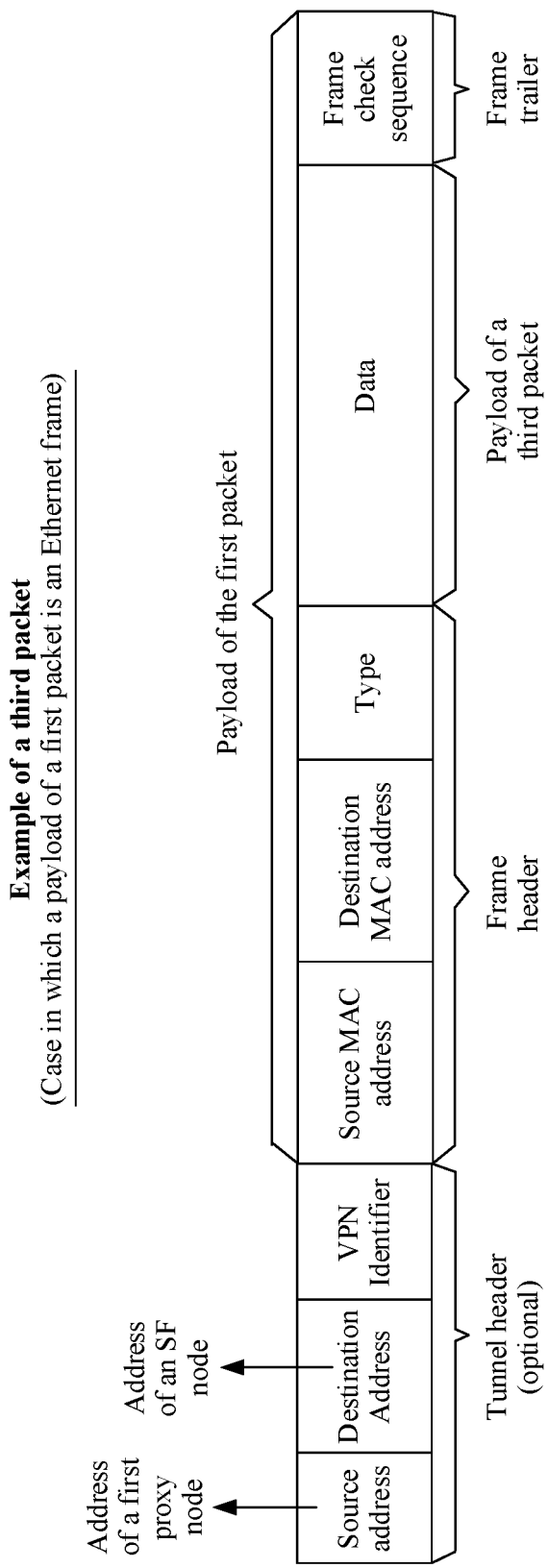
FIG. 28 is a schematic diagram of a third packet according to an embodiment of this application.

Refer to FIG. 28. If the payload of the first packet is an Ethernet frame, the third packet may be shown in FIG. 28, and the third packet may be an Ethernet frame. Optionally, if the first proxy node and the SF node establish a transmission tunnel, the third packet may further include a tunnel header in addition to the Ethernet frame, and the tunnel header may be before a frame header of the Ethernet frame.

Figure 29:
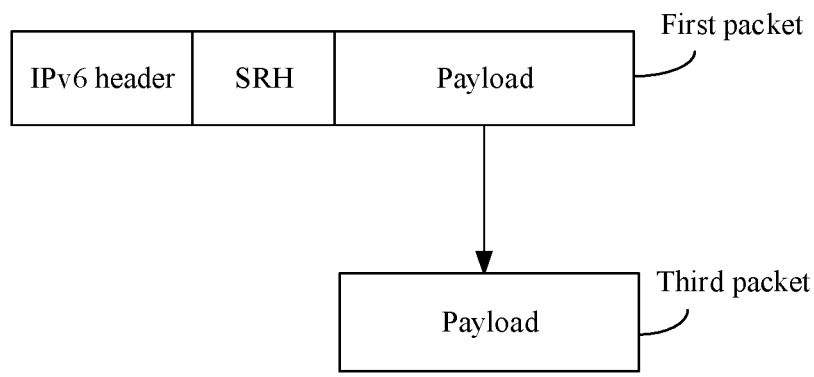
FIG. 29 is a schematic diagram of evolving a first packet to a second packet according to an embodiment of this application.
Figure 30:
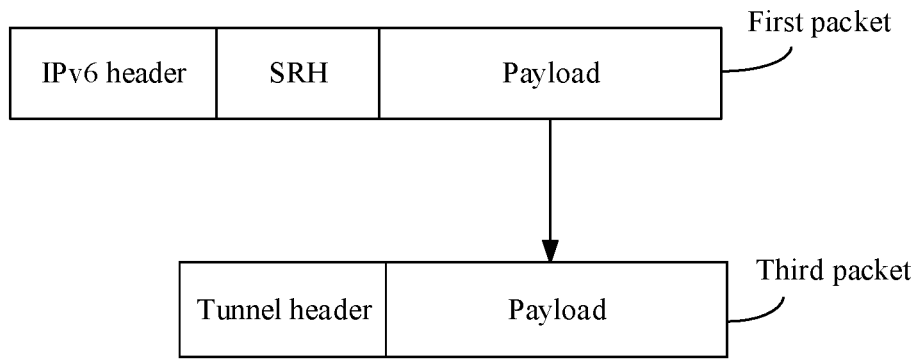
FIG. 30 is a schematic diagram of evolving a first packet to a second packet according to an embodiment of this application.

In a scenario in which the first proxy node and the SF node do not establish a transmission tunnel, FIG. 29 is a schematic diagram of evolving a first packet to a third packet, where a payload of the first packet may be obtained and used as the third packet. In a scenario in which the first proxy node and the SF node establish a transmission tunnel, FIG. 30 is a schematic diagram of evolving a first packet to a third packet, where a payload of the first packet may be obtained, and a tunnel header is encapsulated before the payload, to obtain the third packet.

Step 509: The first proxy node sends the third packet to the SF node.

At least the following effects brought by step 508 and step 509 can be achieved: The first proxy node can transmit the payload of the first packet to the SF node, so that the SF node can process the payload, to implement a corresponding service function by processing the packet. In addition, the SRH of the packet is prevented from being transmitted to the SF node, to avoid a case in which packet processing fails because the SF node does not identify the SRH, so that a dynamic proxy function is implemented.

It should be understood that descriptions are provided in this embodiment only by using an example in which processes of generating and sending the third packet are described before processes of generating and sending the second packet are described. A sequence of generating the second packet and generating the third packet is not limited in this embodiment, and a sequence of sending the second packet and sending the third packet is not limited either. In an embodiment, step 503 and step 504 and step 508 and step 509 may be performed in sequence. For example, step 508 and step 509 may be performed before step 503 and step 504, or step 503 and step 504 may be performed before step 508 and step 509. In another embodiment, step 503 and step 504 and step 508 and step 509 may be performed simultaneously.

Step 510: The SF node receives the third packet from the first proxy node, and processes the third packet to obtain a fourth packet.

The fourth packet is a packet obtained when the SF node performs processing. The SF node may perform service function processing on the third packet according to a configured service policy, to obtain the fourth packet. In this embodiment, descriptions are provided in this embodiment by using a self-transmitting and other-receiving scenario of a proxy node as an example. The self-transmitting and other-receiving scenario means that one proxy node sends a packet to the SF node, and another proxy node receives the packet returned by the SF node. In this scenario, descriptions are provided in this embodiment by using an example in which the SF node sends a processed packet to the second proxy node after receiving a packet from the first proxy node.

There may be a plurality of application scenarios in which the SF node chooses to send the processed packet (that is, the fourth packet) to the second proxy node. For example, if the SF node determines that a status of an outbound interface connected to the first proxy node is down, the SF node may choose to send the processed packet to the second proxy node. For another example, if a link between the SF node and the first proxy node is congested, the SF node may choose to send the processed packet to the second proxy node, so that the packet is transmitted through a link between the SF node and the second proxy node, to implement offloading.

In a manner in which the SF node processes the packet, for example, the SF node may perform intrusion detection on the third packet, to implement a service function of a firewall. For another example, the SF node may modify a 5-tuple, MAC frame information, or application layer information of the third packet, to implement a NAT service function. For still another example, the SF node may perform load balancing, user authentication, and the like on the third packet. The processing manner of the SF node is not limited in this embodiment.

The fourth packet may include a source address and a destination address. If the first proxy node and the SF node do not establish a transmission tunnel, the source address of the fourth packet may be the same as the source address of the third packet, and the source address of the fourth packet may be a source address of the payload, that is, an address of a source device of the payload, for example, an address of a terminal device; and the destination address of the fourth packet may be the same as the destination address of the third packet, and is an address of a destination device to be finally reached after the payload is processed, for example, an address of another terminal device. If the first proxy node and the SF node establish a transmission tunnel, a tunnel header of the fourth packet may include a source address and a destination address, where the source address in the tunnel header of the fourth packet is used to identify the SF node, and the destination address in the tunnel header of the fourth packet is used to identify the first proxy node. An address of the first proxy node and an address of the SF node may be pre-configured on the SF node. In a process of generating the fourth packet, the SF node may query the configuration, write the address of the SF node to the source address in the tunnel header, and write the address of the first proxy node to the destination address in the tunnel header.

Step 511: The SF node sends the fourth packet to the second proxy node.

The SF node may send the fourth packet in a plurality of manners based on a specific function of the SF node and different networking deployments. For example, in the self-transmitting and other-receiving scenario, the SF node may pre-store a binding relationship between an inbound interface corresponding to the first proxy node and an outbound interface corresponding to the second proxy node. In this case, after receiving the third packet through the inbound interface and generating the fourth packet, the SF node selects, based on the binding relationship, the outbound interface bound to the inbound interface to send the fourth packet, so that the packet arrives at the second proxy node after being sent through the outbound interface. The binding relationship may be determined based on a configuration operation. For example, if the SF node is connected to proxy1 through an inbound interface 1, and is connected to proxy2 through an outbound interface 2, a forwarding rule may be pre-configured for the SF node: After a packet received through the inbound interface 1 is processed, an obtained packet is sent through the outbound interface 2. Therefore, after proxy1 sends the third packet, the SF node receives the third packet through the inbound interface 1, and the SF node queries the forwarding rule in a forwarding table, and sends the third packet to proxy2 through the outbound interface 2.

Step 512: The second proxy node receives the fourth packet from the SF node, and queries the second cache entry based on the fourth packet, to obtain the SRH of the first packet.

The second proxy node may obtain an index corresponding to the SRH based on the fourth packet, query a cache of the second proxy node based on the index, find the second cache entry, and obtain the SRH of the first packet from the second cache entry.

In an embodiment, a query manner of the SRH of the first packet may include any one of the following query manners 1 to 3:

Query manner 1: The second proxy node may obtain, based on the fourth packet, a flow identifier corresponding to the first packet, and query the cache by using the flow identifier corresponding to the first packet as an index, to obtain the SRH of the first packet. A flow identifier corresponding to the fourth packet may be the flow identifier corresponding to the first packet.

Query manner 2: The second proxy node may obtain an identifier of a first cache entry based on the fourth packet, and query the cache by using the identifier of the first cache entry as an index, to obtain the SRH of the first packet, where the fourth packet may include the identifier of the first cache entry. For details about this query manner, refer to the following embodiment shown in FIG. 36A and FIG. 36B and the following embodiment shown in FIG. 37A and FIG. 37B.

Query manner 3: The second proxy node may obtain, based on the fourth packet, a flow identifier corresponding to the fourth packet and a VPN identifier, and query the cache based on the flow identifier corresponding to the fourth packet, the VPN identifier, and the End.AD SID, to obtain the SRH of the first packet, where the flow identifier corresponding to the fourth packet may be the flow identifier corresponding to the first packet, the fourth packet may include a VPN identifier, and the VPN identifier may be mapped to the End.AD SID. For details about this query manner, refer to the following embodiment shown in FIG. 38A and FIG. 38B and the following embodiment shown in FIG. 39A and FIG. 39B.

Step 513: The second proxy node generates a fifth packet based on the fourth packet and the SRH of the first packet.

The fifth packet is a packet obtained by restoring the SRH based on the fourth packet. The fifth packet includes a payload of the fourth packet and the SRH of the first packet. The second proxy node may encapsulate the SRH of the first packet in the fourth packet, to obtain the fifth packet.

Corresponding to step 508, in an embodiment, the second proxy node may directly use the fourth packet in which the SRH of the first packet is encapsulated as the fifth packet. In another embodiment, the second proxy node may establish a transmission tunnel with the SF node, and the fourth packet includes a tunnel header corresponding to the transmission tunnel. In this case, the second proxy node may not only encapsulate the SRH of the first packet, but also strip the tunnel header of the fourth packet, so that the fifth packet does not include the tunnel header of the fourth packet. The tunnel header of the fourth packet may be a VXLAN tunnel header, a GRE tunnel header, an IP-in-IP tunnel header, or the like. The second proxy node may first encapsulate the SRH of the first packet in the fourth packet, and then strip the tunnel header from the fourth packet in which the SRH is encapsulated, or may first strip the tunnel header from the fourth packet, and then encapsulate the SRH in the fourth packet from which the tunnel header is stripped. A timing of stripping the tunnel header and encapsulating the SRH is not limited in this embodiment.

Step 514: The second proxy node sends the fifth packet to the routing node.

Step 515: The routing node receives the fifth packet from the second proxy node, and forwards the fifth packet.

According to the method provided in this embodiment, a new SID with a bypass function is extended for an End.AD SID. Therefore, when receiving a packet that carries the End.AD SID, a local proxy node uses this new SID to transmit an SRH of the packet to a peer proxy node in a bypass manner, so that the peer proxy node can also obtain the SRH of the packet, and therefore the SRH of the packet can be stored in the peer proxy node. In this way, synchronization of the SRH of the packet can be implemented between the two proxy nodes that are dual-homed to the same SF node, so that the SRH of the packet is redundantly backed up. In this case, after processing the packet, the SF node may choose to return the processed packet to the peer proxy node. Because the peer proxy node obtains the SRH of the packet in advance, the peer proxy node can restore the SRH of the packet by using a previously stored SRH, so that the packet processed by the SF node can be normally transmitted by using the restored SRH.

In the foregoing method embodiment, the first proxy node or the second proxy node may maintain synchronization of a cache entry between the two proxy nodes by using a state machine. The following describes an example of the state machine.

The state machine may be denoted as a peer cache state machine, and the state machine indicates a status in which the local proxy node sends a packet to the peer proxy node. A state machine of the first proxy node indicates a status in which the first proxy node sends a packet to the second proxy node, and a state machine of the second proxy node indicates a status in which the first proxy node sends a packet to the second proxy node. For either of the first proxy node and the second proxy node, the proxy node may add a target field to each cache entry in the cache, write a current state of the state machine to the target field, and when receiving the first packet, determine a to-be-performed action based on a value of the target field in the cache entry. The target field may be denoted as a peer cache state field, and the target field is used to record a current state of the state machine. The state machine may include a current state, a next state, an event, and a target action. The first proxy node may perform, based on the detected event and the current state of the state machine, a target action that is in the state machine and that corresponds to the event and the current state, to switch the state machine to the next state of the current state. For example, the state machine may be either of a first state machine and a second state machine.

Figure 31:
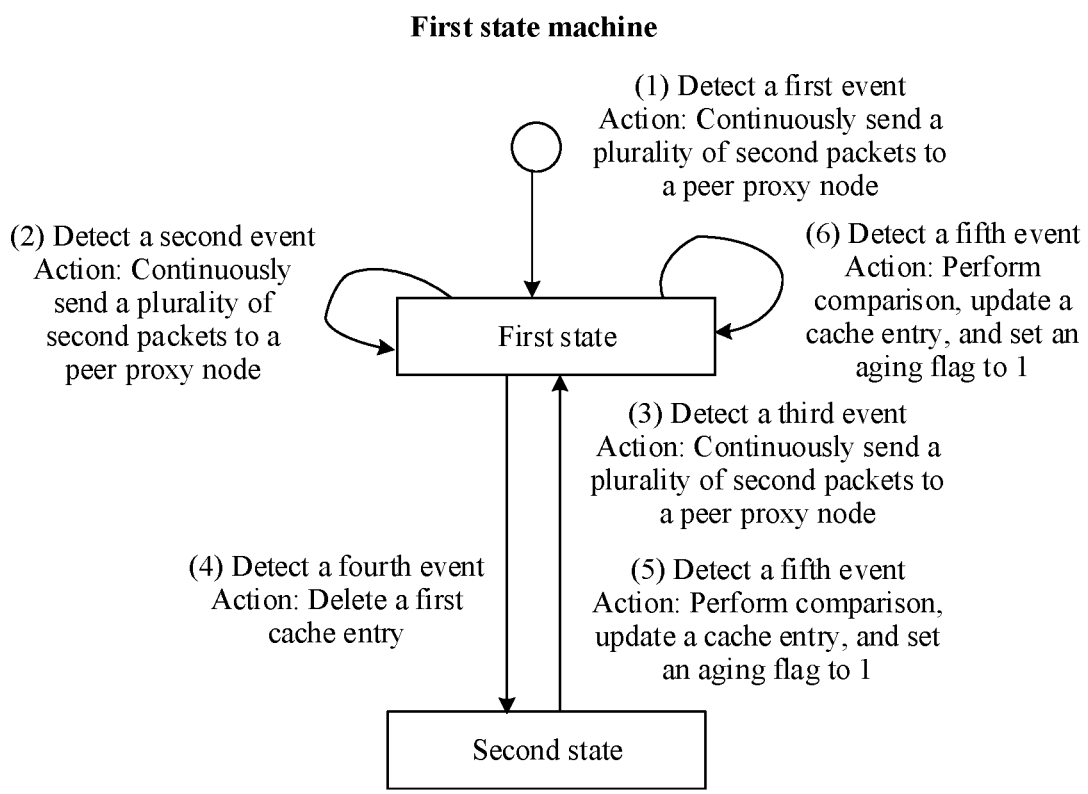
FIG. 31 is a schematic diagram of a first state machine according to an embodiment of this application.

FIG. 31 is a schematic diagram of a first state machine according to an embodiment of this application. The first state machine is applicable to a case in which transmission reliability is ensured through repeated sending, and a processing policy provided by the first state machine may include one or more of the following (1) to (6). It should be understood that the following first state machine may be applied to the first proxy node, or may be applied to the second proxy node. For the first proxy node, a peer proxy node is the second proxy node, and for the second proxy node, a peer proxy node is the first proxy node.

(1) If a first event is detected, a plurality of second packets are continuously sent to the peer proxy node, and the state machine is switched to a first state.

The first event is that the first cache entry is generated, and the first event may be denoted as a local cache new event in a program. The first state indicates that the second cache entry is the same as the first cache entry, and the first state may be denoted as a cache equal state in a program.

(2) If the second event is detected, a plurality of second packets are continuously sent to the peer proxy node, and the state machine is switched to a first state.

The second event is that the first cache entry is updated, and the second event may be denoted as a LocalCache_Upd (indicating local cache update, where Upd represents "update") event in a program.

(3) If a third event is detected and the state machine is in a second state, a plurality of second packets are continuously sent to the peer proxy node, and the state machine is switched to a first state.

The third event is that the first packet is received, and the third event may be denoted as a local cache touch event in a program. The second state indicates that a peer cache entry is determined to be older than a local cache entry, or a peer cache entry is suspected to be older than a local cache entry. In the second state, the local proxy node may send the second packet to the peer proxy node, to update the SRH in the cache entry of the peer proxy node. The second state may be denoted as a cache older (Cache_Older) state in a program.

(4) If the fourth event is detected and the state machine is in a first state, the first cache entry is deleted.

The fourth event is that an aging timer expires, and the fourth event may be denoted as an AgingTimer_Expired (aging timer expired) event in a program. That an aging timer expires indicates that the first cache entry is in an old state. In this case, the first cache entry may be cleared, to save cache space. Specifically, the first proxy node may start the aging timer, and set a corresponding aging flag (aging flag) for the first cache entry, where a value of the aging flag may be 1 or 0. In addition, the first proxy node may periodically scan the first cache entry by using the aging timer. If the first proxy node finds that the aging flag corresponding to the first cache entry is 1, the first proxy node changes the aging flag to 0, or if the first proxy node finds that the aging flag corresponding to the first cache entry is 0, the first proxy node deletes the first cache entry. In a process of forwarding the packet, if the first proxy node hits the first cache entry when querying the cache, the first proxy node sets the aging flag corresponding to the first cache entry to 1, so that the first cache entry resides in the cache.

(5) If a fifth event is detected and the state machine is in a first state, it is determined, through comparison, whether an SRH carried in the second packet is the same as an SRH stored in the cache, and if the SRH carried in the second packet is different from the stored SRH, the SRH carried in the second packet is stored in the cache entry, to update the cache, set an aging flag to 1, and keep the current state of the state machine unchanged.

The fifth event is an event of receiving the second packet, and the fifth event may be denoted as a CacheSync_Recv (indicating cache synchronize receive, where Sync represents "Synchronize", and means that the SRH is synchronized with a cache of the peer proxy node, and Recv represents "receive") event in a program.

(6) If a fifth event is detected and the state machine is in a second state, it is determined, through comparison, whether an SRH that is of the first packet and that is carried in the second packet is the same as an SRH stored in the cache, and if the SRH that is of the first packet and that is carried in the second packet is different from the stored SRH, the SRH that is of the first packet and that is carried in the second packet is stored in the cache entry, to update the cache, set an aging flag to 1, and switch the state machine to a first state.

Figure 32:
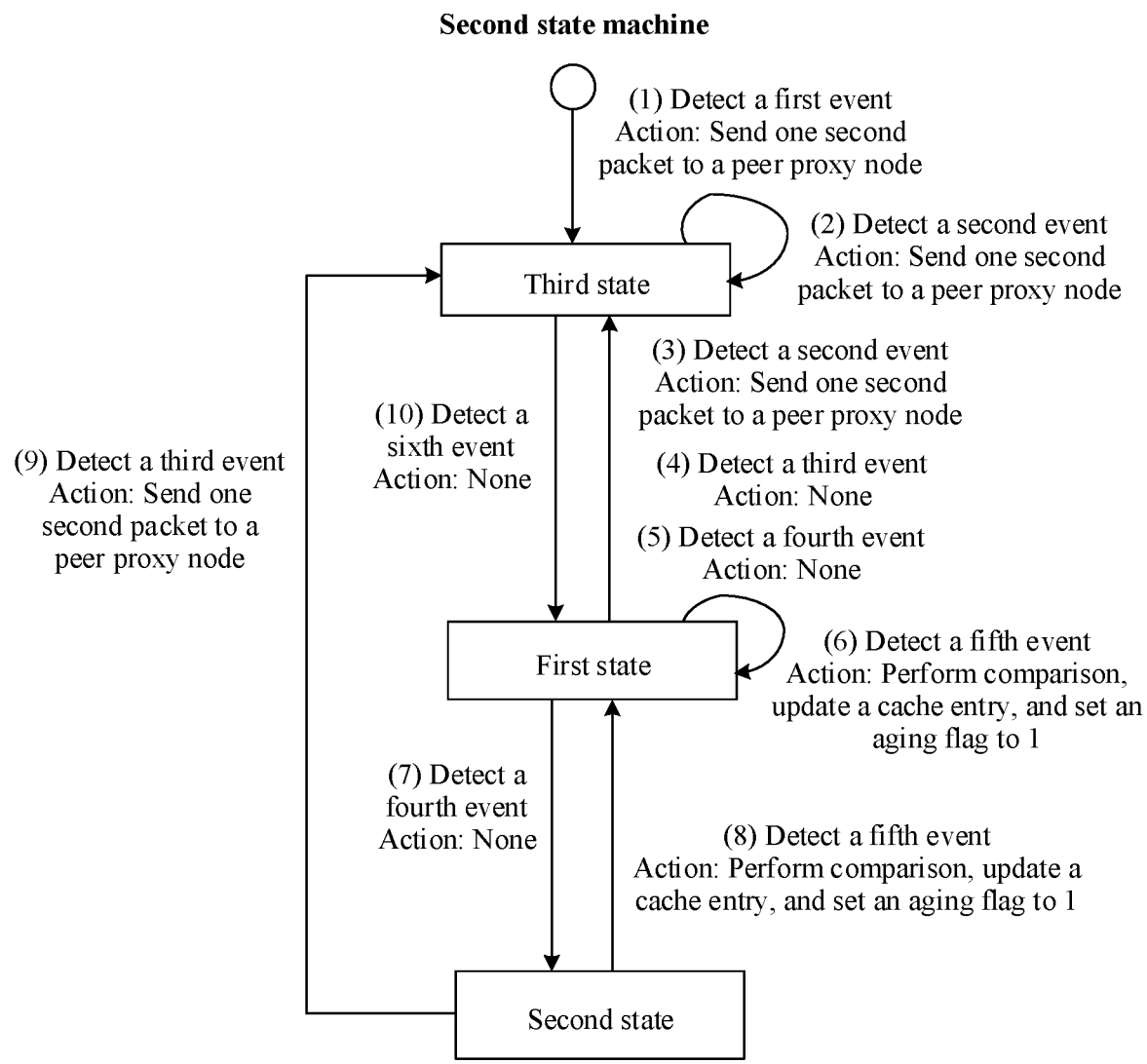
FIG. 32 is a schematic diagram of a second state machine according to an embodiment of this application.

FIG. 32 is a schematic diagram of a second state machine according to an embodiment of this application. The second state machine is applicable to a case in which transmission reliability is ensured by using an acknowledgment mechanism, and a processing policy provided by the second state machine may include one or more of the following (1) to (10). It should be noted that the following mainly focuses on a difference between the second state machine and the first state machine. For features similar to those of the first state machine, refer to the first state machine. Details are not described below.

(1) If a first event is detected, one second packet is sent to the peer proxy node, and the state machine is switched to a third state.

The third state indicates that the cache entry is locally generated or updated, and the second packet is sent to the peer proxy node to wait for acknowledgment of an operation result of the second packet from the peer proxy node, and the third state may be denoted as a Sync_Start (indicating synchronize start, where Sync represents "Synchronize", and Start represents "start") state in a program.

(2) If a second event is detected and the state machine is in a third state, one second packet is sent to the peer proxy node, and the current state of the state machine keeps unchanged.

(3) If a second event is detected and the state machine is in a first state, one second packet is sent to the peer proxy node, and the state machine is switched to a third state.

(4) If a third event is detected and the state machine is in a third state, the state machine is switched to a first state.

(5) If a fourth event is detected and the state machine is in a third state, the state machine is switched to a first state.

In (4) and (5), an action of sending the second packet may not be performed, to prevent the two proxy nodes from simultaneously being in the third state and locking each other.

(6) If a fifth event is detected and the state machine is in a first state, it is determined, through comparison, whether an SRH that is of the first packet and that is carried in the second packet is the same as an SRH stored in the cache, and if the SRH that is of the first packet and that is carried in the second packet is different from the stored SRH, the SRH that is of the first packet and that is carried in the second packet is stored in the cache entry, to update the cache, set an aging flag (aging flag) to 1, and keep the current state of the state machine unchanged.

(7) If a fourth event is detected and the state machine is in a first state, the state machine is switched to a second state.

(8) If a fifth event is detected and the state machine is in a second state, it is determined, through comparison, whether an SRH that is of the first packet and that is carried in the second packet is the same as an SRH stored in the cache, and if the SRH that is of the first packet and that is carried in the second packet is different from the stored SRH, the SRH that is of the first packet and that is carried in the second packet is stored in the cache entry, to update the cache, set an aging flag (aging flag) to 1, and switch the state machine to a first state.

(9) If a third event is detected and the state machine is in a second state, one second packet is sent to the peer proxy node, and the state machine is switched to a third state.

(10) If a sixth event is detected and the state machine is in a third state, the state machine is switched to a first state.

The sixth event is that the sixth packet is received, and the sixth event may be denoted as a CacheSync_Ack (indicating cache synchronize acknowledge, where Sync represents "Synchronize", and Ack represents "Acknowledge") event in a program According to the mechanism of the state machine, at least the following effects can be achieved: The state machine can determine a currently executed action in real time based on the status in which the local proxy node sends a packet to the peer proxy node, to transmit the SRH to the peer proxy node in a timely manner, so as to ensure that synchronization of the cache entry is maintained between the local proxy node and the peer proxy node, and implement SRH consistency between the proxy nodes that are dual-homed to the same SF node.

Figure 33:
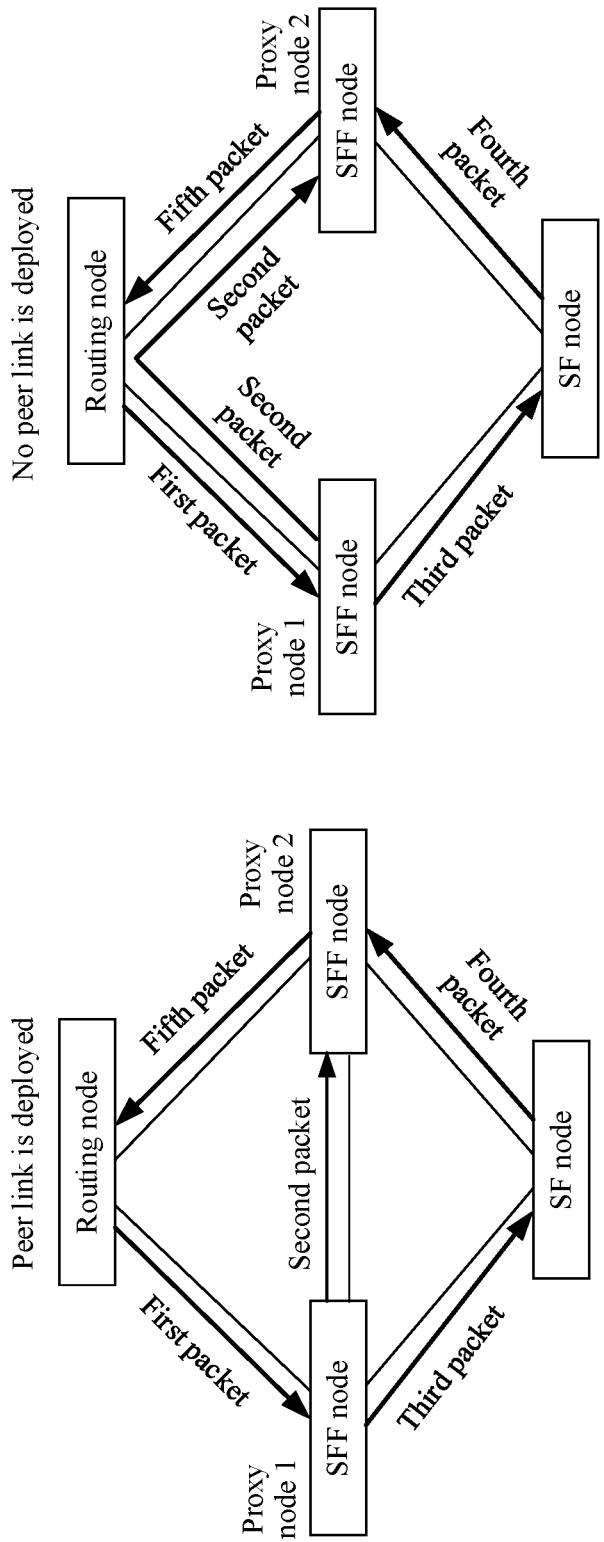
FIG. 33 is a schematic diagram of packet transmission in a self-transmitting and other-receiving scenario according to an embodiment of this application.
Figure 34:
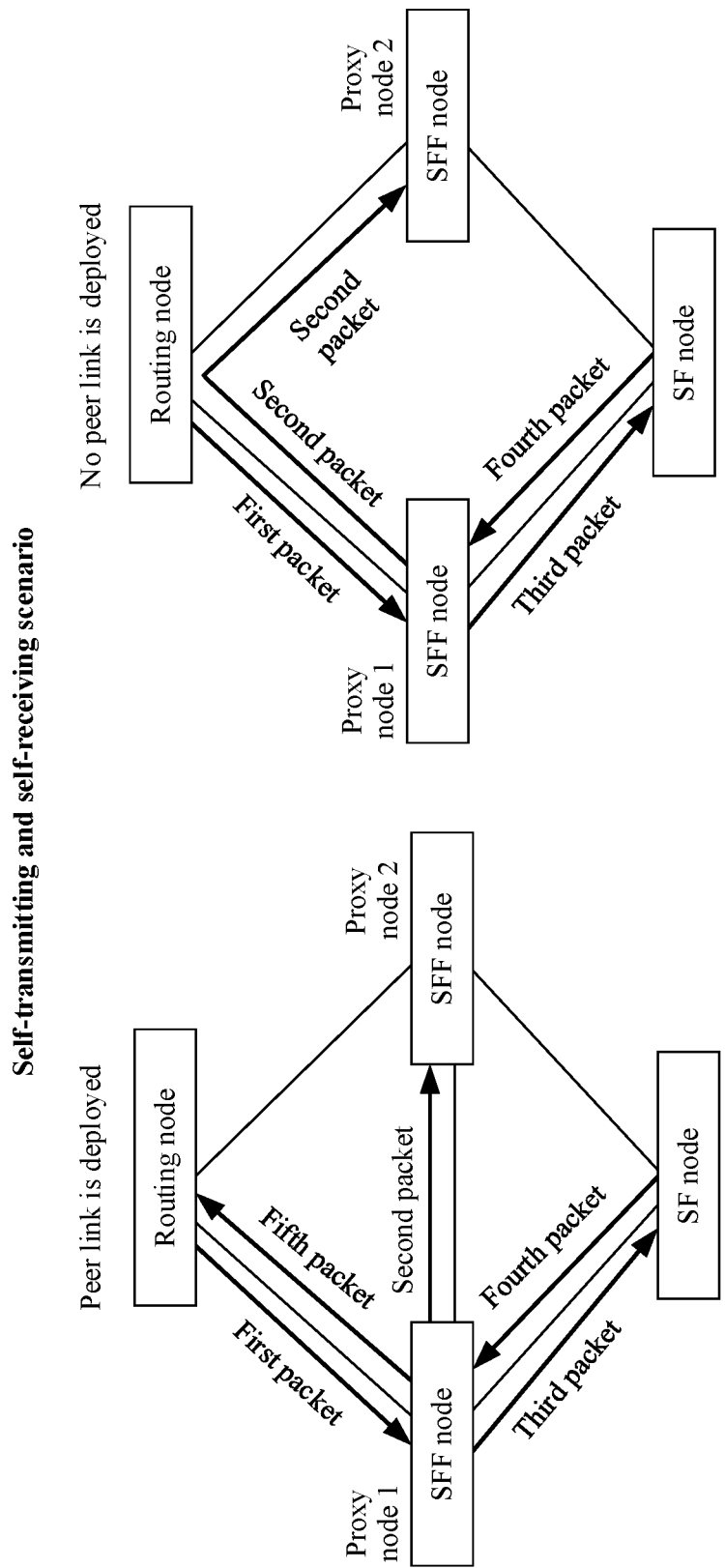
FIG. 34 is a schematic diagram of packet transmission in a self-transmitting and self-receiving scenario according to an embodiment of this application.

The foregoing method embodiment may be applied to the self-transmitting and other-receiving scenario of the proxy node. FIG. 33 is a schematic diagram of packet transmission in a self-transmitting and other-receiving scenario according to an embodiment of this application. In FIG. 33, after receiving a packet from a proxy node 1, an SF node returns a processed packet to a proxy node 2. The self-transmitting and other-receiving scenario is optional. The packet transmission method provided in this embodiment of this application may be further applied to a self-transmitting and self-receiving scenario of a proxy node. The self-transmitting and self-receiving scenario means that after a proxy node sends a packet to an SF node, the proxy node still receives the packet returned by the SF node. In this scenario, after receiving the packet from the proxy node, the SF node returns a processed packet to the proxy node. FIG. 34 is a schematic diagram of packet transmission in a self-transmitting and self-receiving scenario according to an embodiment of this application. In FIG. 34, after receiving a packet from a proxy node 1, an SF node returns a processed packet to the proxy node 1.

Figure 35A:
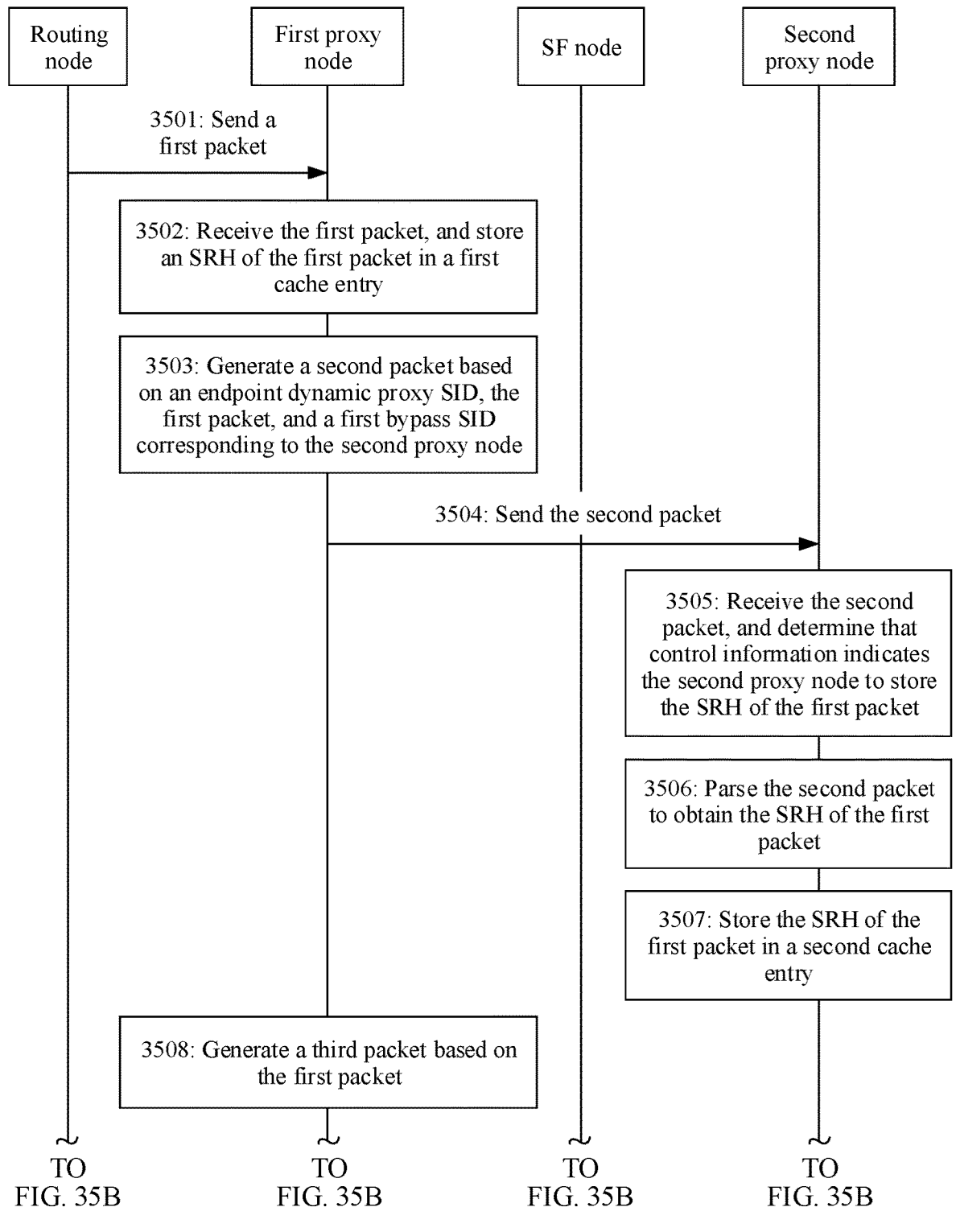
FIG. 35A and FIG. 35B are a flowchart of a packet transmission method according to an embodiment of this application.
Figure 35B:
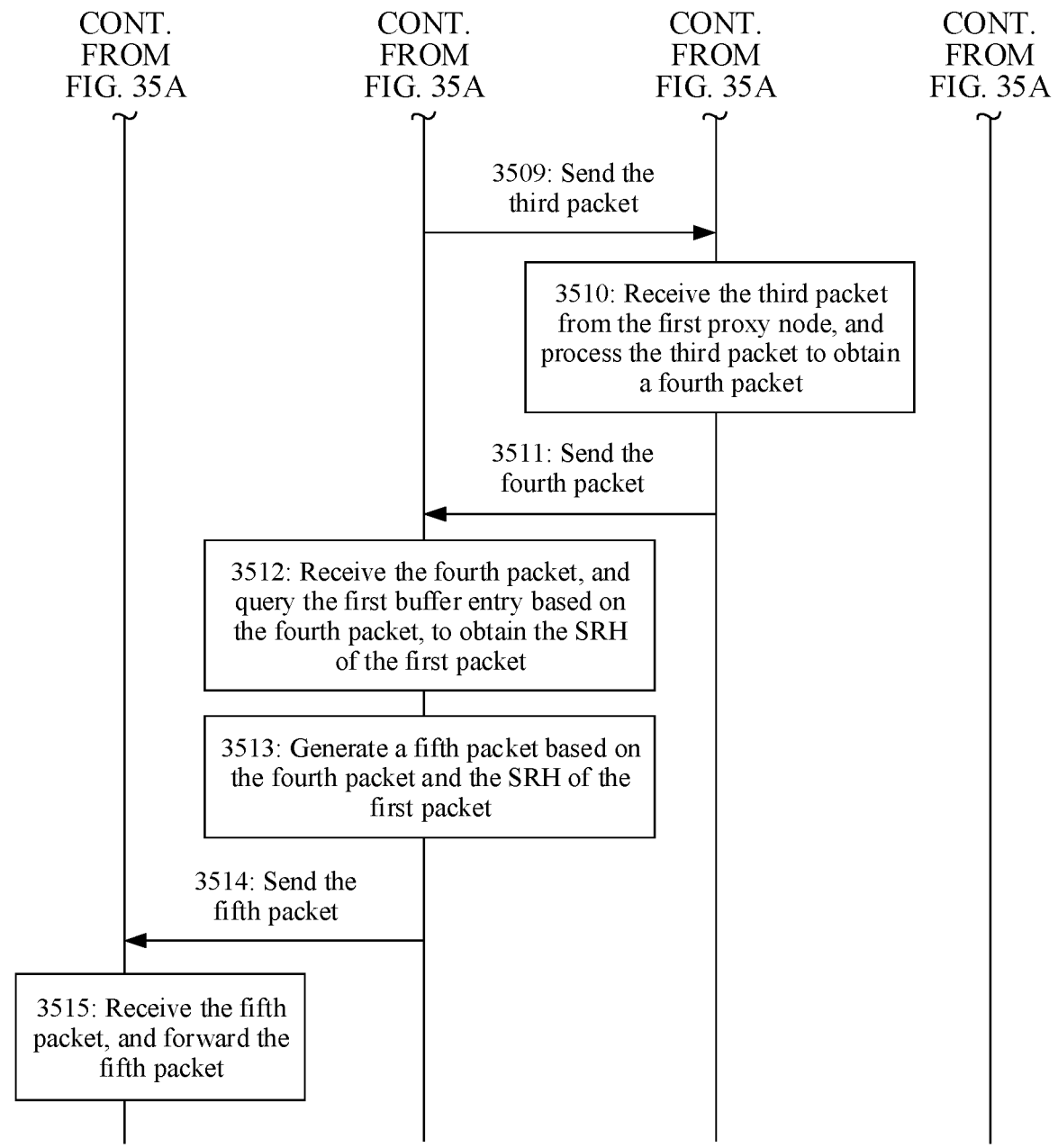

The following describes an example of a packet transmission procedure in the self-transmitting and self-receiving scenario with reference to an embodiment in FIG. 35A and FIG. 35B. It should be noted that the embodiment in FIG. 35A and FIG. 35B mainly focuses on a difference from the embodiment in FIG. 5A and FIG. 5B. For steps similar to those in the embodiment in FIG. 5A and FIG. 5B, refer to the embodiment in FIG. 5A and FIG. 5B. Details are not described in the embodiment in FIG. 35A and FIG. 35B.

FIG. 35A and FIG. 35B are a flowchart of a packet transmission method according to an embodiment of this application. The method may include the following steps.

Step 3501: A routing node sends a first packet to a first proxy node.

Step 3502: The first proxy node receives the first packet from the routing node, and the first proxy node stores an SRH of the first packet in a first cache entry.

Step 3503: The first proxy node generates a second packet based on an endpoint dynamic proxy SID, the first packet, and a first bypass SID corresponding to a second proxy node.

Step 3504: The first proxy node sends the second packet to the second proxy node.

Step 3505: The second proxy node receives the second packet from the first proxy node, and determines that control information indicates the second proxy node to store the SRH of the first packet.

Step 3506: The second proxy node parses the second packet to obtain the SRH of the first packet.

Step 3507: The second proxy node stores the SRH of the first packet in a second cache entry.

Step 3508: The first proxy node generates a third packet based on the first packet.

Step 3509: The first proxy node sends the third packet to an SF node.

Step 3510: The SF node receives the third packet from the first proxy node, and processes the third packet to obtain a fourth packet.

Step 3511: The SF node sends the fourth packet to the first proxy node.

Different from the embodiment in FIG. 5A and FIG. 5B, in this embodiment, the SF node may return the fourth packet to the first proxy node. Specifically, the SF node may select an outbound interface corresponding to the first proxy node, and send the fourth packet through the outbound interface.

For example, in the self-transmitting and self-receiving scenario, the SF node may pre-store a binding relationship between an inbound interface corresponding to the first proxy node and the outbound interface corresponding to the first proxy node. In this case, after receiving the third packet through the inbound interface and generating the fourth packet, the SF node selects, based on the binding relationship, the outbound interface bound to the inbound interface to send the fourth packet, so that the packet arrives at the first proxy node after being sent through the outbound interface. The binding relationship may be determined based on a configuration operation. For example, if the SF node is connected to proxy1 through an interface 3, a forwarding rule may be pre-configured for the SF node: After a packet received through the interface 3 is processed, an obtained packet is returned through the interface 3. The SF node stores the forwarding rule in a forwarding table. After proxy1 sends the third packet, the SF node receives the third packet through the interface 3, and the SF node queries the forwarding rule in the forwarding table, and returns the third packet to the first proxy node through the interface 3.

Step 3512: The first proxy node receives the fourth packet from the SF node, and queries the first cache entry based on the fourth packet, to obtain the SRH of the first packet.

Step 3513: The first proxy node generates a fifth packet based on the fourth packet and the SRH of the first packet.

Step 3514: The first proxy node sends the fifth packet to the routing node.

Step 3515: The routing node receives the fifth packet from the first proxy node, and forwards the fifth packet.

According to the method provided in this embodiment, a new SID with a bypass function is extended for an End.AD SID. Therefore, when receiving a packet that carries the End.AD SID, a local proxy node uses this new SID to transmit an SRH of the packet to a peer proxy node in a bypass manner, so that the peer proxy node can also obtain the SRH of the packet, and therefore the SRH of the packet can be stored in the peer proxy node. In this way, synchronization of the SRH of the packet can be implemented between the two proxy nodes that are dual-homed to the same SF node, so that the SRH of the packet is redundantly backed up, to improve security of the SRH of the packet.

A basic packet transmission procedure is described in the foregoing method embodiment. The method provided in this embodiment of this application may further support a NAT scenario. In the NAT scenario, a service function of the SF node includes modifying a flow identifier. In the NAT scenario, after the SF node performs service processing on a packet, usually, a flow identifier corresponding to a processed packet is different from a flow identifier corresponding to a packet existing before processing. For example, if the service function of the SF node includes performing NAT, the SF node modifies a 5-tuple of the packet. In this case, a processed 5-tuple of the packet is different from a 5-tuple that is of the packet and that exists before processing. In an example scenario, if the SF is a firewall, the SF usually includes a destination network address translation (DNAT) service function. The SF node stores an address pool, replaces a destination address of the packet with an address in the address pool, and returns a packet with the replaced destination address to a proxy node, so that a destination address of the packet received by the proxy node is different from the destination address of the packet previously sent by the local proxy node or the peer proxy node to the SF node.

In the NAT scenario, the method provided in this embodiment of this application may be performed, to ensure that when the SF node modifies the flow identifier corresponding to the packet, the proxy node can still find the SRH of the packet based on the packet for which the flow identifier is modified, so as to ensure that the SRH of the packet is restored. The following describes a packet transmission procedure in the NAT scenario in detail with reference to FIG. 36A and FIG. 36B. It should be noted that the embodiment in FIG. 36A and FIG. 36B mainly focuses on a difference from the embodiment in FIG. 5A and FIG. 5B. For steps similar to those in the embodiment in FIG. 5A and FIG. 5B and other features, refer to the embodiment in FIG. 5A and FIG. 5B. Details are not described in the embodiment in FIG. 36A and FIG. 36B.

Figure 36A:
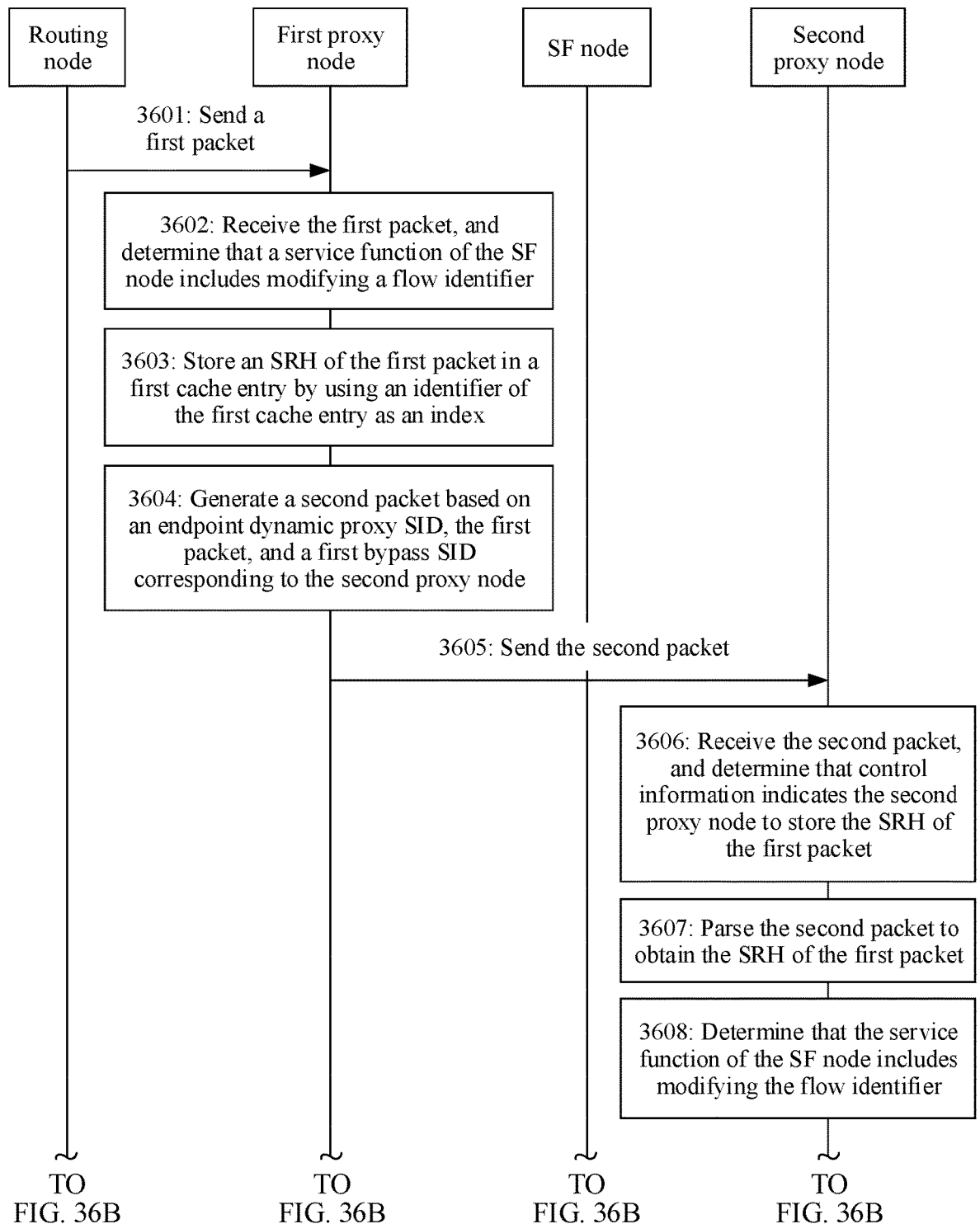
FIG. 36A and FIG. 36B are a flowchart of a packet transmission method according to an embodiment of this application.
Figure 36B:
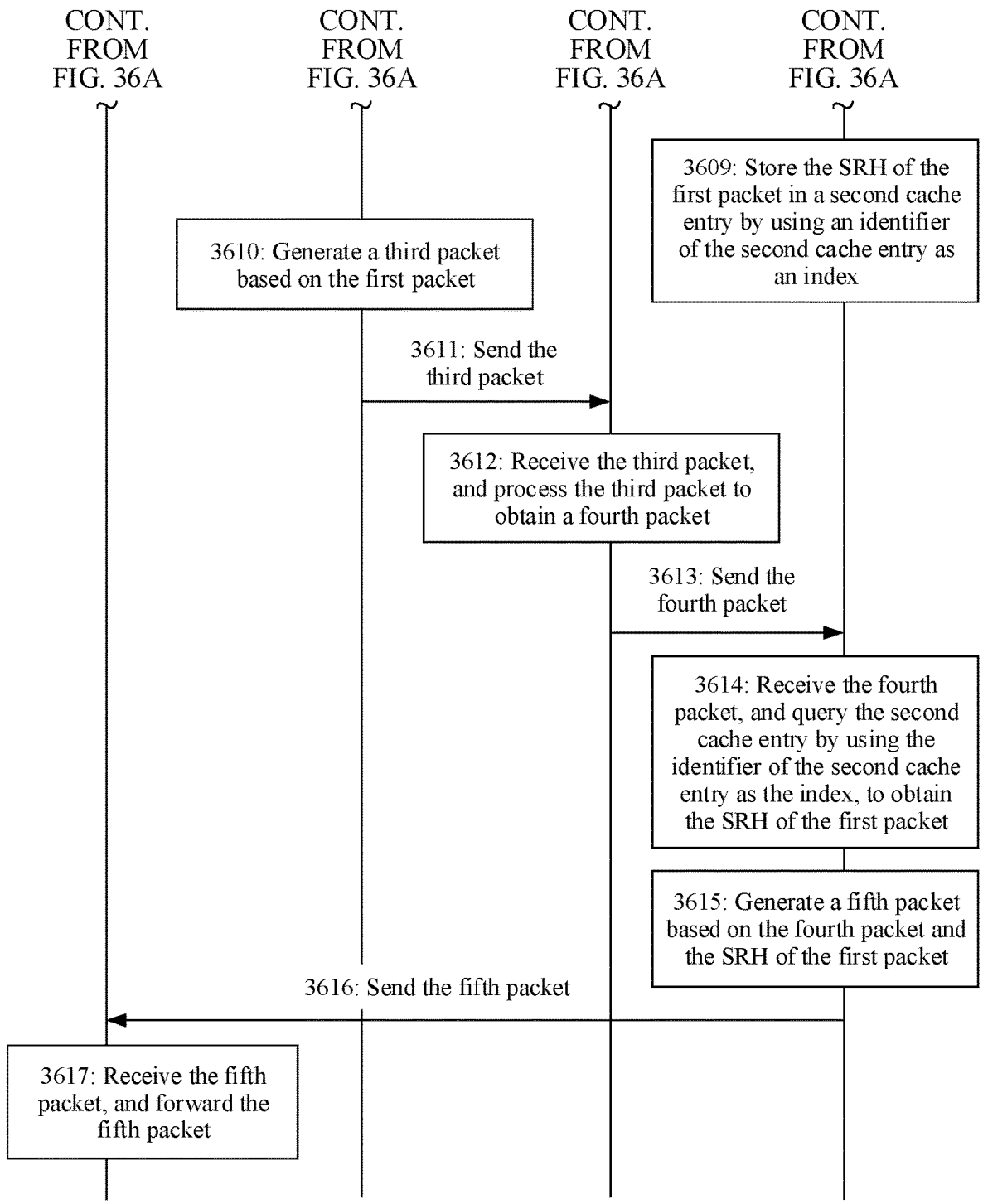

FIG. 36A and FIG. 36B are a flowchart of a packet transmission method according to an embodiment of this application. As shown in FIG. 36A and FIG. 36B, the method may include the following steps.

Step 3601: A routing node sends a first packet to a first proxy node.

Step 3602: The first proxy node receives the first packet from the routing node, and the first proxy node determines that a service function of an SF node includes modifying a flow identifier.

In a process of determining the service function of the SF node, in an embodiment, a configuration operation may be performed on the first proxy node in advance. The first proxy node may receive a configuration instruction, and obtain service function information of the SF node from the configuration instruction, where the service function information indicates that the service function of the SF node includes modifying the flow identifier. The first proxy node may store the service function information of the SF node, and determine, based on the service function information, that the service function of the SF node includes modifying the flow identifier. In another embodiment, the first proxy node may alternatively automatically find that the service function of the SF node includes modifying the flow identifier. For example, the first proxy node may send a capability query request to the SF node, and the SF node may receive the capability query request, and send service function information to the first proxy node in response to the capability query request. The first proxy node may determine, based on the received service function information, that the service function of the SF node includes modifying the flow identifier. Certainly, a traffic classifier or a network controller may alternatively send service function information of the SF node to the SF node. How the first proxy node determines the service function of the SF node is not limited in this embodiment.

In this embodiment, the first proxy node may perform, by determining that the service function of the SF node includes modifying the flow identifier, a manner provided in the following steps, to ensure that when the SF node modifies the flow identifier corresponding to the packet, the proxy node can still find an SRH of the packet based on the packet for which the flow identifier is modified, so as to ensure that the SRH of the packet is restored.

Step 3603: The first proxy node stores an SRH of the first packet in a first cache entry by using an identifier of the first cache entry as an index.

The identifier of the first cache entry is used to uniquely identify the first cache entry in a cache of the first proxy node. The identifier of the first cache entry may include a cache index of the first cache entry, and the cache index is used to identify the first cache entry on an interface board of the first proxy node. In an embodiment, the first proxy node may include a plurality of interface boards. In this case, the identifier of the first cache entry may further include an identifier of a target board (TB), the target board is an interface board on which the first cache entry is located, and the identifier of the target board is used to identify a target board in each interface board of the first proxy node.

Step 3604: The first proxy node generates a second packet based on an endpoint dynamic proxy SID, the first packet, and a first bypass SID corresponding to a second proxy node.

Step 3605: The first proxy node sends the second packet to the second proxy node.

The second packet may include the identifier of the first cache entry. In addition to indicating the second proxy node to store the SRH of the first packet, control information in the second packet may further indicate the second proxy node to store a mapping relationship between the identifier of the first cache entry and an identifier of a second cache entry. The second cache entry is a cache entry used by the second proxy node to store the SRH of the first packet.

The first proxy node uses the second packet to carry the identifier of the first cache entry and the control information, so that the first proxy node can transmit, to the second proxy node by using the second packet, the identifier of the cache entry used by the local end to store the SRH, and indicate, by using the control information, the second proxy node to maintain a mapping relationship between the cache entry in which the SRH is stored on the first proxy node and the cache entry in which the SRH is stored on the second proxy node.

Optionally, the control information may include a third flag. The third flag is used to identify that the service function of the SF node includes modifying the flow identifier. The second proxy node may be pre-configured, so that if the second proxy node determines that the control information includes the third flag, the second proxy node stores the mapping relationship between the identifier of the first cache entry and the identifier of the second cache entry. For example, the third flag may be denoted as a NAT flag, and the NAT flag is used to identify that the service function of the SF node includes performing NAT. For example, refer to FIG. 7. The second packet may include the extension header shown in FIG. 7. The cache index field and the TB field are used to carry the identifier of the first cache entry, a value of the cache index field may be a cache index in the identifier of the first cache entry, and a value of the TB field may be the identifier that is of the target board and that is in the identifier of the first cache entry. The N field is used to carry the third flag. For example, if a value of the N field may be 1, it indicates that the SF node is an SF node of a NAT type, and the service function of the SF node includes modifying the flow identifier. Therefore, when it is identified that the value of the N field is 1, a mapping relationship between identifiers of cache entries of the two proxy nodes needs to be maintained.

Step 3606: The second proxy node receives the second packet from the first proxy node, and determines that the control information indicates the second proxy node to store the SRH of the first packet.

Step 3607: The second proxy node parses the second packet to obtain the SRH of the first packet.

Step 3608: The second proxy node determines that the service function of the SF node includes modifying the flow identifier.

A determining step of the second proxy node is the same as a determining step of the first proxy node. For details, refer to step 3602. The details are not described herein again.

Step 3609: The second proxy node stores the SRH of the first packet in the second cache entry by using the identifier of the second cache entry as an index.

The identifier of the second cache entry is used to uniquely identify the second cache entry in a cache of the second proxy node. The identifier of the second cache entry may include a cache index of the second cache entry, and the cache index is used to identify a corresponding second cache entry on an interface board of the second proxy node. In an embodiment, the second proxy node may include a plurality of interface boards. In this case, the identifier of the second cache entry may further include an identifier of a target board, the target board is an interface board on which the second cache entry is located, and the identifier of the target board is used to identify a target board in each interface board of the second proxy node. In addition, a storage step of the second proxy node is the same as a storage step of the first proxy node. For details, refer to step 3603. The details are not described herein again.

In an embodiment, the second proxy node may determine, based on the control information in the second packet, that the control information indicates the second proxy node to store the SRH of the first packet and to store the mapping relationship between the identifier of the first cache entry and the identifier of the second cache entry. In this case, the second proxy node may obtain the identifier of the first cache entry from the second packet, and store the mapping relationship between the identifier of the first cache entry and the identifier of the second cache entry. For example, if the first proxy node stores the SRH on a TB 1, a cache index of the SRH on the TB 1 is a cache index 1, the second proxy node stores the SRH on a TB 2, and a cache index of the SRH on the TB 2 is a cache index 2, the identifier of the first cache entry is (TB 1, cache index 1), the identifier of the second cache entry is (TB 2, cache index 2), and the mapping relationship stored by the second proxy node may include (TB 1, cache index 1, TB 2, cache index 2).

The second proxy node may identify a value of a first flag in the second packet, a value of a second flag in the second packet, and a value of a third flag in the second packet, and if the value of the first flag is set to 1, the value of the second flag is set to 0, and the value of the third flag is set to 1, determine that the control information indicates to store the SRH of the first packet and to store the mapping relationship between the identifier of the first cache entry and the identifier of the second cache entry.

Step 3610: The first proxy node generates a third packet based on the first packet.

Step 3611: The first proxy node sends the third packet to the SF node.

The third packet may include the identifier of the first cache entry. For example, the identifier of the first cache entry may be carried in a payload of the third packet. The third packet carries the identifier of the first cache entry, so that a packet received by the SF node carries the identifier of the first cache entry. In this case, after the SF node performs service processing on the packet, an obtained packet also carries the identifier of the first cache entry, so that the packet returned by the SF node to the proxy node carries the identifier of the first cache entry. Therefore, the proxy node may find, by using the identifier that is of the first cache entry and that is in the returned packet, the cache entry in which the SRH is previously stored.

Step 3612: The SF node receives the third packet from the first proxy node, and processes the third packet to obtain a fourth packet.

Step 3613: The SF node sends the fourth packet to the second proxy node.

Step 3614: The second proxy node receives the fourth packet from the SF node, and queries the second cache entry by using the identifier of the second cache entry as the index, to obtain the SRH of the first packet.

In some embodiments, the fourth packet may include the identifier of the first cache entry and a payload. The second proxy node may query, based on the identifier of the first cache entry, the mapping relationship between the identifier of the first cache entry and the identifier of the second cache entry, to obtain the identifier that is of the second cache entry and that corresponds to the identifier of the first cache entry. For example, if the identifier that is of the first cache entry and that is in the second packet is (TB 1, cache index 1), and the mapping relationship stored by the second proxy node includes (TB 1, cache index 1, TB 2, cache index 2), the second proxy node queries the mapping relationship based on (TB 1, cache index 1), to obtain (TB 2, cache index 2), searches the TB 2 for a cache entry corresponding to the cache index 2, and obtains the SRH of the first packet from the cache entry.

Step 3615: The second proxy node generates a fifth packet based on the fourth packet and the SRH of the first packet, where the fifth packet includes a payload of the fourth packet and the SRH of the first packet.

Step 3616: The second proxy node sends the fifth packet to the routing node.

Step 3617: The routing node receives the fifth packet from the second proxy node, and forwards the fifth packet.

In a related technology, a dynamic proxy node on an SRv6 SFC usually stores an SRH of a packet in a cache entry by using a 5-tuple of the packet as a key, and after receiving the packet returned by the SF node, queries a cache for a corresponding cache entry still by using the 5-tuple of the packet as the key. In this case, if the service function of the SF node is performing NAT, because the SF node modifies the 5-tuple of the packet in a packet processing process, a 5-tuple of the packet returned by the SF node is different from the 5-tuple of the previously received packet, that is, the 5-tuple of the packet received by the proxy node from the SF node is different from the 5-tuple of the packet previously sent to the SF node. In this case, when the proxy node queries the cache based on the received packet, because a key used when the cache is queried is different from a key used when the SRH is stored in the cache, the SRH cannot be found and the SRH cannot be restored to the packet. Consequently, packet transmission fails. For example, the proxy node previously stores the SRH by using a 5-tuple 1 as a key, and the 5-tuple of the packet is changed from the 5-tuple 1 to a 5-tuple 2 by the SF node. When the proxy node queries the cache by using the 5-tuple 2 as a key, the SRH cannot be obtained.

According to the method provided in this embodiment, the proxy node stores the SRH of the packet by determining that the service function of the SF node includes modifying the flow identifier and by using an identifier of a cache entry in which the SRH is stored as the key. In this case, if the SF node returns, to the proxy node, a packet for which a flow identifier is modified, because the cache entry in which the SRH is stored is usually fixed for the proxy node and does not change with the modification of the flow identifier, an identifier of the cache entry used when the SRH is stored can be the same as an identifier of a cache entry used when the SRH is obtained through query. Therefore, the identifier of the cache entry is used as an index, so that the SRH of the packet for which the flow identifier is modified can be obtained through query, and the SRH is restored to the packet for which the flow identifier is modified. In this manner, even if the SF node is an SF node with a NAT function, when the flow identifier corresponding to the packet is changed in a packet transmission process, the proxy node can also restore the SRH. Therefore, the proxy node can support access to the SF node with the NAT function, to provide a dynamic proxy function for the SF node that implements the NAT function.

In the foregoing method embodiment, a NAT scenario is supported based on a self-transmitting and other-receiving procedure. In this embodiment of this application, a NAT scenario may be further supported based on a self-transmitting and self-receiving procedure. Specific descriptions are provided below by using the following method embodiment shown in FIG. 37A and FIG. 37B. It should be noted that the embodiment in FIG. 37A and FIG. 37B mainly focuses on a difference from the embodiment in FIG. 36A and FIG. 36B. For steps similar to those in the embodiment in FIG. 36A and FIG. 36B, refer to the embodiment in FIG. 36A and FIG. 36B. Details are not described in the embodiment in FIG. 37A and FIG. 37B.

Figure 37A:
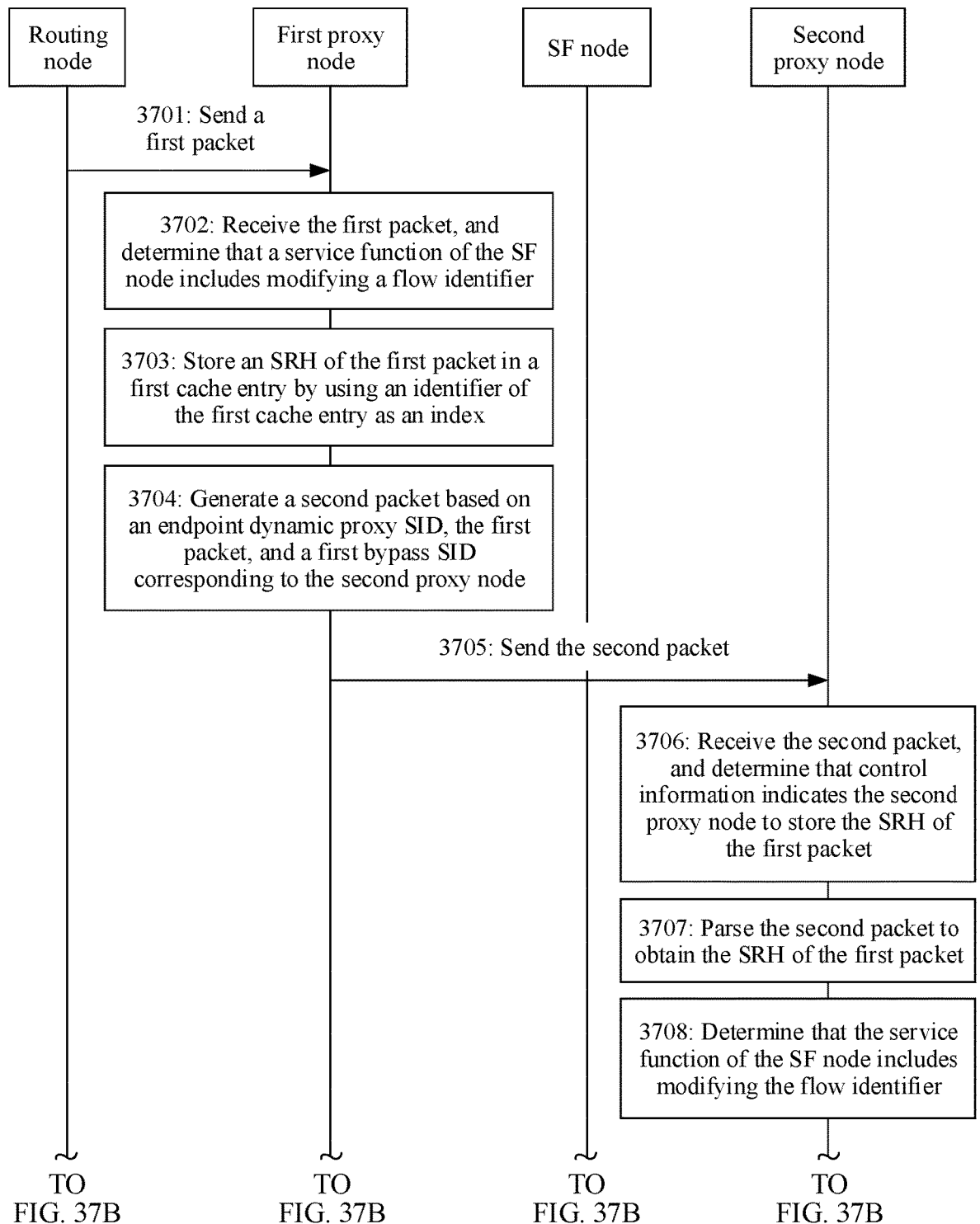
FIG. 37A and FIG. 37B are a flowchart of a packet transmission method according to an embodiment of this application.
Figure 37B:
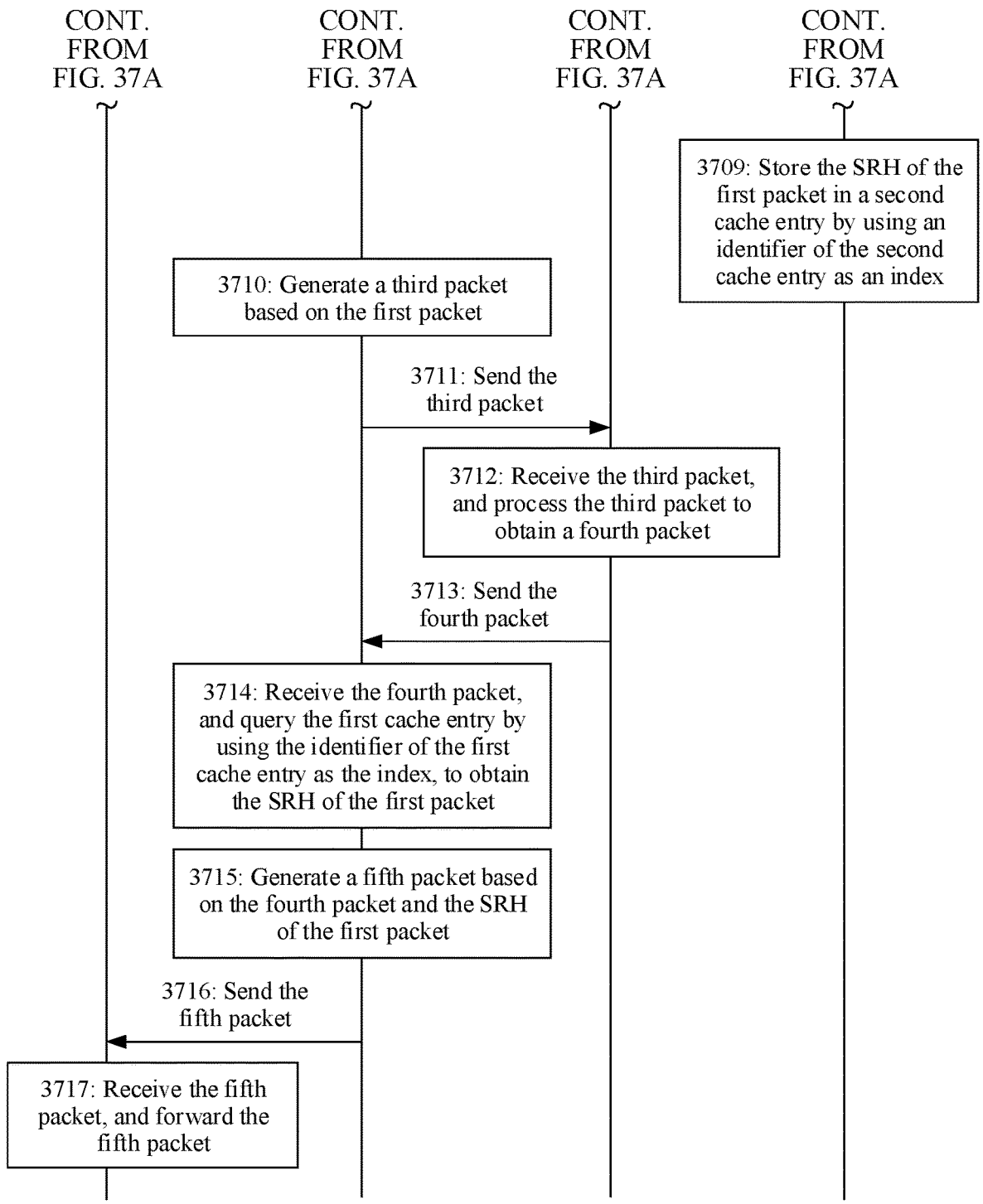

FIG. 37A and FIG. 37B are a flowchart of a packet transmission method according to an embodiment of this application. As shown in FIG. 37A and FIG. 37B, interaction bodies of the method include a first proxy node, a second proxy node, an SF node, and a routing node. The method may include the following steps.

Step 3701: The routing node sends a first packet to the first proxy node.

Step 3702: The first proxy node receives the first packet from the routing node, and the first proxy node determines that a service function of the SF node includes modifying a flow identifier.

Step 3703: The first proxy node stores an SRH of the first packet in a first cache entry by using an identifier of the first cache entry as an index.

Step 3704: The first proxy node generates a second packet based on an endpoint dynamic proxy SID, the first packet, and a first bypass SID corresponding to the second proxy node.

Step 3705: The first proxy node sends the second packet to the second proxy node.

Step 3706: The second proxy node receives the second packet from the first proxy node, and determines that control information indicates the second proxy node to store the SRH of the first packet.

Step 3707: The second proxy node parses the second packet to obtain the SRH of the first packet.

Step 3708: The second proxy node determines that the service function of the SF node includes modifying the flow identifier.

Step 3709: The second proxy node stores the SRH of the first packet in a second cache entry by using an identifier of the second cache entry as an index.

Step 3710: The first proxy node generates a third packet based on the first packet.

Step 3711: The first proxy node sends the third packet to the SF node.

The second packet further includes the identifier of the first cache entry. In this embodiment, the control information is further used to indicate the second proxy node to store a mapping relationship between the identifier of the first cache entry and the identifier of the second cache entry, and the second cache entry is a cache entry used by the second proxy node to store the SRH of the first packet.

Step 3712: The SF node receives the third packet from the first proxy node, and processes the third packet to obtain a fourth packet.

Step 3713: The SF node sends the fourth packet to the first proxy node, where the fourth packet includes the identifier of the first cache entry and a payload.

Step 3714: The first proxy node receives the fourth packet from the SF node, and queries the first cache entry by using the identifier of the first cache entry as the index, to obtain the SRH of the first packet.

This step may be different from step 3614. The identifier that is of the cache entry and that is in the fourth packet corresponds to a local cache.

Therefore, the first proxy node may skip a step of querying a mapping relationship between a local cache entry and a peer cache entry, obtain the identifier of the first cache entry from the fourth packet, and query the cache by using the identifier of the first cache entry as a key, to find the first cache entry.

Step 3715: The first proxy node generates a fifth packet based on the fourth packet and the SRH of the first packet.

Step 3716: The first proxy node sends the fifth packet to the routing node.

Step 3717: The routing node receives the fifth packet from the first proxy node, and forwards the fifth packet.

According to the method provided in this embodiment, the proxy node stores the SRH of the packet by determining that the service function of the SF node includes modifying the flow identifier and by using an identifier of a cache entry in which the SRH is stored as the key. In this case, if the SF node returns, to the proxy node, a packet for which a flow identifier is modified, because the cache entry in which the SRH is stored is usually fixed for the proxy node and does not change with the modification of the flow identifier, an identifier of the cache entry used when the SRH is stored can be the same as an identifier of a cache entry used when the SRH is obtained through query. Therefore, the identifier of the cache entry is used as an index, so that the SRH of the packet for which the flow identifier is modified can be obtained through query, and the SRH is restored to the packet for which the flow identifier is modified. In this manner, even if the SF node is an SF node with a NAT function, when the flow identifier corresponding to the packet is changed in a packet transmission process, the proxy node can also restore the SRH. Therefore, the proxy node can support access to the SF node with the NAT function, to provide a dynamic proxy function for the SF node that implements the NAT function.

The foregoing method embodiment describes the packet transmission procedure that supports the NAT scenario. The method provided in this embodiment of this application may further support an SRv6 VPN scenario. In an SRv6 VPN, VPN data is transmitted based on an SRv6 tunnel. In the SRv6 VPN scenario, an SF node on a service chain needs to process the VPN data, to implement a VPN service. In this scenario, the proxy node may support the SF node that implements the VPN service, and provide, by performing the following method embodiments, a dynamic proxy service for the SF node that implements the VPN service. The following describes a packet transmission procedure in a VPN scenario by using the following method embodiment shown in FIG. 38A and FIG. 38B. It should be noted that the embodiment in FIG. 38A and FIG. 38B mainly focuses on a difference from the embodiment in FIG. 5A and FIG. 5B. For steps similar to those in the embodiment in FIG. 5A and FIG. 5B or other features, refer to the embodiment in FIG. 5A and FIG. 5B. Details are not described in the embodiment in FIG. 38A and FIG. 38B.

Figure 38A:
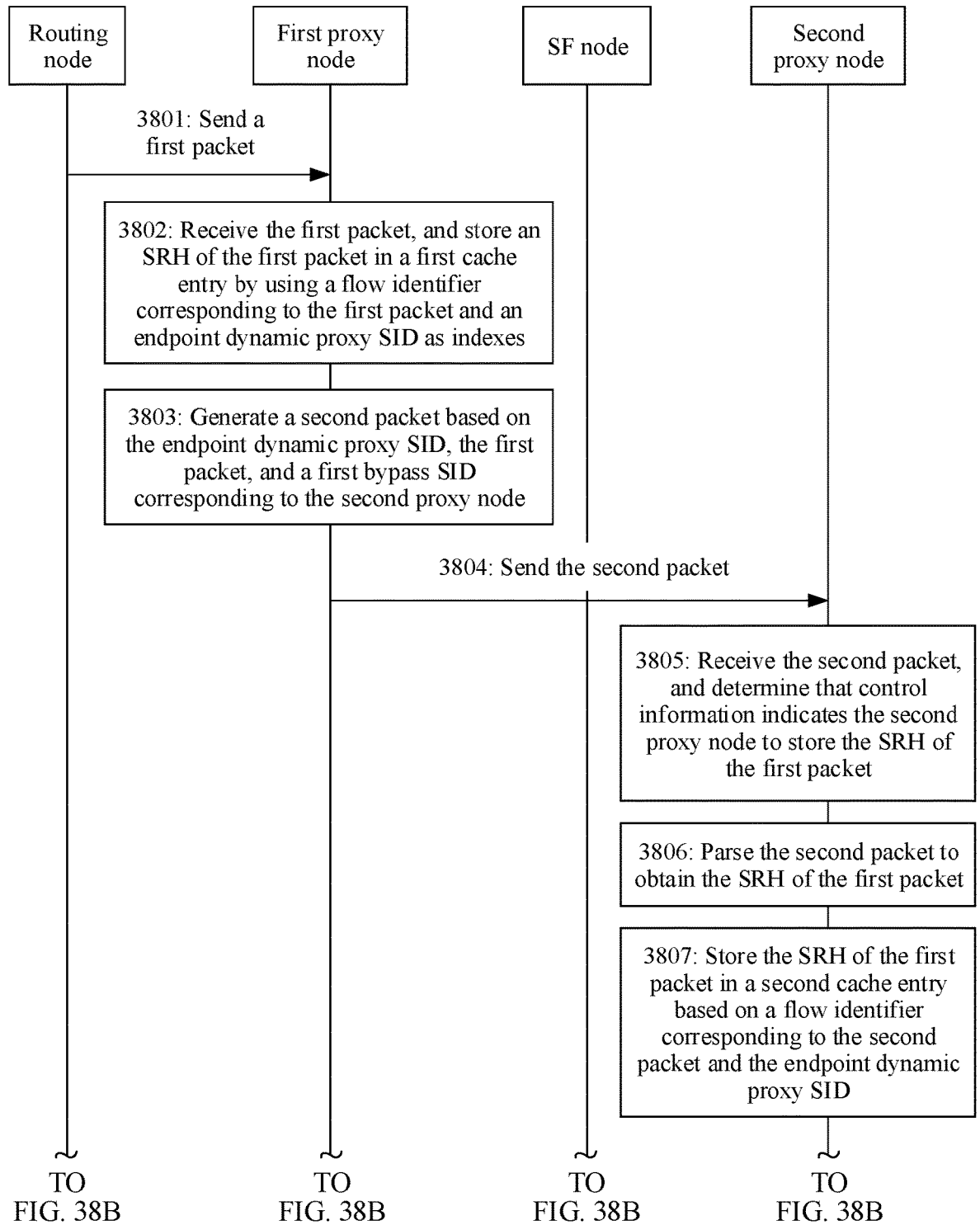
FIG. 38A and FIG. 38B are a flowchart of a packet transmission method according to an embodiment of this application.
Figure 38B:
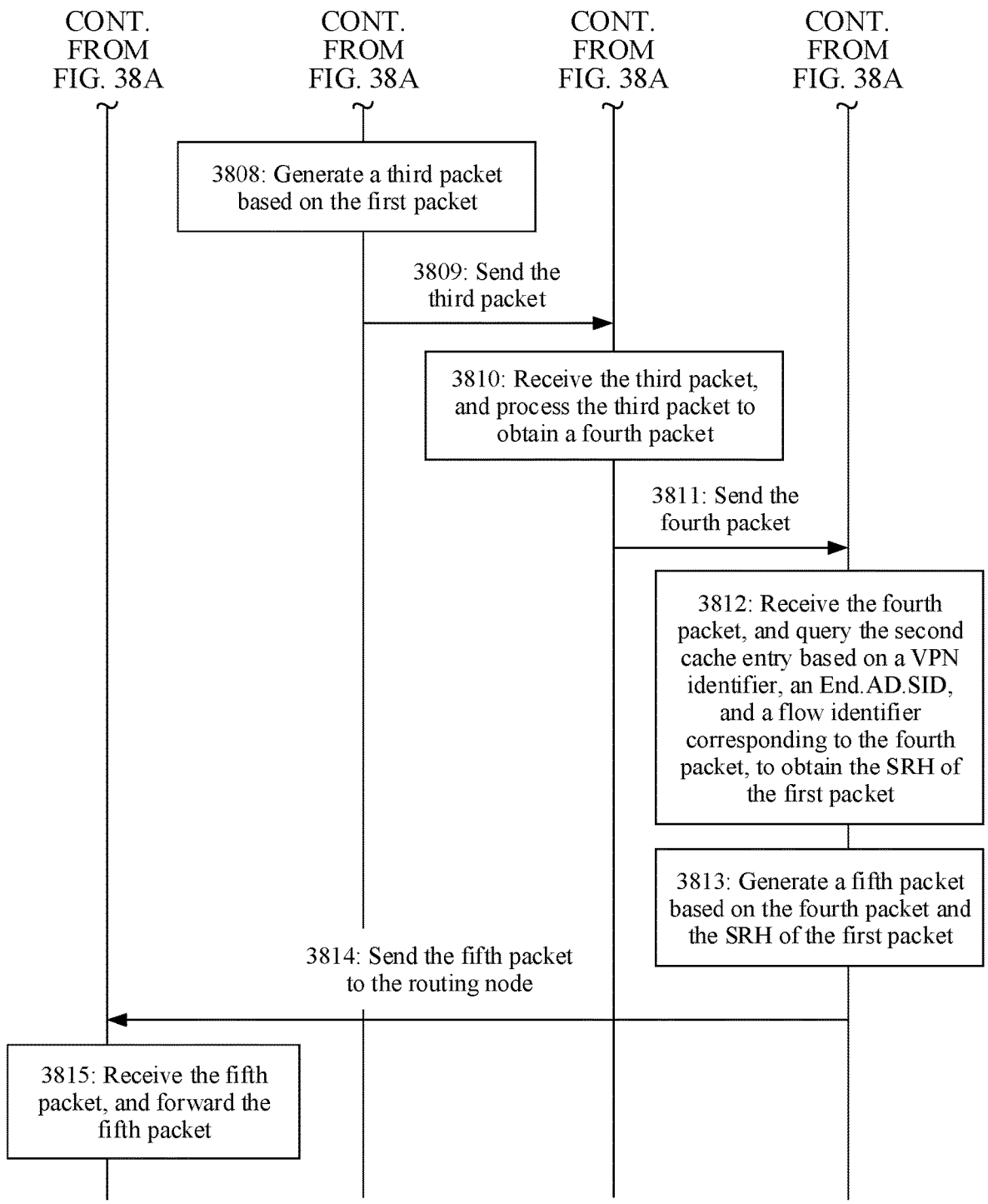

FIG. 38A and FIG. 38B are a flowchart of a packet transmission method according to an embodiment of this application. The method may include the following steps.

Step 3801: A routing node sends a first packet to a first proxy node.

Step 3802: The first proxy node receives the first packet from the routing node, and the first proxy node stores an SRH of the first packet in a first cache entry by using a flow identifier corresponding to the first packet and an endpoint dynamic proxy SID as indexes.

The first proxy node may access a plurality of SF nodes, and the plurality of SF nodes may belong to different VPNs. Therefore, in a process in which the first proxy node jointly provides a dynamic proxy service for the plurality of SF nodes, the first proxy node may receive packets to be sent to the different VPNs. The packets in the different VPNs may correspond to a same flow identifier. Consequently, if the SRH is stored by using the flow identifier as an index, indexes of SRHs of the packets in the different VPNs are the same, and consequently the SRHs of the packets in the different VPNs are stored at a same location. In this case, information isolation between the different VPNs cannot be implemented, affecting security. In addition, because a same index hits a plurality of SRHs in the cache, a specific SRH cannot be determined to be restored to the packet, and consequently SRH restoration fails.

In this embodiment, a corresponding End. AD SID may be pre-allocated to an SF node in each VPN, and SF nodes in different VPNs correspond to different End.AD SIDs. In this manner of allocating the End. AD SID, the End.AD SID can be used as a VPN identifier, packets sent to SF nodes in different VPNs carry different End.AD SIDs, and the packets in the different VPNs can be distinguished based on the different End.AD SIDs. For example, if the first proxy node accesses 10 SF nodes: an SF node 0, an SF node 1, . . . , and an SF node 9, the 10 SF nodes separately belong to two different VPNs, where the SF node 0 to the SF node 5 belong to a VPN 1, and the SF node 6 to the SF node 9 belong to a VPN 2. In this example, two End.AD SIDs may be allocated to the 10 SF nodes, where one End.AD SID is allocated to the SF node 0 to the SF node 5, and the other End.AD SID is allocated to the SF node 6 to the SF node 9. In this way, a VPN to which the packet is sent can be identified based on a specific End.AD SID in the two End.AD SIDs that is the End.AD SID in the packet. For example, the End. AD SID allocated to the SF node 0 to the SF node 5 may be A::1, and the End.AD SID allocated to the SF node 6 to the SF node 9 may be B::2. In this case, if a packet 1 and a packet 2 are received, an End.AD SID carried in the packet 1 is A::1, and an End.AD SID carried in the packet 2 is B::2, it indicates that the packet 1 is a packet corresponding to the VPN 1, and the packet 2 is a packet corresponding to the VPN 2.

The packets sent to the SF nodes in the different VPNs carry the different End.AD SIDs. Therefore, the SRH is stored by using the flow identifier and the End. AD SID as indexes, so that indexes of the packets in the different VPNs can be distinguished based on the different End.AD SIDs, to ensure that SRHs of the packets in the different VPNs are stored separately, implement information isolation between the different VPNs, and avoid a case in which a same index hits packets in a plurality of VPNs, so as to resolve the foregoing technical problems.

In addition, the SF nodes accessed by the first proxy node may separately belong to a public network and a VPN, and corresponding End. AD SIDs may be separately allocated to SF nodes in the public network and SF nodes in the VPN. An End.AD SID corresponding to the SF nodes in the public network is different from an End.AD SID corresponding to the SF nodes in the VPN. For example, in the 10 SF nodes accessed by the first proxy node, the SF node 0 to the SF node 4 belong to the public network, and the SF node 5 to the SF node 9 belong to the VPN 1. In this example, two End.AD SIDs may be allocated to the 10 SF nodes, where one End.AD SID is allocated to the SF node 0 to the SF node 4, and the other End.AD SID is allocated to the SF node 5 to the SF node 9. In this allocation manner, the SRH is stored by using the flow identifier and the End.AD SID as the indexes, to ensure that an SRH of a packet in the public network and an SRH of a packet in the VPN are stored separately, and avoid a case in which a same index hits the packet in the public network and the packet in the VPN.

Step 3803: The first proxy node generates a second packet based on the endpoint dynamic proxy SID, the first packet, and a first bypass SID corresponding to a second proxy node.

Step 3804: The first proxy node sends the second packet to the second proxy node.

Step 3805: The second proxy node receives the second packet from the first proxy node, and determines that control information indicates the second proxy node to store the SRH of the first packet.

Step 3806: The second proxy node parses the second packet to obtain the SRH of the first packet.

Step 3807: The second proxy node stores the SRH of the first packet in a second cache entry based on a flow identifier corresponding to the second packet and the endpoint dynamic proxy SID, where the flow identifier corresponding to the second packet may be the flow identifier corresponding to the first packet.

The flow identifier corresponding to the second packet may be the flow identifier corresponding to the first packet. For example, the second packet may include a 5-tuple, and the 5-tuple in the second packet is the same as a 5-tuple in the first packet. The second packet may include the End.AD SID. For example, the second packet may include the SRH of the first packet, and the SRH of the first packet may include the End.AD SID. Therefore, the second proxy node may obtain, from the second packet, the flow identifier corresponding to the first packet and the End.AD SID. The VPN identifier is used to identify a VPN to which the service function node belongs. Different VPNs have different VPN identifiers. Therefore, the different VPNs can be distinguished based on the VPN identifiers. For example, the VPN identifier may be a VLAN ID. The VPN identifier may be pre-stored on the second proxy node.

The SRH may be stored based on the flow identifier and the End. AD SID in a plurality of manners. Examples of Manner 1 and Manner 2 are described below.

Manner 1: The second proxy node stores the SRH of the first packet in the second cache entry by using the flow identifier corresponding to the first packet and the End.AD SID as indexes.

For packets in different VPNs, considering that the packets in the different VPNs may have a same flow identifier, if the SRH is stored only by using the flow identifier as the index, the packets in the different VPNs may be stored at a same location because indexes are the same. Consequently, information isolation between the different VPNs cannot be implemented. In Manner 1, even if the packets in the different VPNs correspond to a same flow identifier, because the packets in the different VPNs correspond to different End.AD SIDs, it can be ensured that indexes corresponding to the packets in the different VPNs can be distinguished based on the End.AD SIDs. Therefore, it can be ensured that SRHs of the packets in the different VPNs are stored at different locations, and information isolation between the different VPNs is implemented.

Manner 2: The second proxy node stores the SRH of the first packet in the second cache entry by using the flow identifier corresponding to the first packet, the End. AD SID, and the VPN identifier as indexes.

For packets in different VPNs, considering that the packets in the different VPNs may have a same flow identifier, if the SRH is stored only by using the flow identifier as the index, the packets in the different VPNs may be stored at a same location because indexes are the same. Consequently, information isolation between the different VPNs cannot be implemented. In Manner 2, even if the packets in the different VPNs correspond to a same flow identifier, because the packets in the different VPNs correspond to different End.AD SIDs and different VPN identifiers, it can be ensured that indexes corresponding to the packets in the different VPNs can be distinguished based on the End.AD SIDs and the VPN identifiers. Therefore, it can be ensured that SRHs of the packets in the different VPNs are stored at different locations, and information isolation between the different VPNs is implemented.

Step 3808: The first proxy node generates a third packet based on the first packet.

Step 3809: The first proxy node sends the third packet to the SF node.

A flow identifier corresponding to the third packet may be the same as the flow identifier corresponding to the first packet, and the third packet may include the VPN identifier. In an embodiment, the first proxy node may establish a transmission tunnel with the SF node. The first proxy node may generate a tunnel header corresponding to the transmission tunnel, and encapsulate the tunnel header, so that the third packet includes the tunnel header, and the tunnel header may include the VPN identifier.

Step 3810: The service function node receives the third packet from the first proxy node, and processes the third packet to obtain a fourth packet.

Step 3811: The service function node sends the fourth packet to the second proxy node.

Step 3812: The second proxy node receives the fourth packet from the SF node, and queries the second cache entry based on the VPN identifier, the End.AD SID, and a flow identifier corresponding to the fourth packet, to obtain the SRH of the first packet.

The second proxy node may obtain the SRH through query in a plurality of manners. For example, a manner of obtaining the SRH through query may include Manner 1 or Manner 2.

Manner 1 may specifically include step 1 and step 2.

Step 1: The second proxy node queries a mapping relationship between the endpoint dynamic proxy SID and the VPN identifier based on the VPN identifier, to obtain the endpoint dynamic proxy SID corresponding to the VPN identifier.

The flow identifier corresponding to the fourth packet may be the flow identifier corresponding to the first packet, and the fourth packet includes the VPN identifier and a payload. The second proxy node may obtain the VPN identifier from the fourth packet, and query the mapping relationship between the End.AD SID and the VPN identifier based on the VPN identifier, to find a specific End.AD SID corresponding to the VPN identifier. For example, if there is a mapping relationship between an End.AD SID A::1 and a VLAN ID 100, and there is a mapping relationship between an End.AD SID A::2 and a VLAN ID 200, when the VPN identifier carried in the fourth packet is 100, the second proxy node queries the mapping relationship based on 100, to obtain A::1.

In a process in which the second proxy node stores the mapping relationship between the End.AD SID and the VPN identifier, in an embodiment, a configuration operation may be performed on the second proxy node to configure an End.AD SID allocated to an SF node in each VPN. The second proxy node may receive a configuration instruction. The second proxy node may store the mapping relationship between the endpoint dynamic proxy SID and the VPN identifier according to the configuration instruction, where the configuration instruction includes the End.AD SID corresponding to the SF node in each VPN. The second proxy node may parse the configuration instruction to obtain the End.AD SID that corresponds to the SF node in each VPN and that is carried in the configuration instruction. For example, if the second proxy node accesses SF nodes in two VLANs, and the two VLANs are respectively identified by using a VLAN ID 100 and a VLAN ID 200, two End.AD SIDs may be pre-configured on the second proxy node, for example, A::1 is allocated to an SF node in a VLAN with the VLAN ID 100, and A::2 is allocated to an SF node in a VLAN with the VLAN ID 200, and a mapping relationship between A::1 and 100 and a mapping relationship between A::2 and 200 may be stored. Certainly, it is merely an example that the mapping relationship between the End.AD SID and the VPN identifier is stored in the foregoing manner. The second proxy node may alternatively store the mapping relationship between the End.AD SID and the VPN identifier in another manner, for example, by automatically learning of the mapping relationship between the End.AD SID and the VPN identifier, or by receiving the mapping relationship between the End.AD SID and the VPN identifier from a controller.

Both the flow identifier and the End.AD SID are used as the indexes, so that it can be ensured that indexes of packets in different VPNs are distinguished based on End.AD SIDs. Therefore, a case in which a same index hits SRHs of packets in a plurality of VPNs can be avoided, to ensure query accuracy.

Step 2: The second proxy node queries the second cache entry by using the flow identifier corresponding to the fourth packet and the endpoint dynamic proxy SID as indexes, to obtain the SRH of the first packet.

Manner 2: The second proxy node queries the second cache entry by using the End.AD SID, the VPN identifier, and the flow identifier corresponding to the fourth packet as indexes, to obtain the SRH of the first packet.

The flow identifier, the End.AD SID, and the VPN identifier are used as the indexes, so that it can be ensured that indexes of packets in different VPNs are distinguished based on End.AD SIDs and VPN identifiers. Therefore, a case in which a same index hits SRHs of packets in a plurality of VPNs can be avoided, to ensure query accuracy.

Step 3813: The second proxy node generates a fifth packet based on the fourth packet and the SRH of the first packet, where the fifth packet includes a payload of the fourth packet and the SRH of the first packet.

Step 3814: The second proxy node sends the fifth packet to the routing node.

Step 3815: The routing node receives the fifth packet from the second proxy node, and forwards the fifth packet.

This embodiment provides a method for providing a dynamic proxy service in an SRv6 VPN scenario. A corresponding End.AD SID is allocated to an SF node in each VPN, and the End.AD SID can be used as a VPN identifier. Therefore, the proxy node stores the SRH based on the flow identifier and the End.AD SID, so that indexes of SRHs of packets in different VPNs can be distinguished based on different End.AD SIDs, to ensure that the indexes of the SRHs of the packets in the different VPNs are different. In this way, the SRHs of the packets in the different VPNs are stored separately, to implement information isolation between the different VPNs, and avoid a case in which a same index hits SRHs of packets in a plurality of VPNs, so as to ensure query accuracy.

In the foregoing method embodiment, a VPN scenario is supported based on a self-transmitting and other-receiving procedure. In this embodiment of this application, a VPN scenario may be further supported based on a self-transmitting and self-receiving procedure. Specific descriptions are provided below by using the following method embodiment shown in FIG. 39A and FIG. 39B. It should be noted that the embodiment in FIG. 39A and FIG. 39B mainly focuses on a difference from the embodiment in FIG. 38A and FIG. 38B. For steps similar to those in the embodiment in FIG. 38A and FIG. 38B, refer to the embodiment in FIG. 38A and FIG. 38B. Details are not described in the embodiment in FIG. 39A and FIG. 39B.

Figure 39A:
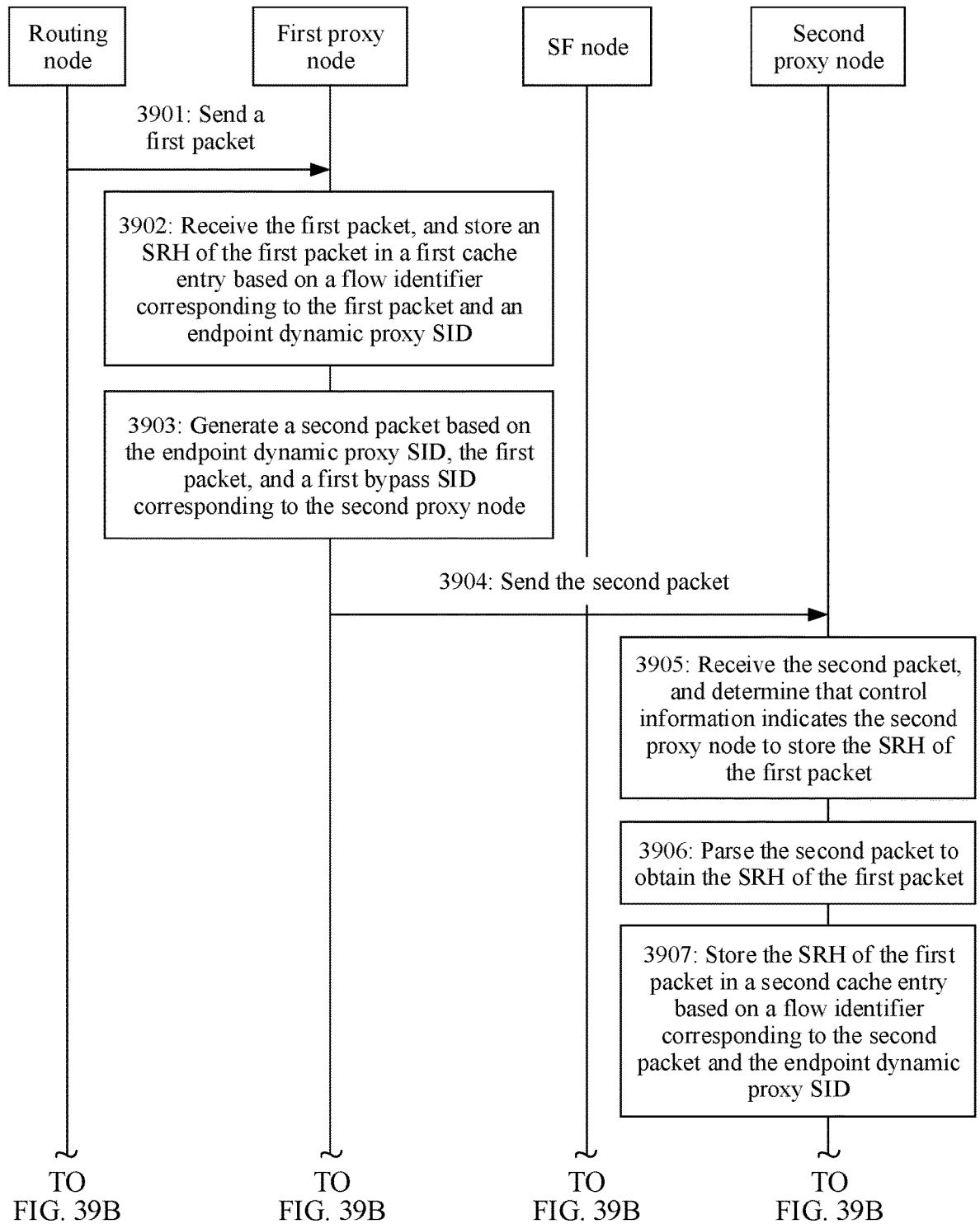
FIG. 39A and FIG. 39B are a flowchart of a packet transmission method according to an embodiment of this application.
Figure 39B:
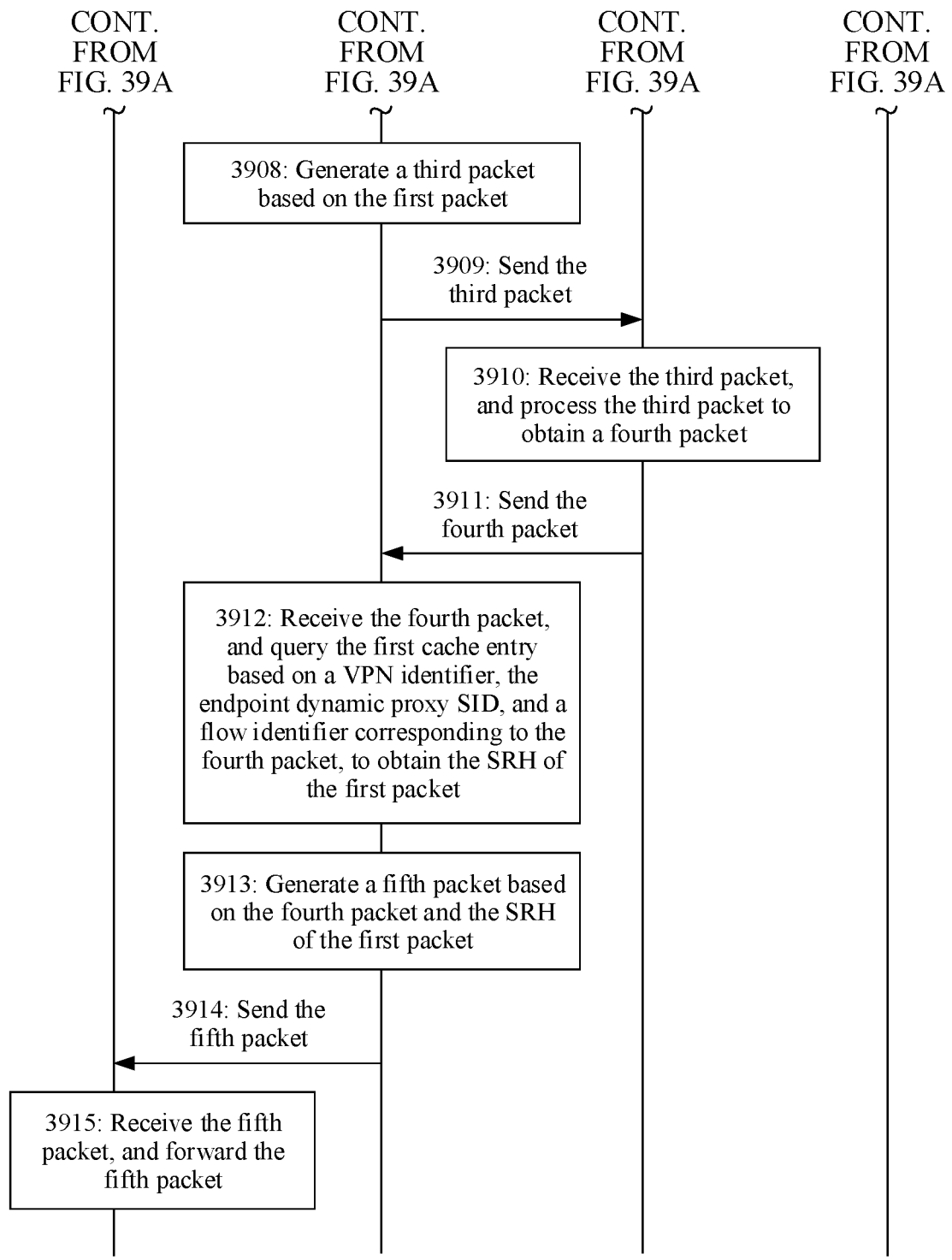

FIG. 39A and FIG. 39B are a flowchart of a packet transmission method according to an embodiment of this application. The method may include the following steps.

Step 3901: A routing node sends a first packet to a first proxy node.

Step 3902: The first proxy node receives the first packet from the routing node, and the first proxy node stores an SRH of the first packet in a first cache entry based on a flow identifier corresponding to the first packet and an endpoint dynamic proxy SID.

The first proxy node may store the SRH in a plurality of manners. Examples of Manner 1 and Manner 2 are described below.

Manner 1: The first proxy node stores the SRH of the first packet in a second cache entry by using the flow identifier corresponding to the first packet and the endpoint dynamic proxy SID as indexes.

Manner 2: The first proxy node stores the SRH of the first packet in a second cache entry by using the flow identifier corresponding to the first packet, the endpoint dynamic proxy SID, and a VPN identifier as indexes.

Step 3903: The first proxy node generates a second packet based on the endpoint dynamic proxy SID, the first packet, and a first bypass SID corresponding to a second proxy node.

Step 3904: The first proxy node sends the second packet to the second proxy node.

Step 3905: The second proxy node receives the second packet from the first proxy node, and determines that control information indicates the second proxy node to store the SRH of the first packet.

Step 3906: The second proxy node parses the second packet to obtain the SRH of the first packet.

Step 3907: The second proxy node stores the SRH of the first packet in the second cache entry based on a flow identifier corresponding to the second packet and the endpoint dynamic proxy SID, where the flow identifier corresponding to the second packet is the flow identifier corresponding to the first packet.

The second proxy node may store the SRH in a plurality of manners. Examples of Manner 1 and Manner 2 are described below.

Manner 1: The second proxy node stores the SRH of the first packet in the second cache entry by using the flow identifier corresponding to the first packet and the endpoint dynamic proxy SID as indexes.

Manner 2: The second proxy node stores the SRH of the first packet in the second cache entry by using the flow identifier corresponding to the first packet, the endpoint dynamic proxy SID, and a VPN identifier as indexes.

Step 3908: The first proxy node generates a third packet based on the first packet.

Step 3909: The first proxy node sends the third packet to an SF node.

Step 3910: The SF node receives the third packet from the first proxy node, and processes the third packet to obtain a fourth packet.

Step 3911: The SF node sends the fourth packet to the first proxy node.

Step 3912: The first proxy node receives the fourth packet from the SF node, and queries the first cache entry based on the VPN identifier, the endpoint dynamic proxy SID, and a flow identifier corresponding to the fourth packet, to obtain the SRH of the first packet.

The flow identifier corresponding to the fourth packet is the flow identifier corresponding to the first packet.

The first proxy node may obtain the SRH through query in a plurality of manners. Examples of Manner 1 and Manner 2 are described below.

Manner 1 may include step 1 and step 2:

Step 1: The first proxy node queries a mapping relationship between the endpoint dynamic proxy SID and the VPN identifier based on the VPN identifier, to obtain the endpoint dynamic proxy SID corresponding to the VPN identifier.

Step 2: The first proxy node queries the first cache entry by using the flow identifier corresponding to the fourth packet and the endpoint dynamic proxy SID as indexes, to obtain the SRH of the first packet.

Manner 2: The first proxy node queries the first cache entry by using the VPN identifier, the endpoint dynamic proxy SID, and the flow identifier corresponding to the fourth packet as indexes, to obtain the SRH of the first packet.

Step 3912 is specific to the case of Manner 2 in step 3907.

Step 3913: The first proxy node generates a fifth packet based on the fourth packet and the SRH of the first packet, where the fifth packet includes a payload of the fourth packet and the SRH of the first packet.

Step 3914: The first proxy node sends the fifth packet to the routing node.

Step 3915: The routing node receives the fifth packet from the first proxy node, and forwards the fifth packet.

This embodiment provides a method for providing a dynamic proxy service in an SRv6 VPN scenario. A corresponding End.AD SID is allocated to an SF node in each VPN, and the End.AD SID can be used as a VPN identifier. Therefore, the proxy node stores the SRH by using the flow identifier and the End.AD SID as indexes, so that indexes of SRHs of packets in different VPNs can be distinguished based on different End.AD SIDs, to ensure that the indexes of the SRHs of the packets in the different VPNs are different. In this way, the SRHs of the packets in the different VPNs are stored separately, to implement information isolation between the different VPNs, and avoid a case in which a same index hits SRHs of packets in a plurality of VPNs, so as to ensure query accuracy.

Figure 40:
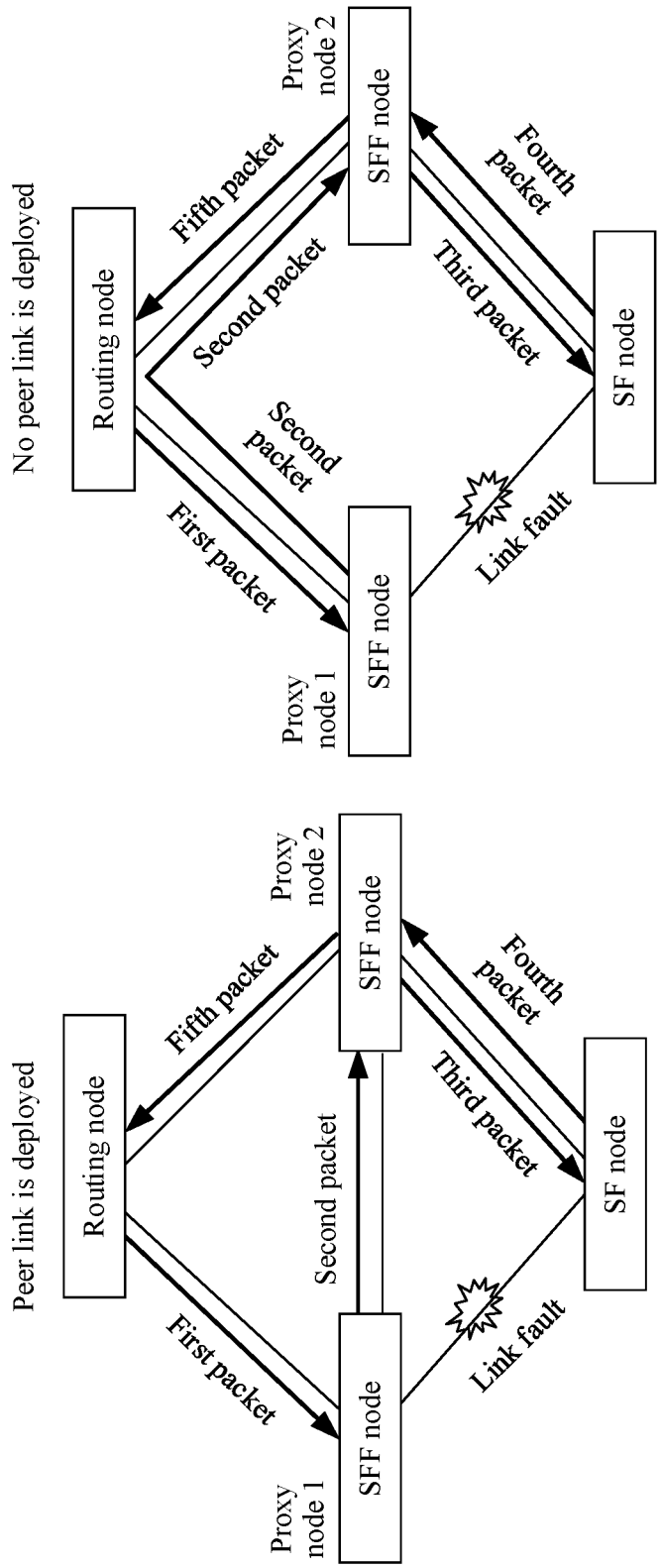
FIG. 40 is a schematic diagram of packet transmission in a fault scenario according to an embodiment of this application.

The foregoing method embodiments provide a packet transmission method in a normal state. The method provided in this embodiment of this application may further support a fault scenario. When a proxy node is faulty or a link connected to the proxy node is faulty, a dynamic proxy service can also be provided, to ensure normal packet transmission. For example, refer to FIG. 40. Two links: a link between a proxy node 1 and an SF node and a link between a proxy node 2 and the SF node may form a redundant link. When the link between the proxy node 1 and the SF node is faulty, traffic can be transmitted to the proxy node 2 in a bypass manner. A dynamic proxy operation is performed on the traffic by the proxy node 2, and the traffic continues to be transmitted to the SF node through the proxy node 2.

Figure 41A:
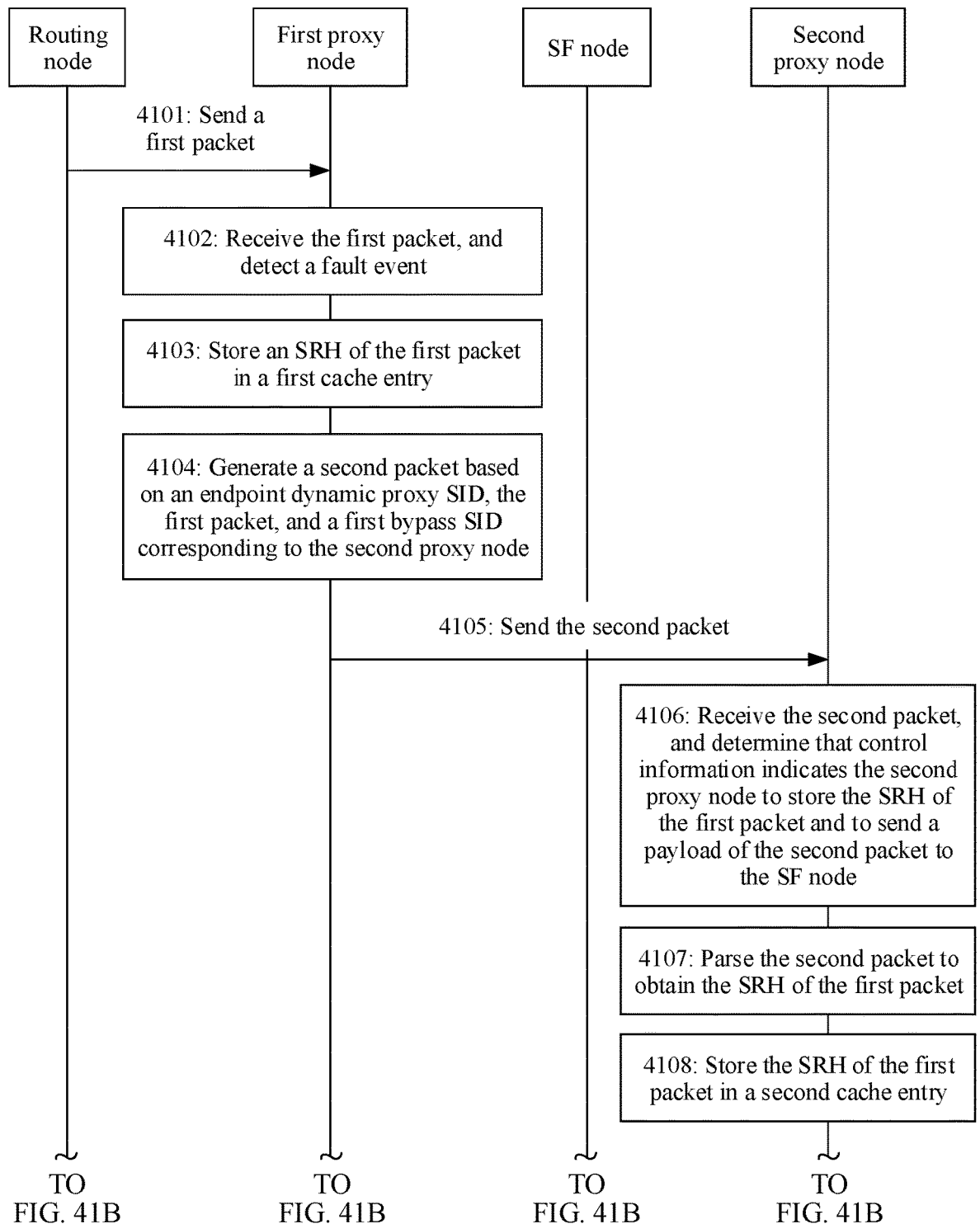
FIG. 41A and FIG. 41B are a flowchart of a packet transmission method according to an embodiment of this application.
Figure 41B:
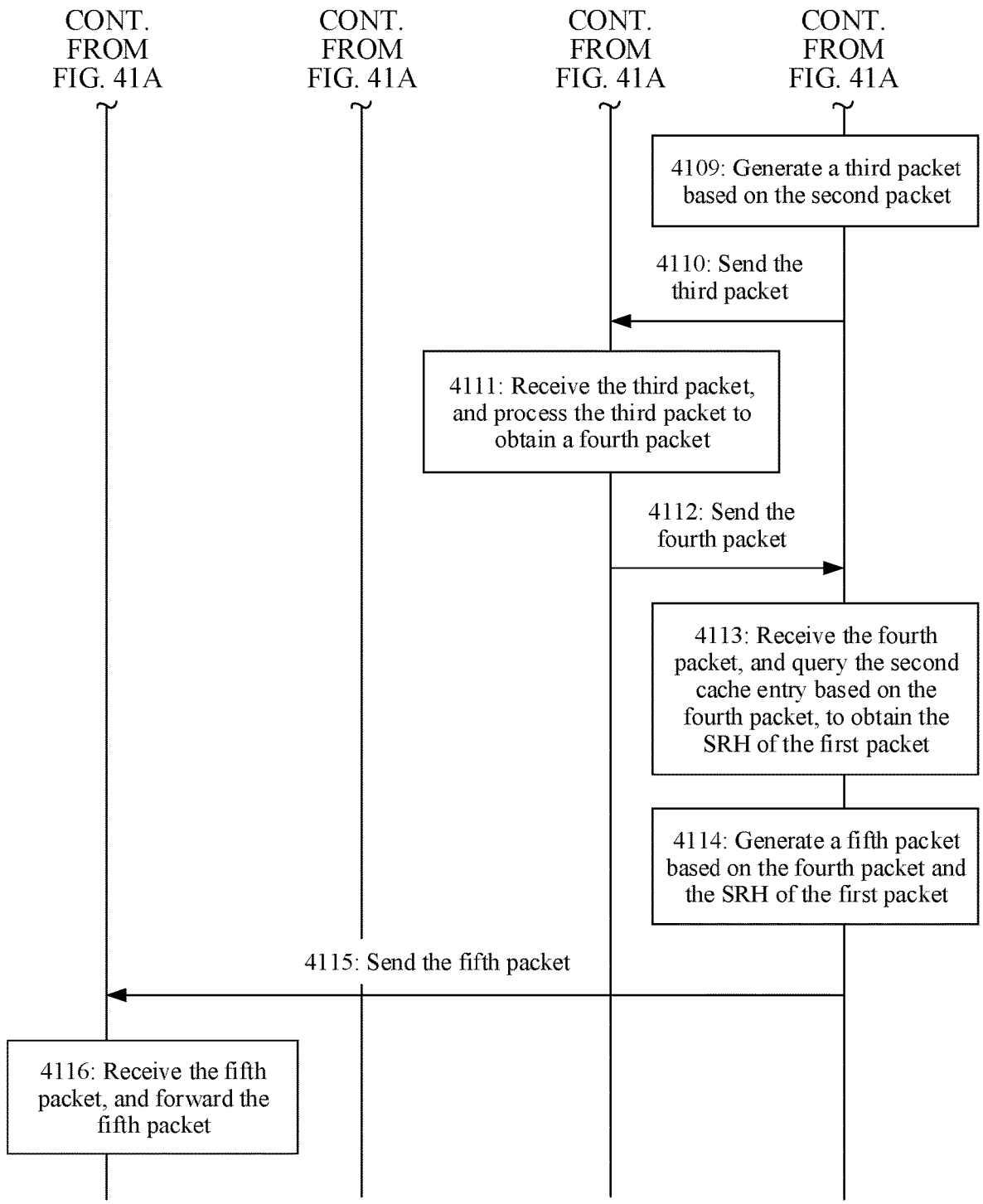

The following describes, in detail, a transmission procedure in a fault scenario by using the following method embodiment shown in FIG. 41A and FIG. 41B. It should be noted that the embodiment in FIG. 41A and FIG. 41B mainly focuses on differences from the foregoing embodiments. For steps similar to those in the foregoing embodiments, refer to the foregoing descriptions. Details are not described in the embodiment in FIG. 41A and FIG. 41B.

FIG. 41A and FIG. 41B are a flowchart of a packet transmission method according to an embodiment of this application. The method may include the following steps.

Step 4101: A routing node sends a first packet to a first proxy node.

Step 4102: The first proxy node receives the first packet from the routing node, and detects a fault event.

The fault event may include two types: One type is a link fault, and the other type is a node fault. When detecting a fault event in either of the two types, the first proxy node may re-encapsulate, by performing the method provided in this embodiment, a packet on which dynamic proxy processing is to be performed, and forward a re-encapsulated packet to the second proxy node, to indicate the second proxy node to perform a dynamic proxy operation in place of the first proxy node, strip an SRH from the re-encapsulated packet, and transmit a payload of the re-encapsulated packet to an SF node.

The fault event includes at least one of an event that a link between the first proxy node and the SF node is faulty or an event that the first proxy node is faulty. Refer to FIG. 3 and FIG. 4. The event that the link between the first proxy node and the SF node is faulty may be an event that a fourth link is faulty. For example, the first proxy node may be connected to the SF node through a third outbound interface, the first proxy node may transmit a packet to the fourth link through the third outbound interface, and the first proxy node may detect a status of the third outbound interface. If the status of the third outbound interface is down (down), the first proxy node detects the event that the fourth link is faulty.

In an embodiment, a bidirectional forwarding detection (BFD) mechanism may be deployed on the first proxy node in advance. The BFD mechanism is used to quickly detect and monitor a forwarding connectivity status of a link or an IP route in a network. The BFD mechanism is deployed, so that it can be ensured that the first proxy node monitors, in real time, whether the fourth link is in a connected state, to quickly sense a fault of the fourth link. In a possible implementation, a process of deploying the BFD mechanism may include: performing a configuration operation on the first proxy node; and receiving, by the first proxy node, a configuration instruction, enabling BFD for the third outbound interface according to the configuration instruction, and establishing a BFD session with the SF node. After establishing the BFD session, the first proxy node sends a BFD packet through the third outbound interface at an interval of a preset time period. If no returned BFD response packet is received within preset duration, it may be determined that the fourth link is faulty.

It should be understood that descriptions are provided in this embodiment by using an example in which the first packet is received before the fault event is detected. In another embodiment, the first proxy node may alternatively detect the fault event before receiving the first packet, or the first proxy node detects the fault event when receiving the first packet. A time sequence of the two steps of receiving the first packet and detecting the fault event is not limited in this embodiment.

Step 4103: The first proxy node stores an SRH of the first packet in a first cache entry.

Step 4104: The first proxy node generates a second packet based on an endpoint dynamic proxy SID, the first packet, and a first bypass SID corresponding to a second proxy node.

In this embodiment, the second packet may be considered as a bypass packet of the first packet, and the second packet may be a data packet. The second packet includes a payload of the first packet. In addition to indicating the second proxy node to store the SRH of the first packet, control information in the second packet may further indicate the second proxy node to send the payload of the first packet to the service function node. Optionally, the control information may include a first flag and a second flag. In the embodiment in FIG. 41A and FIG. 41B, if a value of the first flag may be set to 0, it indicates that the packet is not a copied packet, and is usually a data packet. After receiving the packet, a receive end needs to forward a payload of the packet. If a value of the second flag in the control information may be set to 0, it indicates that the packet is not an acknowledgment packet.

Optionally, a trigger condition for generating the second packet in this embodiment may be different from a trigger condition for generating the second packet in the embodiment in FIG. 5A and FIG. 5B. In the embodiment in FIG. 5A and FIG. 5B, the trigger condition for generating the second packet may be detecting that the first cache entry is generated or updated, or detecting that a sending period of the second packet elapses at a current time point. A quantity of second packets may be significantly different from a quantity of first packets. For example, one data flow includes N first packets, and SRHs of the N first packets are usually the same with a high probability. In this case, in the embodiment in FIG. 5A and FIG. 5B, the first proxy node may generate one cache entry for one data flow to store one SRH. Therefore, the data flow triggers a total of one second packet. A payload of each first packet may be transmitted by the first proxy node to the SF node. However, in this embodiment, because a node fault or a link fault occurs on the first proxy node, a payload of each first packet may be carried in a corresponding second packet, so that the payload of each first packet is transmitted to the second proxy node, and the payload of each first packet is transmitted to the SF node through the second proxy node. In this case, the trigger condition for generating the second packet may be: Each time one first packet is received, one second packet is correspondingly generated, where a quantity of second packets may be approximately the same as a quantity of first packets.

Step 4105: The first proxy node sends the second packet to the second proxy node.

Step 4106: The second proxy node receives the second packet from the first proxy node, and determines that the control information indicates the second proxy node to store the SRH of the first packet and to send a payload of the second packet to the SF node, where the payload of the second packet is the payload of the first packet.

For example, the second proxy node may identify the value of the first flag in the second packet and the value of the second flag in the second packet, and if the value of the first flag is set to 0 and the value of the second flag is set to 0, determine that the control information indicates to store the SRH of the first packet and to send the payload of the second packet.

Step 4107: The second proxy node parses the second packet to obtain the SRH of the first packet.

Step 4108: The second proxy node stores the SRH of the first packet in a second cache entry.

Step 4109: The second proxy node generates a third packet based on the second packet.

The third packet includes the payload of the first packet, and the third packet generated by the second proxy node may be the same as the third packet generated by the first proxy node in the embodiment in FIG. 5A and FIG. 5B. In an embodiment, step 4109 may include step 1 and step 2.

Step 1: The second proxy node restores the second packet to the first packet.

In an embodiment, the second proxy node may delete the first bypass SID from an SRH of the second packet, decrease an SL of the SRH of the second packet by one, and update a destination address of the second packet to the endpoint dynamic proxy SID, to obtain the first packet.

Step 2: The second proxy node generates the third packet based on the first packet.

Step 2 is similar to step 508. Details are not described herein.

It should be understood that descriptions are provided in this embodiment by using an example in which step 4107 is performed before step 4108. In another embodiment, the first proxy node may alternatively perform step 4108 before step 4107, or the first proxy node performs step 4108 when performing step 4107. A time sequence of step 4107 and step 4108 is not limited in this embodiment.

Step 4110: The second proxy node sends the third packet to the SF node.

A procedure in which the second proxy node forwards the third packet is the same as a procedure in which the first proxy node forwards the third packet in the embodiment in FIG. 5A and FIG. 5B. Details are not described herein.

Step 4111: The SF node receives the third packet from the second proxy node, and processes the third packet to obtain a fourth packet.

Step 4112: The SF sends the fourth packet to the second proxy node.

Step 4113: The second proxy node receives the fourth packet from the SF node, and queries the second cache entry based on the fourth packet, to obtain the SRH of the first packet.

Step 4114: The second proxy node generates a fifth packet based on the fourth packet and the SRH of the first packet.

Step 4115: The second proxy node sends the fifth packet to the routing node.

Step 4116: The routing node receives the fifth packet from the second proxy node, and forwards the fifth packet.

In an embodiment, the fault may be eliminated over time. Therefore, a link or a node can recover from a faulty state to a normal state. In this case, the first proxy node subsequently receives the first packet from the routing node again, and may detect a fault recovery event. Therefore, the first proxy node may stop performing the procedure of the method provided in this embodiment, and no longer transmits the payload of the first packet to the second proxy node, and the second proxy node transmits the payload of the first packet to the SF node. Instead, the first proxy node performs the procedure of the method provided in the embodiment in FIG. 4, and the local end transmits the payload of the first packet to the SF node. In this way, traffic bypass in a normal forwarding scenario is avoided. The first proxy node may detect a status of a third outbound interface, and if the status of the third outbound interface is up (up), the first proxy node detects that the fourth link is restored to a connected state.

In this embodiment, a method for providing a dynamic proxy service in a fault scenario is provided. When detecting the fault event, the local proxy node re-encapsulates a packet on which dynamic proxy processing is to be performed, and forwards a re-encapsulated packet to the peer proxy node, to indicate the peer proxy node to perform a dynamic proxy operation in place of the local proxy node, strip the SRH from the re-encapsulated packet, and transmit a payload of the re-encapsulated packet to the SF node. In this way, when a device fault or a link fault occurs on the local proxy node, local traffic is transmitted to the peer end in a bypass manner for further forwarding. Therefore, in the fault scenario, this can also ensure that the packet is processed by the SF node and normally transmitted, to greatly improve network stability, reliability, and robustness.

Figure 42:
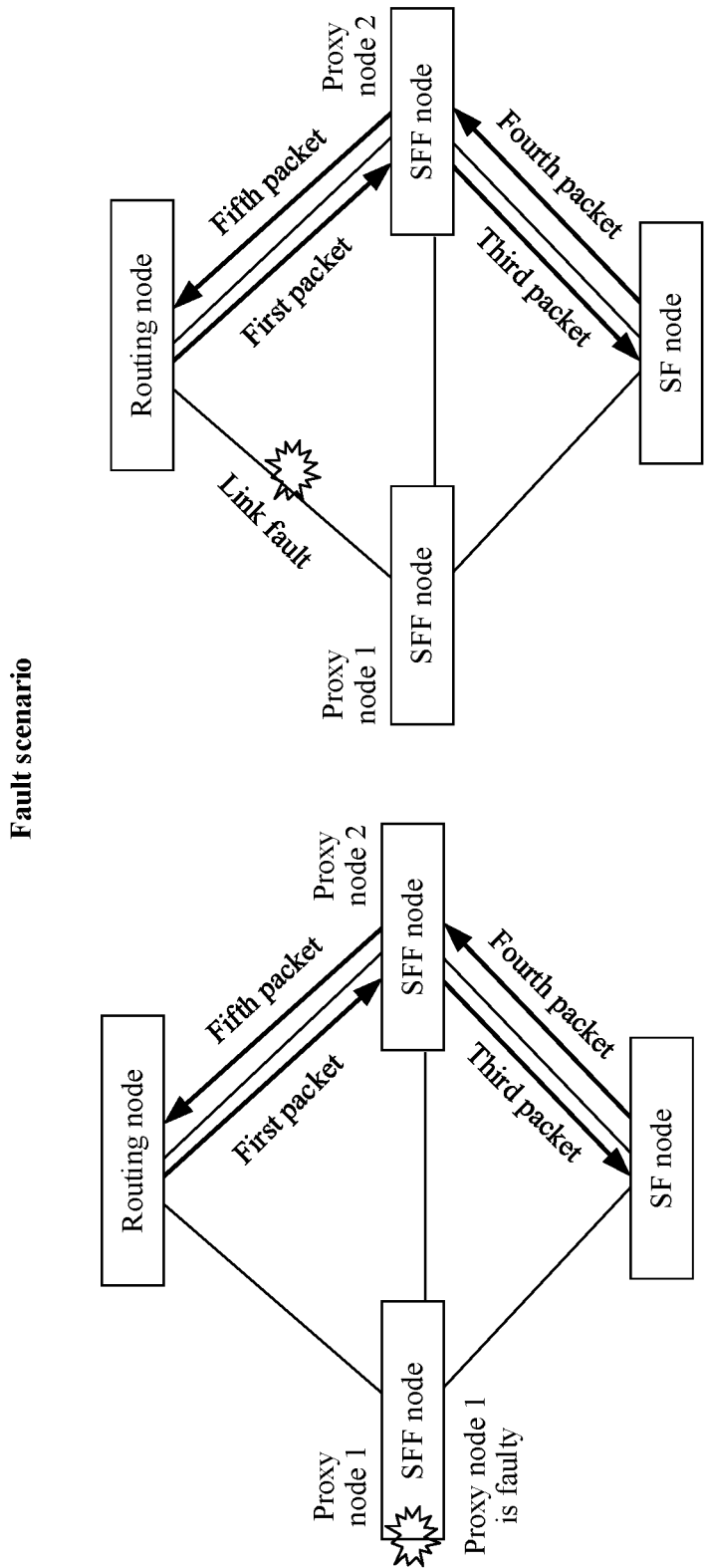
FIG. 42 is a schematic diagram of packet transmission in a fault scenario according to an embodiment of this application.

In the foregoing method embodiment, a packet transmission procedure triggered after the first proxy node detects the fault event is provided. In an embodiment of this application, a packet transmission procedure triggered after a routing node detects a fault event is further provided. For example, refer to FIG. 42. If a routing node senses that a proxy node 1 is faulty, or senses that a link between the routing node and the proxy node 1 is faulty, the routing node may perform a method provided in this embodiment of this application, to ensure that a dynamic proxy operation is performed on a packet and the packet can be processed by an SF node. The following provides detailed descriptions by using the following embodiment in FIG. 43.

Figure 43:
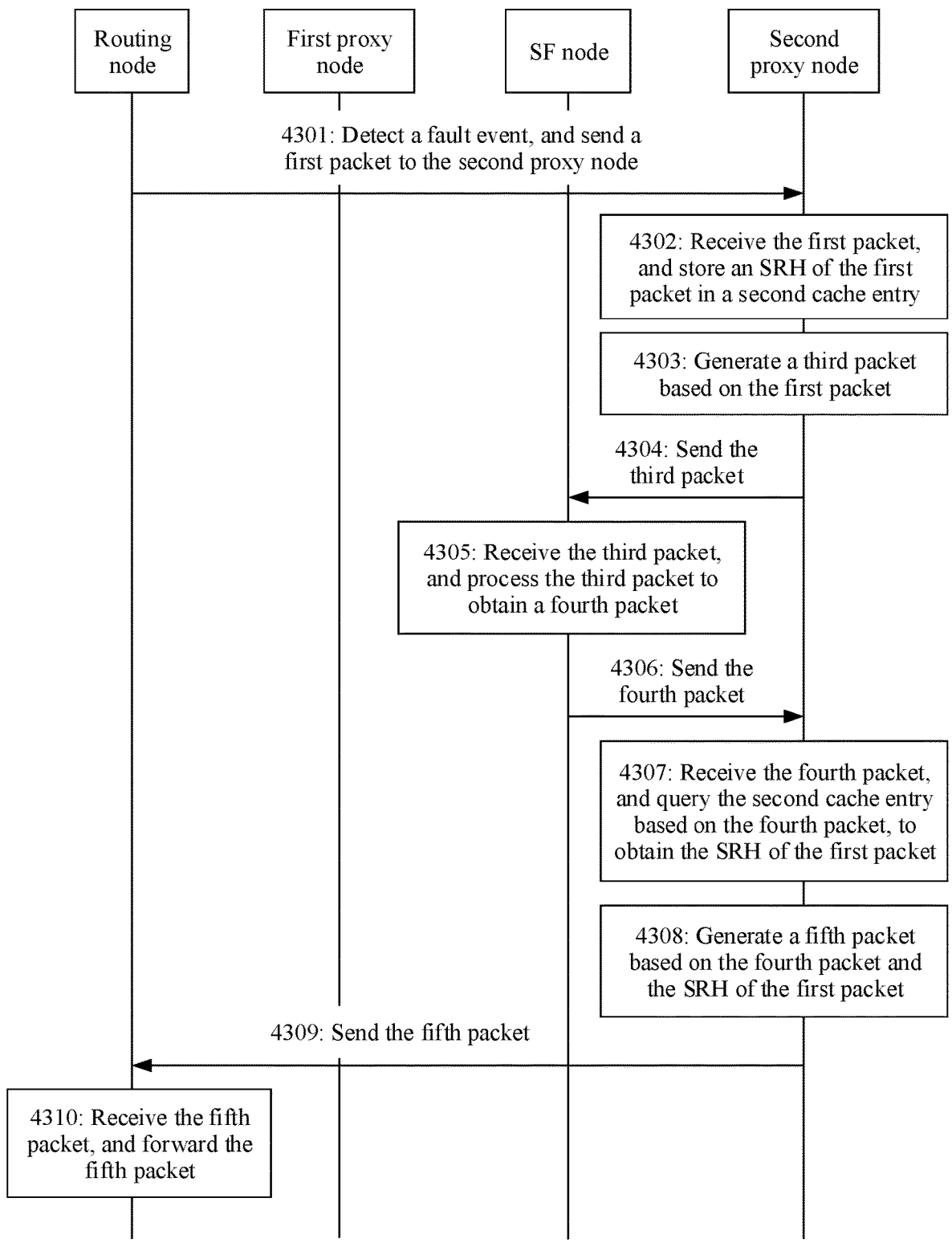
FIG. 43 is a flowchart of a packet transmission method according to an embodiment of this application.

FIG. 43 is a flowchart of a packet transmission method according to an embodiment of this application. The method may include the following steps.

Step 4301: A routing node detects a fault event, and sends a first packet to a second proxy node.

Refer to FIG. 3. The fault event includes at least one of an event that the second link is faulty, an event that a fourth link is faulty, or an event that a first proxy node is faulty. For example, if the routing node accesses the second link through a fourth outbound interface, the routing node may detect a status of the fourth outbound interface. If the status of the fourth outbound interface is down, the routing node detects the event that the second link is faulty.

Figure 44:
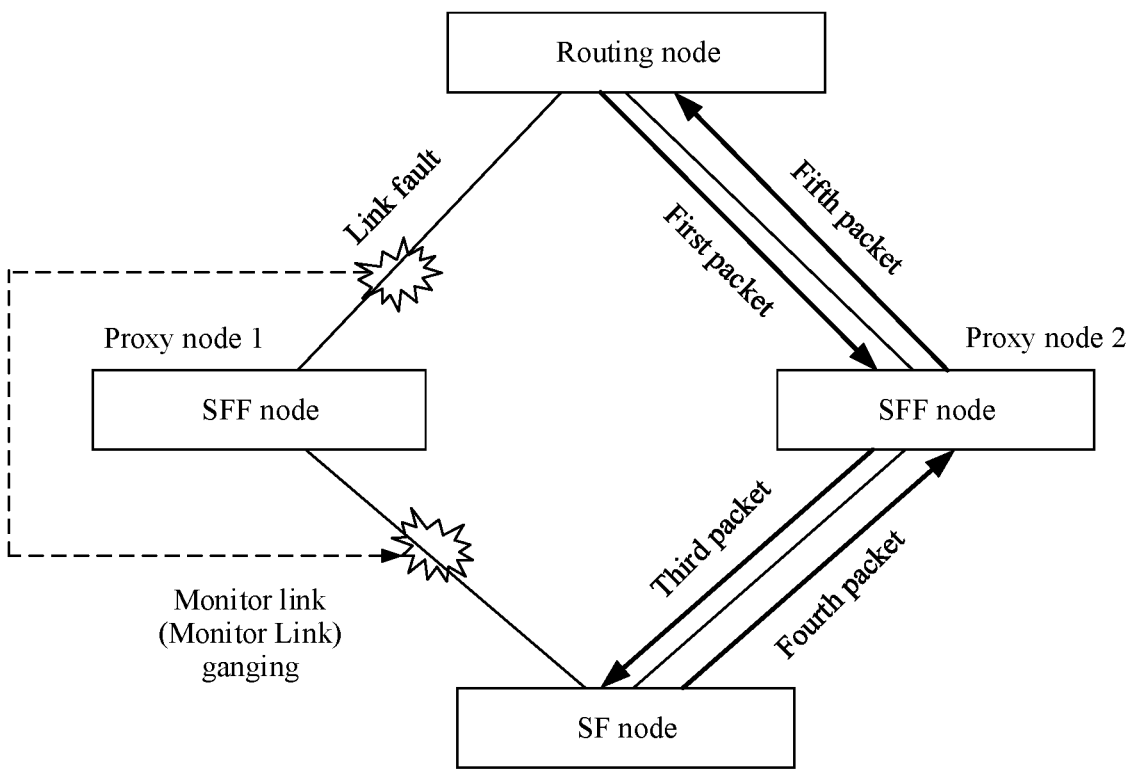
FIG. 44 is a schematic diagram of packet transmission in a fault scenario according to an embodiment of this application.

Optionally, a monitor link group may be deployed on the first proxy node. The monitor link group includes the second link and the fourth link, the second link may be a monitored object in the monitor link group, and the fourth link may be a monitor object in the monitor link group. The first proxy node may detect a status of a second outbound interface, and if the status of the second outbound interface is down, may determine that the second link is faulty. In this case, the first proxy node sets a status of a third outbound interface to down. Therefore, the fourth link is down synchronously with the fault of the second link, and the fourth link is associated with the second link. For example, refer to FIG. 44. A proxy node 1 may detect a status of an outbound interface connected to an SF node. If the status of the outbound interface connected to the SF node is down, the proxy node 1 sets a status of an outbound interface connected to a routing node to down, so that a link between the proxy node 1 and the routing node is down. A dashed line in FIG. 44 indicates that disabling of the second link causes disabling of the fourth link.

After detecting the fault event, the routing node may determine that the payload of the first packet cannot be temporarily forwarded by the first proxy node to the SF node. In this case, the routing node sends the first packet to the second proxy node by using a dual-homing access networking architecture, to transmit the payload of the first packet to the second proxy node, so that the payload of the first packet is forwarded by the second proxy node to the SF node. For example, refer to FIG. 3. If the routing node accesses a third link through a fifth outbound interface, the routing node may select the fifth outbound interface as an outbound interface of the first packet, and send the first packet through the fifth outbound interface. In this case, the first packet is transmitted to the second proxy node through the third link.

Step 4302: The second proxy node receives the first packet from the routing node, and the second proxy node stores an SRH of the first packet in a second cache entry.

Step 4303: The second proxy node generates a third packet based on the first packet.

Step 4304: The second proxy node sends the third packet to the SF node.

Step 4305: The SF node receives the third packet from the second proxy node, and processes the third packet to obtain a fourth packet.

Step 4306: The SF node sends the fourth packet to the second proxy node.

Step 4307: The second proxy node receives the fourth packet from the SF node, and queries the second cache entry based on the fourth packet, to obtain the SRH of the first packet.

Step 4308: The second proxy node generates a fifth packet based on the fourth packet and the SRH of the first packet.

Step 4309: The second proxy node sends the fifth packet to the routing node.

Step 4310: The routing node receives the fifth packet from the second proxy node, and forwards the fifth packet.

In this embodiment, a method for providing a dynamic proxy service in a fault scenario is provided. When detecting that a link connected to one proxy node is faulty, the routing node forwards the packet to the other proxy node, so that the other proxy node performs a dynamic proxy operation in place of the faulty proxy node. Therefore, in the fault scenario, this can also ensure that the packet is processed by the SF and normally transmitted, to greatly improve network stability, reliability, and robustness.

The foregoing embodiments in FIG. 41A and FIG. 41B to FIG. 44 show the procedure of the packet transmission method in the fault scenario. It should be understood that the foregoing embodiments in FIG. 41A and FIG. 41B to FIG. 44 are merely examples of the fault scenario. The method provided in this embodiment of this application may also be similarly applied to another fault scenario. The method provided in this embodiment of this application has an adaptive feature. To be specific, a set of forwarding procedures can be applied to correctly process traffic forwarding requirements in various scenarios. For brevity, only some fault scenarios are described above, and processing in other fault scenarios is similar to that in the foregoing fault scenarios. Details are not described herein again.

The foregoing describes the packet transmission method in the embodiments of this application. The following describes a first proxy node and a second proxy node.

Figure 45:
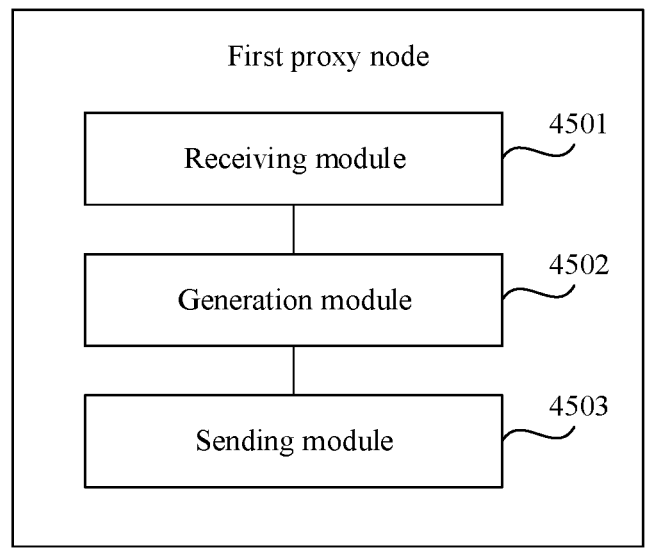
FIG. 45 is a schematic structural diagram of a first proxy node according to an embodiment of this application.

FIG. 45 is a schematic structural diagram of a first proxy node according to an embodiment of this application. As shown in FIG. 45, the first proxy node includes: a receiving module 4501, configured to perform a step of receiving a first packet, for example, may perform step 502, step 3502, step 3602, step 3702, step 3802, step 3902, step 4102, or step 4302 in the foregoing method embodiment; a generation module 4502, configured to perform a step of generating a second packet, for example, may perform step 503, step 3503, step 3604, step 3704, step 3803, step 3903, or step 4104 in the foregoing method embodiment; and a sending module 4503, configured to perform a step of sending the second packet, for example, may perform step 504, step 3504, step 3605, step 3705, step 3804, step 3904, or step 4105 in the foregoing method embodiment.

Optionally, the generation module 4502 is configured to: insert a first bypass SID into a segment list of an SRH of a first packet; increase a segment left SL of the SRH of the first packet by one; and update a destination address of the first packet to the first bypass SID, to obtain the second packet.

Optionally, the control information is carried in an extension header of the second packet; the control information is carried in the first detour SID; the control information is carried in an IP header of the second packet; or the control information is carried in a TLV in an SRH of the second packet.

Optionally, the first proxy node further includes a storage module, configured to perform a step of storing the SRH of the first packet, for example, may perform step 502, step 3502, step 3603, step 3703, step 3802, step 3902, or step 4103 in the foregoing method embodiment.

The generation module 4502 is further configured to perform a step of generating a third packet, for example, may perform step 508, step 3508, step 3610, step 3710, step 3808, or step 3908 in the foregoing method embodiment.

The sending module 4503 is further configured to perform a step of sending the third packet, for example, may perform step 509, step 3509, step 3611, step 3711, step 3809, or step 3909 in the foregoing method embodiment.

Optionally, the storage module is configured to perform a step of storing the SRH by using an identifier of a first cache entry as an index, for example, may perform step 3602 and step 3603 or step 3702 and step 3703 in the foregoing method embodiment.

Optionally, the first proxy node further includes a determining module, further configured to determine that a service function of a service function node includes modifying a flow identifier.

Optionally, the second packet further includes the identifier of the first cache entry, the control information is further used to indicate the second proxy node to store a mapping relationship between the identifier of the first cache entry and an identifier of a second cache entry, and the second cache entry is a cache entry used by the second proxy node to store the SRH of the first packet.

Optionally, the receiving module 4501 is further configured to perform a step of receiving a fourth packet, for example, may perform step 3714 in the foregoing method embodiment. The first proxy node further includes a query module, configured to perform a step of performing query to obtain the SRH of the first packet, for example, may perform step 3714 in the foregoing method embodiment. The generation module 4502 is further configured to perform a step of generating a fifth packet, for example, may perform step 3715 in the foregoing method embodiment. The sending module 4503 is further configured to perform a step of sending the fifth packet, for example, may perform step 3716 in the foregoing method embodiment.

Optionally, a trigger condition for generating the second packet includes one or more of the following: it is detected that the first cache entry is generated; and it is detected that the first cache entry is updated.

Optionally, the storage module is configured to perform a step of storing the SRH by using a flow identifier corresponding to the first packet and an endpoint dynamic proxy SID as indexes, for example, may perform step 3802 in the foregoing method embodiment.

Optionally, the receiving module 4501 is configured to perform a step of receiving a configuration instruction. The storage module is configured to perform a step of storing a mapping relationship between the endpoint dynamic proxy SID and a VPN identifier.

Optionally, a flow identifier corresponding to the third packet is the flow identifier corresponding to the first packet, and the third packet includes the VPN identifier. The receiving module 4501 is further configured to perform a step of receiving a fourth packet, for example, perform step 3912 in the foregoing method embodiment. The first proxy node further includes a query module, configured to perform a step of querying the mapping relationship between the endpoint dynamic proxy SID and the VPN identifier, for example, perform step 3912 in the foregoing method embodiment. The query module is further configured to perform a step of performing query to obtain the SRH of the first packet, for example, perform step 3913 in the foregoing method embodiment. The generation module 4502 is further configured to perform a step of generating a fifth packet, for example, perform step 3914 in the foregoing method embodiment. The sending module 4503 is further configured to perform a step of generating the fifth packet, for example, perform step 3915 in the foregoing method embodiment.

Optionally, the second packet further includes a payload of the first packet, and the control information is further used to indicate the second proxy node to send the payload of the first packet to the service function node. The first proxy node further includes a detection module, configured to perform a step of detecting a fault event, for example, perform step 4102 in the foregoing method embodiment.

Optionally, the first proxy node is connected to the second proxy node through a first link; and the sending module 4503 is configured to send the second packet to the second proxy node through a first outbound interface corresponding to the first link. Alternatively, the first proxy node is connected to a routing node through a second link, and the routing node is connected to the second proxy node through a third link; and the sending module 4503 is configured to send the second packet to the routing node through a second outbound interface corresponding to the second link, where the second packet is forwarded by the routing node to the second proxy node through the third link.

Optionally, the detection module is further configured to detect a status of the first link. The sending module 4503 is configured to: if the first link is in an available state, send the second packet to the second proxy node through the first outbound interface corresponding to the first link; or if the first link is in an unavailable state, send the second packet to the routing node through the second outbound interface corresponding to the second link.

Optionally, the sending module 4503 is configured to: continuously send a plurality of second packets to the second proxy node; or when a sixth packet is not received, retransmit the second packet to the second proxy node, where a source address of the sixth packet is the first bypass SID, the sixth packet may include a second bypass SID corresponding to the first proxy node, for example, a destination address of the sixth packet is the second bypass SID, and the sixth packet is used to indicate that the second packet is received.

It should be understood that the first proxy node provided in the embodiment in FIG. 45 corresponds to the first proxy node in the foregoing method embodiment. The modules in the first proxy node and the foregoing other operations and/or functions are respectively used to implement various steps and methods implemented by the first proxy node in the method embodiment. For specific details, refer to the foregoing method embodiment. For ease of brevity, the details are not described herein again.

It should be noted that, when the first proxy node provided in the embodiment in FIG. 45 transmits a packet, only division into the foregoing functional modules is used as an example for description. In actual application, the foregoing functions may be allocated to different functional modules for implementation based on a requirement, that is, an internal structure of the first proxy node is divided into different functional modules, to complete all or some of the functions described above. In addition, the first proxy node provided in the foregoing embodiment and the packet transmission method embodiment belong to a same concept. For a specific implementation process of the first proxy node, refer to the method embodiment. Details are not described herein again.

Figure 46:
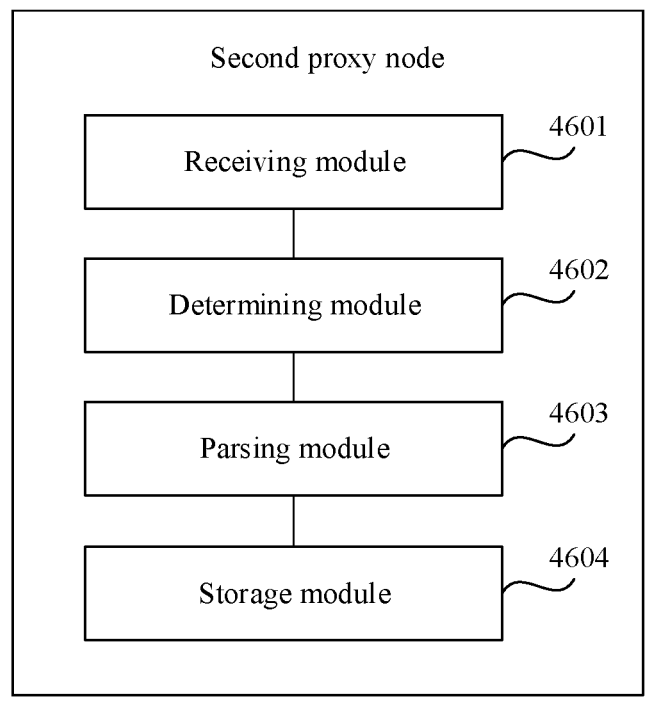
FIG. 46 is a schematic structural diagram of a second proxy node according to an embodiment of this application.

FIG. 46 is a schematic structural diagram of a second proxy node according to an embodiment of this application. As shown in FIG. 46, the second proxy node includes:

a receiving module 4601, configured to perform a step of receiving a second packet, for example, may perform step 505, step 3505, step 3606, step 3709, step 3805, step 3905, or step 4106 in the foregoing method embodiment;

a determining module 4602, configured to perform a step of determining that control information indicates the second proxy node to store an SRH of a first packet, for example, may perform step 505, step 3505, step 3606, step 3706, step 3805, step 3905, or step 4106 in the foregoing method embodiment;

a parsing module 4603, configured to perform a step of parsing the second packet, for example, may perform step 506, step 3506, step 3607, step 3707, step 3806, step 3906, or step 4107 in the foregoing method embodiment; and a storage module 4604, configured to perform a step of storing the SRH of the first packet, for example, may perform step 507, step 3507, step 3609, step 3709, step 3807, step 3907, step 4108, or step 4302 in the foregoing method embodiment.

Optionally, the parsing module 4603 is configured to: delete a first bypass SID from a segment list of an SRH of the second packet; and decrease an SL of the SRH of the second packet by one, to obtain the SRH of the first packet.

Optionally, the control information is carried in an extension header of the second packet; the control information is carried in the first detour SID; the control information is carried in an IP header of the second packet; or the control information is carried in a TLV in the SRH of the second packet.

Optionally, the storage module 4604 is configured to perform a step of storing the SRH by using an identifier of a second cache entry as an index, for example, may perform step 3608 to step 3609, or step 3708 and step 3709 in the foregoing method embodiment.

Optionally, the determining module 4602 is further configured to determine that a service function of a service function node includes modifying a flow identifier.

Optionally, the second packet further includes an identifier of a first cache entry, and the first cache entry is a cache entry used by the first proxy node to store the SRH of the first packet. The determining module 4602 is further configured to determine that the control information further indicates the second proxy node to store a mapping relationship between the identifier of the first cache entry and the identifier of the second cache entry. The storage module 4604 is further configured to store the mapping relationship between the identifier of the first cache entry and the identifier of the second cache entry.

Optionally, the receiving module 4601 is further configured to perform a step of receiving a fourth packet that carries the identifier of the first cache entry. The second proxy node further includes: a query module, configured to query the mapping relationship between the identifier of the first cache entry and the identifier of the second cache entry based on the identifier of the first cache entry, to obtain the identifier that is of the second cache entry and that corresponds to the identifier of the first cache entry. The query module is further configured to query the second cache entry by using the identifier of the second cache entry as the index, to obtain the SRH of the first packet; a generation module, configured to generate a fifth packet based on the fourth packet and the SRH of the first packet, where the fifth packet includes a payload of the fourth packet and the SRH of the first packet; and a sending module, configured to send the fifth packet.

Optionally, a flow identifier corresponding to the second packet is a flow identifier corresponding to the first packet, and the SRH of the first packet includes an endpoint dynamic proxy SID. The storage module 4604 is configured to perform a step of storing the SRH by using the flow identifier corresponding to the first packet and the endpoint dynamic proxy SID as indexes, for example, perform step 3807 or step 3907 in the foregoing method embodiment.

Optionally, the receiving module 4601 is further configured to receive a configuration instruction, where the configuration instruction includes an endpoint dynamic proxy SID corresponding to a service function node in each virtual private network VPN. The storage module 4604 is further configured to store a mapping relationship between the endpoint dynamic proxy SID and a VPN identifier according to the configuration instruction.

Optionally, the receiving module 4601 is further configured to perform the step of receiving the fourth packet in step 3812. The second proxy node further includes: the query module, configured to perform a step of performing query based on the VPN identifier, the endpoint dynamic proxy SID, and a flow identifier corresponding to the fourth packet, to obtain the SRH, for example, perform step 3812; the generation module, further configured to perform step 3813; and the sending module, further configured to perform step 3814.

Optionally, the second proxy node further includes: the determining module 4602, further configured to perform a step of determining that the control information further indicates the second proxy node to send a payload of the first packet to the service function node, for example, perform step 4106; the generation module, further configured to perform a step of generating a third packet, for example, perform step 4109; and the sending module, further configured to perform step 4110.

Optionally, the second proxy node is connected to the first proxy node through a first link; and the receiving module 4601 is configured to receive the second packet from the first proxy node through a first inbound interface corresponding to the first link; or the second proxy node is connected to a routing node through a third link, and the routing node is connected to the first proxy node through a second link; and the receiving module 4601 is configured to receive the second packet from the routing node through a second inbound interface corresponding to the third link, where the second packet is sent by the first proxy node to the routing node through the second link.

Optionally, the receiving module 4601 is configured to continuously receive a plurality of second packets from the first proxy node. Alternatively, the second proxy node further includes: the generation module, configured to generate a sixth packet based on the first bypass SID, a second bypass SID corresponding to the second proxy node, and the second packet; and the sending module, further configured to send the sixth packet to the first proxy node, where a source address of the sixth packet is the first bypass SID, the sixth packet includes a second bypass SID corresponding to the first proxy node, and the sixth packet is used to indicate that the second packet is received.

It should be understood that the second proxy node provided in the embodiment in FIG. 46 corresponds to the second proxy node in the foregoing method embodiment. The modules in the second proxy node and the foregoing other operations and/or functions are respectively used to implement various steps and methods implemented by the second proxy node in the method embodiment. For specific details, refer to the foregoing method embodiment. For ease of brevity, the details are not described herein again.

It should be noted that, when the second proxy node provided in the embodiment in FIG. 46 transmits a packet, only division into the foregoing functional modules is used as an example for description. In actual application, the foregoing functions may be allocated to different functional modules for implementation based on a requirement, that is, an internal structure of the second proxy node is divided into different functional modules, to complete all or some of the functions described above. In addition, the second proxy node provided in the foregoing embodiment and the packet transmission method embodiment belong to a same concept. For a specific implementation process of the second proxy node, refer to the method embodiment. Details are not described herein again.

The foregoing describes the first proxy node and the second proxy node provided in the embodiments of this application. The following describes possible product forms of the first proxy node and the second proxy node. It should be understood that, any form of product that has the feature of the first proxy node and any form of product that has the feature of the second proxy node fall within the protection scope of this application. It should be further understood that the following descriptions are merely examples, and product forms of the first proxy node and the second proxy node in the embodiments of this application are not limited thereto.

An embodiment of this application provides a proxy node. The proxy node may be a first proxy node or a second proxy node.

The proxy node includes a processor, and the processor is configured to execute instructions, so that the proxy node performs the packet transmission method provided in the foregoing method embodiments.

For example, the processor may be a network processor (NP), a central processing unit (CPU), an application-specific integrated circuit (ASIC), or an integrated circuit configured to control program execution in the solutions of this application. The processor may be a single-core processor (single-CPU), or may be a multi-core processor (multi-CPU). There may be one or more processors.

In some possible embodiments, the proxy node may further include a memory.

The memory may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto.

The memory and the processor may be separately disposed, or the memory and the processor may be integrated together.

In some possible embodiments, the proxy node may further include a transceiver.

The transceiver is configured to communicate with another device or a communications network. A network communication manner may be but is not limited to an Ethernet network, a radio access network (RAN), a wireless local area network (WLAN), or the like. In this embodiment of this application, a communications interface may be configured to receive a packet sent by another node, or may send a packet to another node.

In some possible embodiments, the proxy node may be implemented as a network device, and a network processor in the network device may perform the steps in the foregoing method embodiments. For example, the network device may be a router, a switch, or a firewall.

Figure 47:
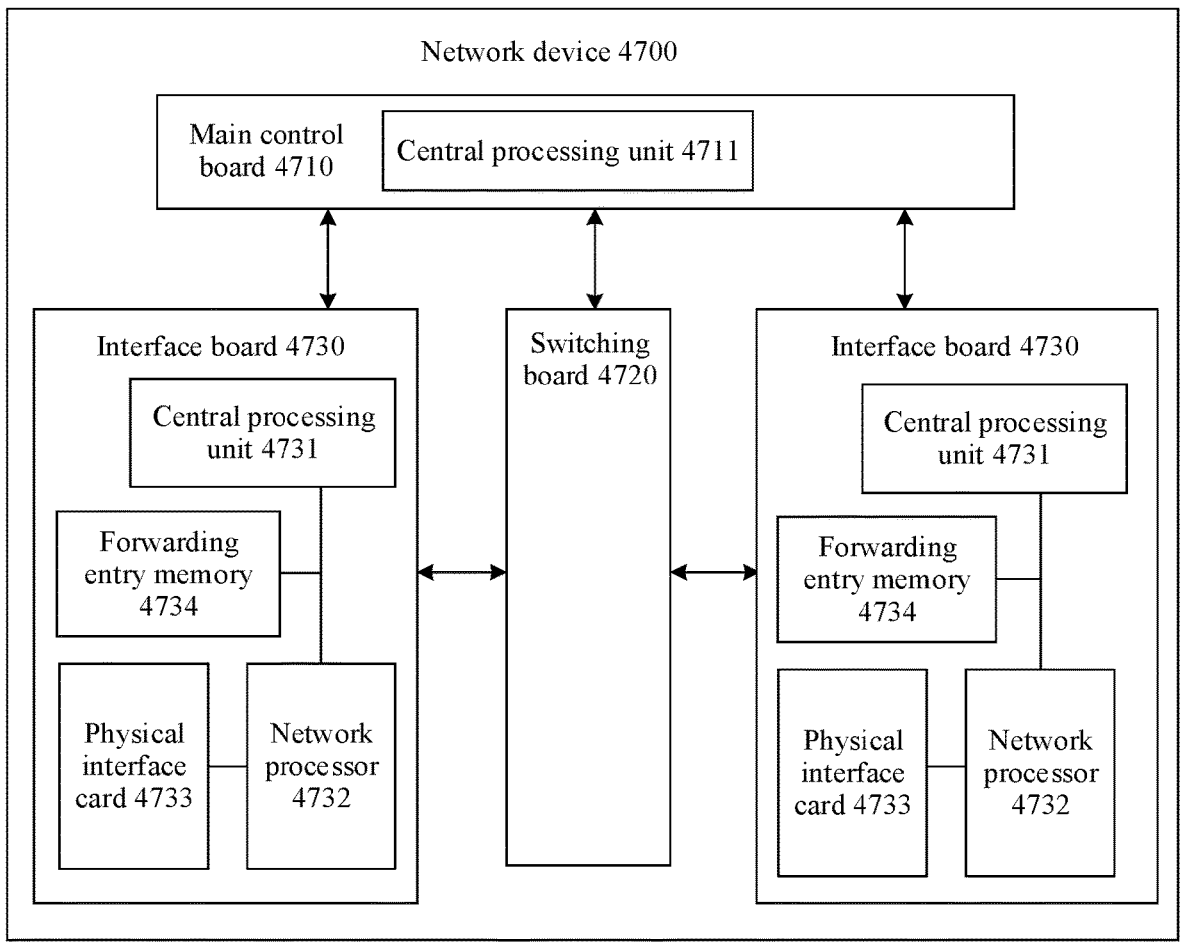
FIG. 47 is a schematic structural diagram of a network device according to an embodiment of this application.

FIG. 47 is a schematic structural diagram of a network device according to an example embodiment of this application. The network device may be configured as a first proxy node or a second proxy node.

The network device 4700 includes a main control board 4710, an interface board 4730, a switching board 4720, and an interface board 4740. The main control board 4710 is configured to complete functions such as system management, device maintenance, and protocol processing. The switching board 4720 is configured to complete data exchange between interface boards (the interface board is also referred to as a line card or a service board). The interface boards 4730 and 4740 are configured to: provide various service interfaces (for example, an Ethernet interface and a POS interface), and implement data packet forwarding. The main control board 4710, the interface boards 4730 and 4740, and the switching board 4720 are connected to a system backboard through a system bus for communication. A central processing unit 4731 on the interface board 4730 is configured to: control and manage the interface board, and communicate with a central processing unit 4711 on the main control board 4710.

If the network device 4700 is configured as a first proxy node, a physical interface card 4733 receives a first packet, and sends the first packet to a network processor 4732. The network processor 4732 generates a second packet based on an endpoint dynamic proxy SID, the first packet, and a first bypass SID corresponding to a second proxy node, and sends the second packet through the physical interface card 4733 based on information such as an outbound interface after completing link layer encapsulation, so that the second packet is transmitted to the second proxy node.

In an embodiment, the network processor 4732 may update an SL of an SRH of the first packet; and update a destination address of the first packet to obtain the second packet, where an SL of the second packet is greater than an SL of the first packet.

In an embodiment, the network processor 4732 may increase the SL of the first packet by one; and update the destination address of the first packet to the first bypass SID.

In an embodiment, the network processor 4732 may insert one or more target SIDs into a segment list of the SRH of the first packet, where the one or more target SIDs are used to indicate a target forwarding path, the target forwarding path is a path from the first proxy node to the second proxy node; increase the SL of the first packet by N, where N is a positive integer greater than 1; and update the destination address of the first packet to a SID corresponding to a next SR node in the one or more target SIDs.

In an embodiment, control information is carried in an extension header of the second packet; the control information is carried in the first bypass SID; the control information is carried in an IP header of the second packet; or the control information is carried in a TLV in an SRH of the second packet.

In an embodiment, the network processor 4732 may store the SRH of the first packet in a forwarding entry memory 4734. The network processor 4732 may generate a third packet based on the first packet, and send the third packet through the physical interface card 4733 based on information such as an outbound interface after completing link layer encapsulation, so that the third packet is transmitted to an SF node.

In an embodiment, the network processor 4732 may store the SRH of the first packet in the forwarding entry memory 4734 by using an identifier of a first cache entry as an index.

In an embodiment, the second packet further includes the identifier of the first cache entry, the control information is further used to indicate the second proxy node to store a mapping relationship between the identifier of the first cache entry and an identifier of a second cache entry, and the second cache entry is a cache entry used by the second proxy node to store the SRH of the first packet.

In an embodiment, the physical interface card 4733 receives a fourth packet, and sends the fourth packet to the network processor 4732. The network processor 4732 performs query by using the identifier of the first cache entry as the index, to obtain the SRH of the first packet. The network processor 4732 generates a fifth packet based on the fourth packet and the SRH of the first packet, where the fifth packet includes a payload of the fourth packet and the SRH of the first packet. The network processor 4732 sends the fifth packet through the physical interface card 4733.

In an embodiment, the network processor 4732 generates the second packet when detecting that the first cache entry is generated.

In an embodiment, the network processor 4732 generates the second packet when detecting that the first cache entry is updated.

In an embodiment, the network processor 4732 stores the SRH of the first packet in the forwarding entry memory 4734 by using a flow identifier corresponding to the first packet and the endpoint dynamic proxy SID as indexes.

In an embodiment, the central processing unit 4711 on the main control board 4710 may receive a configuration instruction, and store a mapping relationship between the endpoint dynamic proxy SID and a VPN identifier in the forwarding entry memory 4734 according to the configuration instruction.

In an embodiment, the physical interface card 4733 receives a fourth packet. The network processor 4732 queries the forwarding entry memory 4734 based on the VPN identifier, the flow identifier corresponding to the first packet, and the endpoint dynamic proxy SID, to obtain the SRH of the first packet. The network processor 4732 generates a fifth packet based on the fourth packet and the SRH of the first packet, and sends the fifth packet through the physical interface card 4733.

In an embodiment, the network processor 4732 may detect a fault event, where the fault event includes at least one of an event that a link between the first proxy node and the service function node is faulty or an event that the first proxy node is faulty.

In an embodiment, the network processor 4732 detects a status of a first link. If the first link is in an available state, the network processor 4732 selects the physical interface card 4733 and sends the second packet through a first outbound interface corresponding to the first link. Alternatively, if the first link is in an unavailable state, the network processor 4732 selects the physical interface card 4733 and sends the second packet through a second outbound interface corresponding to the second link.

In an embodiment, the network processor 4732 continuously generates a plurality of second packets, and sends the plurality of second packets to the physical interface card 4733. The physical interface card 4733 continuously sends the plurality of second packets to the second proxy node.

In an embodiment, when the physical interface card 4733 does not receive a sixth packet, the network processor 4732 retransmits the second packet to the second proxy node.

If the network device 4700 is configured as a second proxy node, a physical interface card 4733 receives a second packet, and sends the second packet to a network processor 4732. The network processor 4732 determines that control information indicates the second proxy node to store an SRH of a first packet; parses the second packet to obtain the SRH of the first packet; and stores the SRH of the first packet in a second cache entry in a forwarding entry memory 4734.

In an embodiment, the network processor 4732 deletes a first bypass SID from a segment list of an SRH of the second packet; and decreases a segment left SL of the SRH of the second packet by one, to obtain the SRH of the first packet.

In an embodiment, the control information is carried in an extension header of the second packet; the control information is carried in the first bypass SID; the control information is carried in an IP header of the second packet; or the control information is carried in a TLV in the SRH of the second packet.

In an embodiment, the network processor 4732 stores the SRH of the first packet in the second cache entry in the forwarding entry memory 4734 by using an identifier of the second cache entry as an index.

In an embodiment, the network processor 4732 determines that a service function of an SF node includes modifying a flow identifier.

In an embodiment, the network processor 4732 determines that the control information further indicates the second proxy node to store a mapping relationship between an identifier of a first cache entry and the identifier of the second cache entry. The network processor 4732 stores the mapping relationship between the identifier of the first cache entry and the identifier of the second cache entry in the forwarding entry memory 4734.

In an embodiment, the physical interface card 4733 receives a fourth packet, and sends the fourth packet to the network processor 4732. The network processor 4732 queries the mapping relationship between the identifier of the first cache entry and the identifier of the second cache entry in the forwarding entry memory 4734 based on the identifier of the first cache entry, to obtain the identifier that is of the second cache entry and that corresponds to the identifier of the first cache entry. The network processor 4732 queries the second cache entry in the forwarding entry memory 4734 by using the identifier of the second cache entry as the index, to obtain the SRH of the first packet. The network processor 4732 generates a fifth packet based on the fourth packet and the SRH of the first packet. The network processor 4732 sends the fifth packet through the physical interface card 4733 based on information such as an outbound interface after completing link layer encapsulation.

In an embodiment, the network processor 4732 stores the SRH of the first packet in the second cache entry by using a flow identifier corresponding to the second packet and an endpoint dynamic proxy SID as indexes.

In an embodiment, the central processing unit 4711 on the main control board 4710 may receive a configuration instruction, and store a mapping relationship between the endpoint dynamic proxy SID and a VPN identifier in the forwarding entry memory 4734 according to the configuration instruction.

In an embodiment, the physical interface card 4733 receives a fourth packet, and sends the fourth packet to the network processor 4732. The network processor 4732 queries the second cache entry in the forwarding entry memory 4734 based on the VPN identifier, the endpoint dynamic proxy SID, and a flow identifier corresponding to the fourth packet, to obtain the SRH of the first packet. The network processor 4732 generates a fifth packet based on the fourth packet and the SRH of the first packet. The network processor 4732 sends the fifth packet through the physical interface card 4733 based on information such as an outbound interface after completing link layer encapsulation.

In an embodiment, the network processor 4732 determines that the control information further indicates the second proxy node to send a payload of the first packet to the service function node. The network processor 4732 generates a third packet based on the second packet, and the network processor 4732 sends the third packet through the physical interface card 4733, so that the third packet is transmitted to the SF node.

In an embodiment, the physical interface card 4733 receives the second packet through a first inbound interface corresponding to a first link. Alternatively, the physical interface card 4733 receives the second packet through a second inbound interface corresponding to a third link.

In an embodiment, the physical interface card 4733 continuously receives a plurality of second packets, and sends the plurality of second packets to the network processor 4732.

In an embodiment, the network processor 4732 generates a sixth packet based on the first bypass SID, a second bypass SID corresponding to the second proxy node, and the second packet. The network processor 4732 sends the sixth packet through the physical interface card 4733 based on information such as an outbound interface after completing link layer encapsulation.

It should be understood that an operation performed on the interface board 4740 is the same as an operation performed on the interface board 4730 in this embodiment of this application. For ease of brevity, details are not described again. It should be understood that the network device 4700 in this embodiment may correspond to the first proxy node or the second proxy node in the foregoing method embodiments. The main control board 4710, and the interface board 4730 and/or the interface board 4740 in the network device 4700 may implement the functions of and/or the steps implemented by the first proxy node or the second proxy node in the foregoing method embodiments. For ease of brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load sharing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained after the two central processing units are combined. This form of device (for example, a network device such as a low-end switch or router) has a weak data exchange and processing capability. A specific architecture that is to be used depends on a specific networking deployment scenario. This is not limited herein.

In some possible embodiments, the proxy node may be implemented as a computing device, and a central processing unit in the computing device may perform the steps in the foregoing method embodiments. For example, the computing device may be a host, a server, a personal computer, or the like. The computing device may be implemented by using a general bus architecture.

Figure 48:
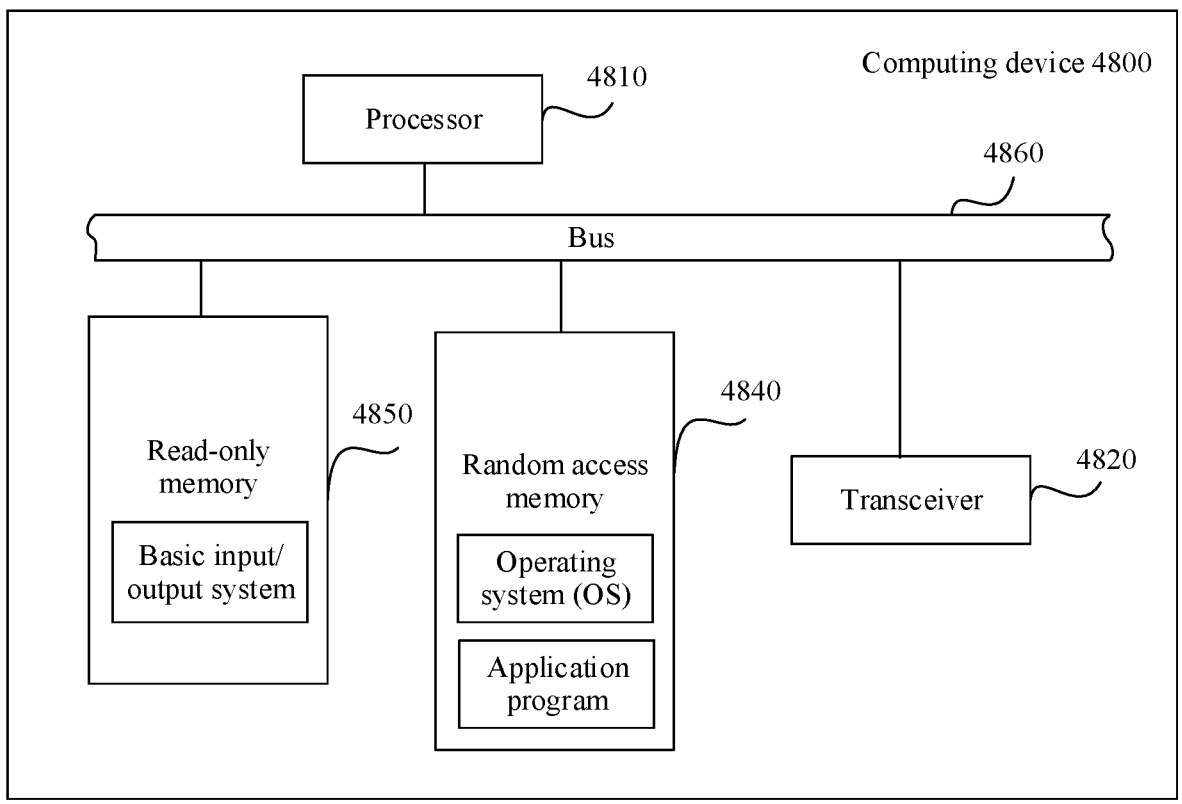
FIG. 48 is a schematic structural diagram of a computing device according to an embodiment of this application.

FIG. 48 is a schematic structural diagram of a computing device according to an example embodiment of this application. The computing device may be configured as a first proxy node or a second proxy node.

The computing device 4800 includes a processor 4810, a transceiver 4820, a random access memory 4840, a read-only memory 4850, and a bus 4860. The processor 4810 is separately coupled to the transceiver 4820, the random access memory 4840, and the read-only memory 4850 through the bus 4860. When the computing device 4800 needs to be run, the computing device 4800 is started by using a basic input/output system built into the read-only memory 4850 or a bootloader (bootloader) bootstrap system in an embedded system, to boot the computing device 4800 to enter a normal running state.

If the computing device 4800 is configured as a first proxy node, after the computing device 4800 enters a normal running state, an application program and an operating system are run in the random access memory 4840.

The transceiver 4820 receives a first packet, and sends the first packet to the processor 4810. The processor 4810 generates a second packet based on an endpoint dynamic proxy SID, the first packet, and a first bypass SID corresponding to a second proxy node, and sends the second packet from the transceiver 4820 based on information such as an outbound interface after completing link layer encapsulation, so that the second packet is transmitted to the second proxy node.

In an embodiment, the processor 4810 may update a segment left SL of an SRH of the first packet; and update a destination address of the first packet to obtain the second packet, where an SL of the second packet is greater than an SL of the first packet.

In an embodiment, the processor 4810 may increase the SL of the first packet by one; and update the destination address of the first packet to the first bypass SID.

In an embodiment, the processor 4810 may insert one or more target SIDs into a segment list of the SRH of the first packet, where the one or more target SIDs are used to indicate a target forwarding path, the target forwarding path is a path from the first proxy node to the second proxy node; increase the SL of the first packet by N, where N is a positive integer greater than 1; and update the destination address of the first packet to a SID corresponding to a next SR node in the one or more target SIDs.

In an embodiment, control information is carried in an extension header of the second packet; the control information is carried in the first bypass SID; the control information is carried in an IP header of the second packet; or the control information is carried in a TLV in an SRH of the second packet.

In an embodiment, the processor 4810 may store the SRH of the first packet in the random access memory 4840. The processor 4810 may generate a third packet based on the first packet, and send the third packet from the transceiver 4820 based on information such as an outbound interface after completing link layer encapsulation, so that the third packet is transmitted to an SF node.

In an embodiment, the processor 4810 may store the SRH of the first packet in the random access memory 4840 by using an identifier of a first cache entry as an index.

In an embodiment, the second packet further includes the identifier of the first cache entry, the control information is further used to indicate the second proxy node to store a mapping relationship between the identifier of the first cache entry and an identifier of a second cache entry, and the second cache entry is a cache entry used by the second proxy node to store the SRH of the first packet.

In an embodiment, the transceiver 4820 receives a fourth packet, and sends the fourth packet to the processor 4810. The processor 4810 performs query by using the identifier of the first cache entry as the index, to obtain the SRH of the first packet. The processor 4810 generates a fifth packet based on the fourth packet and the SRH of the first packet, where the fifth packet includes a payload of the fourth packet and the SRH of the first packet. The processor 4810 sends the fifth packet from the transceiver 4820.

In an embodiment, the processor 4810 generates the second packet when detecting that the first cache entry is generated.

In an embodiment, the processor 4810 generates the second packet when detecting that the first cache entry is updated.

In an embodiment, the processor 4810 stores the SRH of the first packet in the random access memory 4840 by using a flow identifier corresponding to the first packet and an endpoint dynamic proxy SID as indexes.

In an embodiment, the processor 4810 may receive a configuration instruction, and store a mapping relationship between the endpoint dynamic proxy SID and a VPN identifier in the random access memory 4840 according to the configuration instruction.

In an embodiment, the transceiver 4820 receives a fourth packet. The processor 4810 queries the random access memory 4840 based on the VPN identifier, the flow identifier corresponding to the first packet, and the endpoint dynamic proxy SID, to obtain the SRH of the first packet. The processor 4810 generates a fifth packet based on the fourth packet and the SRH of the first packet, and sends the fifth packet from the transceiver 4820.

In an embodiment, the processor 4810 may detect a fault event, where the fault event includes at least one of an event that a link between the first proxy node and the service function node is faulty or an event that the first proxy node is faulty.

In an embodiment, the processor 4810 detects a status of a first link. If the first link is in an available state, the processor 4810 selects the transceiver 4820 and sends the second packet through a first outbound interface corresponding to the first link. Alternatively, if the first link is in an unavailable state, the processor 4810 selects the transceiver 4820 and sends the second packet through a second outbound interface corresponding to the second link.

In an embodiment, the processor 4810 continuously generates a plurality of second packets, and sends the plurality of second packets to the transceiver 4820. The transceiver 4820 continuously sends the plurality of second packets to the second proxy node.

In an embodiment, when the transceiver 4820 does not receive a sixth packet, the processor 4810 retransmits the second packet to the second proxy node.

If the computing device 4800 is configured as a second proxy node, the transceiver 4820 receives a second packet, and sends the second packet to the processor 4810. The processor 4810 determines that control information indicates the second proxy node to store an SRH of a first packet; parses the second packet to obtain the SRH of the first packet; and stores the SRH of the first packet in a second cache entry in the random access memory 4840.

In an embodiment, the processor 4810 deletes a first bypass SID from a segment list of an SRH of the second packet; and decreases a segment left SL of the SRH of the second packet by one, to obtain the SRH of the first packet.

In an embodiment, the control information is carried in an extension header of the second packet; the control information is carried in the first bypass SID; the control information is carried in an IP header of the second packet; or the control information is carried in a TLV in the SRH of the second packet.

In an embodiment, the processor 4810 stores the SRH of the first packet in the second cache entry in the random access memory 4840 by using an identifier of the second cache entry as an index.

In an embodiment, the processor 4810 determines that a service function of an SF node includes modifying a flow identifier.

In an embodiment, the processor 4810 determines that the control information further indicates the second proxy node to store a mapping relationship between an identifier of a first cache entry and the identifier of the second cache entry. The processor 4810 stores the mapping relationship between the identifier of the first cache entry and the identifier of the second cache entry in the random access memory 4840.

In an embodiment, the transceiver 4820 receives a fourth packet, and sends the fourth packet to the processor 4810. The processor 4810 queries the mapping relationship between the identifier of the first cache entry and the identifier of the second cache entry in the random access memory 4840 based on the identifier of the first cache entry, to obtain the identifier that is of the second cache entry and that corresponds to the identifier of the first cache entry. The processor 4810 queries the second cache entry in the random access memory 4840 by using the identifier of the second cache entry as the index, to obtain the SRH of the first packet. The processor 4810 generates a fifth packet based on the fourth packet and the SRH of the first packet. The processor 4810 sends the fifth packet from the transceiver 4820 based on information such as an outbound interface after completing link layer encapsulation.

In an embodiment, the processor 4810 stores the SRH of the first packet in the second cache entry by using a flow identifier corresponding to the second packet and an endpoint dynamic proxy SID as indexes.

In an embodiment, the processor 4810 may receive a configuration instruction, and store a mapping relationship between the endpoint dynamic proxy SID and a VPN identifier in the random access memory 4840 according to the configuration instruction.

In an embodiment, the transceiver 4820 receives a fourth packet, and sends the fourth packet to the processor 4810. The processor 4810 queries the second cache entry in the random access memory 4840 based on the VPN identifier, the endpoint dynamic proxy SID, and a flow identifier corresponding to the fourth packet, to obtain the SRH of the first packet. The processor 4810 generates a fifth packet based on the fourth packet and the SRH of the first packet. The processor 4810 sends the fifth packet from the transceiver 4820 based on information such as an outbound interface after completing link layer encapsulation.

In an embodiment, the processor 4810 determines that the control information further indicates the second proxy node to send a payload of the first packet to the service function node. The processor 4810 generates a third packet based on the second packet, and the processor 4810 sends the third packet from the transceiver 4820, so that the third packet is transmitted to the SF node.

In an embodiment, the transceiver 4820 receives the second packet through a first inbound interface corresponding to a first link. Alternatively, the transceiver 4820 receives the second packet through a second inbound interface corresponding to a third link.

In an embodiment, the transceiver 4820 continuously receives a plurality of second packets, and sends the plurality of second packets to the processor 4810.

In an embodiment, the processor 4810 generates a sixth packet based on the first bypass SID, a second bypass SID corresponding to the second proxy node, and the second packet. The processor 4810 sends the sixth packet from the transceiver 4820 based on information such as an outbound interface after completing link layer encapsulation.

The computing device in this embodiment of this application may correspond to the first proxy node or the second proxy node in the foregoing method embodiments, and the processor 4810, the transceiver 4820, and the like in the computing device may implement the functions of and/or the steps and methods implemented by the first proxy node or the second proxy node in the foregoing method embodiments. For ease of brevity, details are not described herein again.

In some possible embodiments, the proxy node may be implemented as a virtualized device.

For example, the virtualized device may be a virtual machine (VM) on which a program having a packet sending function is run, and the virtual machine is deployed on a hardware device (for example, a physical server). The virtual machine is a complete computer system that is simulated by software, that has a complete hardware system function, and that runs in a totally isolated environment. The virtual machine may be configured as a first proxy node or a second proxy node. For example, the first proxy node or the second proxy node may be implemented based on a general-purpose physical server by using an NFV technology. The first proxy node or the second proxy node is a virtual host, a virtual router, or a virtual switch. After reading this application, a person skilled in the art may virtualize, on the general-purpose physical server by using the NFV technology, the first proxy node or the second proxy node having the foregoing functions. Details are not described herein again.

For example, the virtualized device may be a container, and the container is an entity used to provide an isolated virtualized environment. For example, the container may be a docker container. The container may be configured as a first proxy node or a second proxy node. For example, the proxy node may be created by using a corresponding image. For example, two container instances, that is, a container instance proxy-container 1 and a container instance proxy-container 2, may be created for a proxy-container (a container that provides a proxy service) by using an image of the proxy-container. The container instance proxy-container 1 is provided as the first proxy node, and the container instance proxy-container 2 is provided as the second proxy node. When a container technology is used for implementation, the proxy node may run by using a kernel of a physical machine, and a plurality of proxy nodes may share an operating system of the physical machine. The container technology may be used to isolate different proxy nodes. A containerized proxy node may run in a virtualized environment, for example, may run in a virtual machine, or the containerized proxy node may directly run in a physical machine.

For example, the virtualized device may be a pod. The pod is a basic unit of Kubernetes (Kubernetes is an open-source container orchestration engine of Google, and is briefly referred to as K8s) for deploying, managing, and orchestrating a containerized application. The pod may include one or more containers. All containers in a same pod are usually deployed on a same host. Therefore, all the containers in the same pod may communicate with each other through the host, and may share storage resources and network resources of the host. The pod may be configured as a first proxy node or a second proxy node. For example, specifically, a container as a service (CaaS, which is a container-based PaaS service) may be indicated to create a pod, and the pod is provided as the first proxy node or the second proxy node.

Certainly, the proxy node may alternatively be another virtualized device. Details are not described herein.

In some possible embodiments, the proxy node may alternatively be implemented by a general-purpose processor. For example, the general-purpose processor may be in a form of a chip. Specifically, the general-purpose processor implementing the first proxy node or the second proxy node includes a processing circuit, and an inbound interface and an outbound interface that are internally connected to and communicate with the processing circuit. The processing circuit is configured to perform the packet generation step in the foregoing method embodiments through the inbound interface. The processing circuit is configured to perform the receiving step in the foregoing method embodiments through the inbound interface. The processing circuit is configured to perform the sending step in the foregoing method embodiments through the outbound interface. Optionally, the general-purpose processor may further include a storage medium. The processing circuit is configured to perform the storage step in the foregoing method embodiments by using the storage medium.

In a possible product form, the first proxy node or the second proxy node in this embodiment of this application may alternatively be implemented by using the following: one or more field programmable gate arrays (FPGAs), a programmable logic device (PLD), a controller, a state machine, gate logic, a discrete hardware component, any other proper circuit, or any combination of circuits that can perform the functions described in this application.

In some possible embodiments, the proxy node may alternatively be implemented by using a computer program product. Specifically, an embodiment of this application provides a computer program product. When the computer program product runs on a first proxy node, the first proxy node is enabled to perform the packet transmission method in the foregoing method embodiments. An embodiment of this application further provides a computer program product. When the computer program product runs on a second proxy node, the second proxy node is enabled to perform the packet transmission method in the foregoing method embodiments.

It should be understood that the first proxy node or the second proxy node in the foregoing product forms respectively have any function of the first proxy node or the second proxy node in the foregoing method embodiments. Details are not described herein again.

A person of ordinary skill in the art may be aware that, the method steps and units that are described with reference to the embodiments disclosed in this specification can be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It can be clearly understood by a person skilled in the art that, for the purpose of convenient and brief descriptions, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, and may be located at one location, or may be distributed on a plurality of network units. Some or all of the units may be selected based on an actual requirement to achieve the objectives of the solutions in the embodiments in this application.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in a form of a software product. The computer software product is stored in a storage medium and includes several instructions for indicating a computer device (which may be a personal computer, a server, a network device, or the like) to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A packet transmission method, applied in a first proxy node, wherein the method comprises:
   receiving a first packet, wherein the first packet comprises a segment routing header (SRH), and a destination address of the first packet is an endpoint dynamic proxy segment identifier (SID);
   generating a second packet based on the endpoint dynamic proxy SID, the first packet, and a first bypass SID corresponding to a second proxy node, wherein the second packet comprises the first bypass SID, control information, and the SRH of the first packet, the first bypass SID is used to identify that a destination node of the second packet is the second proxy node, the control information is used to indicate the second proxy node to store the SRH of the first packet, and the second proxy node and the first proxy node are connected to a same service function node; and sending the second packet to the second proxy node.

2. The method according to claim 1, wherein the generating a second packet based on the endpoint dynamic proxy SID, the first packet, and a first bypass SID corresponding to a second proxy node comprises:
  inserting the first bypass SID into a segment list of the SRH of the first packet;
  updating a segment left (SL) of the SRH of the first packet; and
  updating the destination address of the first packet to obtain the second packet, wherein an SL of the second packet is greater than an SL of the first packet.

3. The method according to claim 2, wherein the updating a segment left (SL) of the SRH of the first packet comprises:
  increasing the SL of the first packet by one; and
  the updating the destination address of the first packet comprises:
  updating the destination address of the first packet to the first bypass SID.

4. The method according to claim 2, wherein the method further comprises:
  inserting one or more target SIDs into the segment list of the SRH of the first packet, wherein the one or more target SIDs are used to indicate a target forwarding path, and the target forwarding path is a path from the first proxy node to the second proxy node;
  the updating a segment left (SL) of the SRH of the first packet comprises:
  increasing the SL of the first packet by N, wherein N is a positive integer greater than 1; and
  the updating the destination address of the first packet comprises:
  updating the destination address of the first packet to a SID corresponding to a next segment routing SR node in the one or more target SIDs.

5. The method according to claim 1, wherein
  the control information is carried in an extension header of the second packet;
  the control information is carried in the first bypass SID;
  the control information is carried in an internet protocol (IP) header of the second packet; or
  the control information is carried in a type length value (TLV) in an SRH of the second packet.

6. The method according to claim 1, wherein after the receiving a first packet, the method further comprises:
  storing the SRH of the first packet in a first cache entry;
  generating a third packet based on the first packet, wherein the third packet comprises a payload of the first packet but does not comprise the SRH of the first packet; and
  sending the third packet to the service function node.

7. The method according to claim 6, wherein the storing the SRH of the first packet in a first cache entry comprises:
  storing the SRH of the first packet in the first cache entry using an identifier of the first cache entry as an index.

8. The method according to claim 7, wherein the second packet further comprises the identifier of the first cache entry, the control information is further used to indicate to the second proxy node to store a mapping relationship between the identifier of the first cache entry and an identifier of a second cache entry, and the second cache entry is a cache entry used by the second proxy node to store the SRH of the first packet.

9. The method according to claim 6, wherein the third packet comprises an identifier of the first cache entry; and after the sending the third packet to the service function node, the method further comprises:
  receiving a fourth packet from the service function node, wherein the fourth packet comprises an identifier of the first cache entry;
  performing query by using the identifier of the first cache entry as an index, to obtain the SRH of the first packet;
  generating a fifth packet based on the fourth packet and the SRH of the first packet, wherein the fifth packet comprises a payload of the fourth packet and the SRH of the first packet; and
  sending the fifth packet.

10. A first proxy node, wherein the first proxy node comprises:
  a memory storing instructions; and
  a processor coupled to the memory, wherein execution of the instructions causes the first proxy node to:
  receive a first packet, wherein the first packet comprises a segment routing header (SRH), and a destination address of the first packet is an endpoint dynamic proxy segment identifier (SID);
  generate a second packet based on the endpoint dynamic proxy SID, the first packet, and a first bypass SID corresponding to a second proxy node, wherein the second packet comprises the first bypass SID, control information, and the SRH of the first packet, the first bypass SID is used to identify that a destination node of the second packet is the second proxy node, the control information is used to indicate the second proxy node to store the SRH of the first packet, and the second proxy node and the first proxy node are connected to a same service function node; and
  send the second packet to the second proxy node.

11. The first proxy node according to claim 10, wherein execution of the instructions further causes the first proxy node to:
  insert the first bypass SID into a segment list of the SRH of the first packet; update a segment left (SL) of the SRH of the first packet; and update the destination address of the first packet to obtain the second packet, wherein an SL of the second packet is greater than an SL of the first packet.

12. The first proxy node according to claim 11, wherein execution of the instructions further causes the first proxy node to: increase the SL of the first packet by one; and update the destination address of the first packet to the first bypass SID.

13. The first proxy node according to claim 11, wherein execution of the instructions further causes the first proxy node to: insert one or more target SIDs into the segment list of the SRH of the first packet, wherein the one or more target SIDs are used to indicate a target forwarding path, the target forwarding path is a path from the first proxy node to the second proxy node; increase the SL of the first packet by N, wherein N is a positive integer greater than 1; and update the destination address of the first packet to a SID corresponding to a next segment routing SR node in the one or more target SIDs.

14. The first proxy node according to claim 10, wherein the control information is carried in an extension header of the second packet;

the control information is carried in the first bypass SID;

the control information is carried in an internet protocol (IP) header of the second packet; or the control information is carried in a type length value (TLV) in an SRH of the second packet.

15. The first proxy node according to claim 10, wherein execution of the instructions further causes the first proxy node to:

store the SRH of the first packet in a first cache entry, generate a third packet based on the first packet, wherein the third packet comprises a payload of the first packet but does not comprise the SRH of the first packet; and send the third packet to the service function node.

16. The first proxy node according to claim 15, wherein execution of the instructions further causes the first proxy node to store the SRH of the first packet in the first cache entry using an identifier of the first cache entry as an index.

17. The first proxy node according to claim 16, wherein the second packet further comprises the identifier of the first cache entry, the control information is further used to indicate to the second proxy node to store a mapping relationship between the identifier of the first cache entry and an identifier of a second cache entry, and the second cache entry is a cache entry used by the second proxy node to store the SRH of the first packet.

18. The first proxy node according to claim 15, wherein execution of the instructions further causes the first proxy node to:

receive a fourth packet from the service function node, wherein the fourth packet comprises an identifier of the first cache entry; and perform a query using the identifier of the first cache entry as an index, to obtain the SRH of the first packet, generate a fifth packet based on the fourth packet and the SRH of the first packet, wherein the fifth packet comprises a payload of the fourth packet and the SRH of the first packet; and send the fifth packet.

* * * * *